US006623194B1

(12) United States Patent
Lip

(10) Patent No.: US 6,623,194 B1
(45) Date of Patent: Sep. 23, 2003

(54) POSITION ENCODER SYSTEM

(76) Inventor: Chung Ching Lip, Unit 3A #8 Cox Boulevard, Markham, Ontario (CA), L3R 4G1

( * ) Notice: Subject to any disclaimer, the term of this patent is extended or adjusted under 35 U.S.C. 154(b) by 170 days.

(21) Appl. No.: 09/694,833

(22) Filed: Oct. 24, 2000

Related U.S. Application Data

(60) Provisional application No. 60/161,714, filed on Oct. 27, 1999.

(51) Int. Cl.[7] .................................................. B41J 5/08

(52) U.S. Cl. ....................... 400/472; 345/157; 345/163; 400/485

(58) Field of Search ................................ 400/472, 485, 400/715; 345/156, 163, 157, 158, 161; 361/680

(56) References Cited

U.S. PATENT DOCUMENTS

| | | | | | |
|---|---|---|---|---|---|
| 5,528,265 | A | * | 6/1996 | Harrison | 345/163 |
| 5,638,062 | A | * | 6/1997 | McAlindon | 400/485 |
| 5,790,108 | A | * | 8/1998 | Salcudean et al. | 345/157 |
| 6,100,874 | A | * | 8/2000 | Schena et al. | 345/163 |
| 6,101,893 | A | * | 8/2000 | Wergen | 345/161 |
| 6,107,991 | A | * | 8/2000 | Osborn | 345/157 |
| 6,252,579 | B1 | * | 6/2001 | Rosenberg et al. | 345/157 |
| 6,333,734 | B1 | * | 12/2001 | Rein | 345/163 |
| 6,366,274 | B1 | * | 4/2002 | Elledge | 345/163 |

* cited by examiner

*Primary Examiner*—Eugene H. Eickholt

(57) ABSTRACT

The present invention hides the mouse cord thus allowing for better desktop space management and greater use satisfaction. It also provides for easy integration of computer mouse capability with other devices to enhance portability. Sensing components other than optical and ball-based can also be used, as well as sensing components may also be hidden to increase durability. The present invention also enables using moving boards to be used as computer mouse by defining different operations base on combinations of keys being pressed and/or touched together with movement signals of the moving boards. Such approach also makes dual position encoder operations possible and allows for parallel computer screen operations.

23 Claims, 87 Drawing Sheets

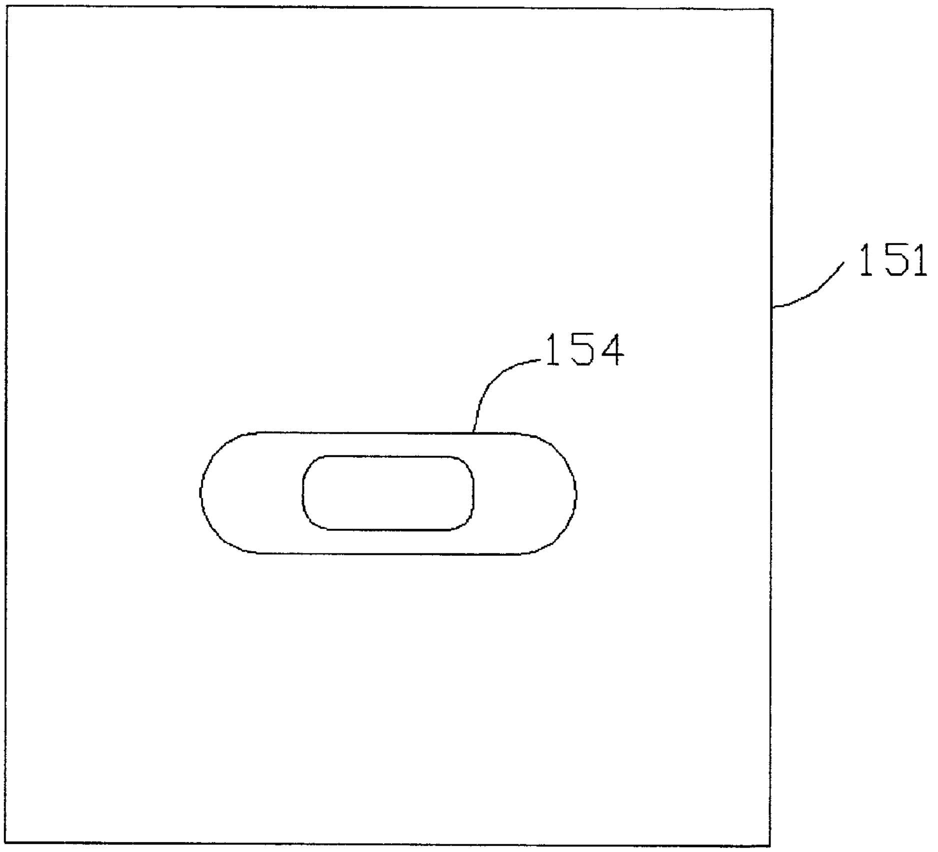
FIG. 19
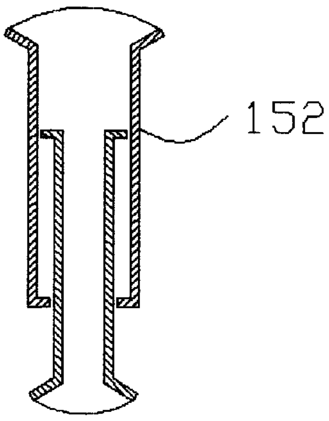
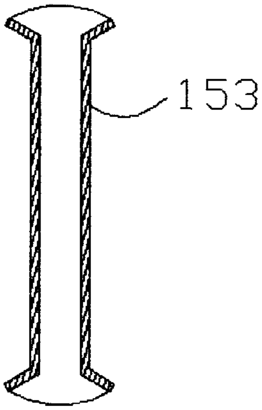
FIG. 20
FIG. 21

571

POSITION ENCODER SYSTEM

CROSS-REFERENCE TO RELATED APPLICATIONS

This application is a non-provisional application for provisional application of application No. 60/161,714 filed on 27 Oct. 1999.

STATEMENT REGARDING FEDERALLY SPONSORED RESEARCH OR DEVELOPMENT

Not Applicable

REFERENCE TO A MICROFICHE APPENDIX

Not Applicable

BACKGROUND AND BRIEF SUMMARY OF THE INVENTION

This invention is directed generally to input device for computer systems, and specifically to cursor control device for computers having interactive display screen.

As more functions can be packed with new technologies, machines can be made more powerful while their sizes are conversely becoming smaller. However, more sophisticated operations often require more complicate inputs to accomplish. The ability of performing more functions will be influenced by the ability of providing inputs to designate those functions. More powerful methods for providing inputs are desired.

Computer systems such as graphical display systems often require directional and displacement information to designate some operations. Computer mouse, joysticks, track-balls as well as keyboards are often used to provide directional and displacement inputs for computer systems. Joysticks are good for inputting directional information, but not displacement information. Track-balls are not responsive enough to conveniently represent long displacement information. Keyboard buttons such as the arrow keys are slow and inefficient to provide directional or displacement information. Joysticks, track-balls, keyboard buttons as well as some other input devices are difficult to provide inputs to designate some operations such as dragging and rotation both of which require moving the input device and pressing some buttons simultaneously. The present invention can perform most operations quickly and comfortably. And the present invention can provide for movement and button pressed signals at the same time easily.

Conventional computer mouse are more capable of providing directional and displacement information than other types of conventional input devices. However, conventional computer mouse requires cords to link the mouse with computer systems. Such mouse cords often obstruct the movement of mouse and cause nuisance to the users during operation. Cordless computer mouse, on the other hand, require signal receivers to be installed properly. Because cordless computer mouse are not fastened, they may be damaged by falling over from the tables on which they operate. Cordless computer mouse are also more expensive. The present invention enables inexpensive solutions to make computer mouse that are fastened and do not have the problem of mouse cords obstructing the movement of the mouse.

Conventional wheel base computer mouse suffer from difficult maintenance largely because they are affected by surrounding dirt. Wheel base mouse require moving the wheels over open surfaces, and in order to provide sufficient friction the wheels are often made with material that would easily pick up dirt as they roll. The sensitivity of the mouse would be severely affected by the dirt, as well as moving the mouse will become more difficult. Conventional optical mouse have similar less sever problem in that the mouse bottom surfaces have to be kept clean in order to move smoothly. On the other hand, the surfaces upon which conventional mouse both with and without cords move have to be kept clean all the time.

The input devices made using the present invention are almost maintenance free, and are very durable. The sensors can often be built within close regions of the input devices, and many different types of durable sensors may be used. Besides, the present invention can easily exploit high sensitive sensors to provide accurate and responsive feedback.

Computer systems may improve the computer operations if different set of directional and displacement signals can be provided. For example, the tasks of scrolling the display contents vertically and horizontally, moving a display objects on the screen from one position to another, selecting screen objects over a set of objects, and the like, all of these operations can be much quickly performed if each of these operations can be easily achieved by different set of directional and displacement signals. The present invention makes creative use of hand gesture to distinguish signals being generated. In this way, many distinguishable directional and displacement information can be produced simply by changing hand gesture, and thus many conventional computer mouse can be emulated quickly and easily. A particular emulated computer mouse signal can be designated for a specific operation. The present invention thus provides a convenient way for the user to quickly and easily select required operations by simply changing the hand gesture.

Desktop space management is also important for work efficiency and user satisfaction. In some situations, desktop space requirement may turn a solution into impractical. For instance, a small table may not be sufficient to accommodate a computer screen, keyboard, mouse and joystick at the same time. Besides the bodies of these devices requires desktop space, a fair amount of desktop space is needed for the connecting cords to pass through. Moreover, mouse cords require considerable desktop space in order to let move freely. The present invention saves desktop space by allowing integration of computer keyboard, mouse and joystick into a single unit, and uses only a single cord which is also strategically hidden.

The design of conventional computer mouse also makes difficult to integrate computer mouse with other device. The present invention makes innovative use of cavities to hide communication links while allowing to move freely. The fact that cavity naturally exists allows the present invention to be easily integrated with many device. In particular, the present invention enables seamless integration of keyboards with mouse without requiring additional space. The present invention may also be incorporated in strategic fix position, and thus can be easily accessed for operation. Arm movements would be almost eliminated, as well as eye, head and shoulder movements are also greatly reduced, thus increasing efficiency while lowering fatigue caused. The tight integration of the present invention with other devices also simplify the installation process required to connect these devices with the associate systems. Transportation and handling of the integrated devices would also be easier.

Providing too wide a space for movement of an input device may not be as necessary as one would think. Longer movement can often be broken down into repetitive smaller movements. That is, instead of moving an input device such as a computer mouse over a long distance in order to move the mouse pointer from one location on the screen to another, user tends to move a short distance and then lifts the mouse back to the original position to move again. Moving over a longer distance requires arm movement and thus may cause fatigue of the arm. In particular, moving a mouse forward away from the user and backward to the user over a long distance is difficult. Indeed, an vertical and horizontal moving distances as small as 2 cm×3 cm, respectively, would be enough for most operations. The present invention makes innovative use of cavity to provide maximum moving distance while requiring minimum space for housing the present invention.

Because most operations can be achieved mainly by using the hand, work load are thus concentrated on the muscles of the hand, and thus fatigue may be caused to the hand if the present invention is used continuously for a long period.

BRIEF DESCRIPTION OF THE SEVERAL VIEWS OF THE DRAWING

FIG. 19 is a top view of one type of platform surface.

FIG. 20 is a section view of one design of a link member.

FIG. 21 is a section view of another design of a link member.

FIG. 124 shows an enlarged top view of the tailless mouse in FIG. 121.

DETAILED DESCRIPTION OF THE INVENTION

Figure 1:
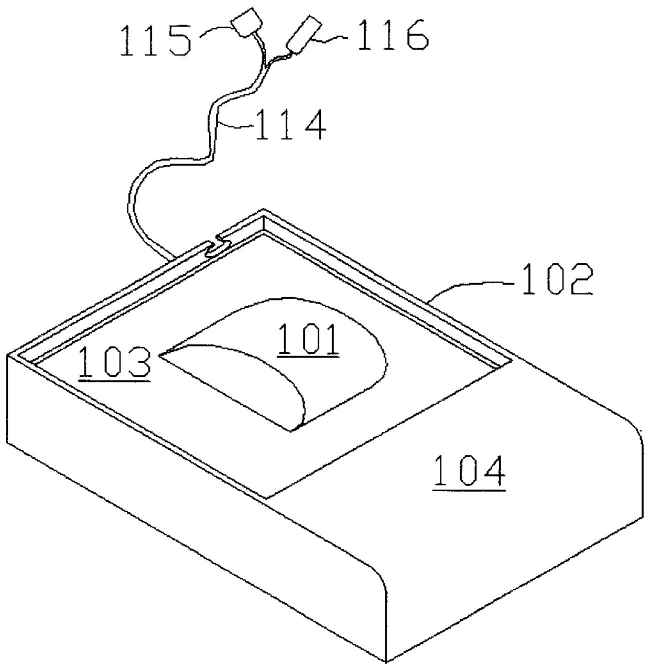
FIG. 1 is a perspective view of a tailless mouse module of the present invention.

FIG. 1 shows the perspective view of a tailless mouse module of the present invention. A tailless mouse module consists of a handle and housing which are called a tailless mouse and mouse station, respectively. A tailless mouse module may exist itself or be attached to another device such as a computer keyboard or notebook computer. A mouse station has a platform surface on which a tailless mouse operates. A tailless mouse usually operates on a mouse station, however, there are designs that allow tailless mouse to be easily converted to operate in the same way as conventional computer mouse, that is, without requiring mouse stations.

FIG. 1 shows tailless mouse 101 resting on a mouse station 102. The mouse 101 can move in any direction coplanar to the surface of platform 103. The wrist support 104 is used to support the wrist of an user while operating the mouse. The wrist support 104 is optional. The cable 114 has one end connected to the mouse station, and the other end has two plugs 115 and 116. The cable 114 is used to convey the signals generated from mouse 101, as well as an external device such as a computer keyboard, to a computer system.

Figure 2:
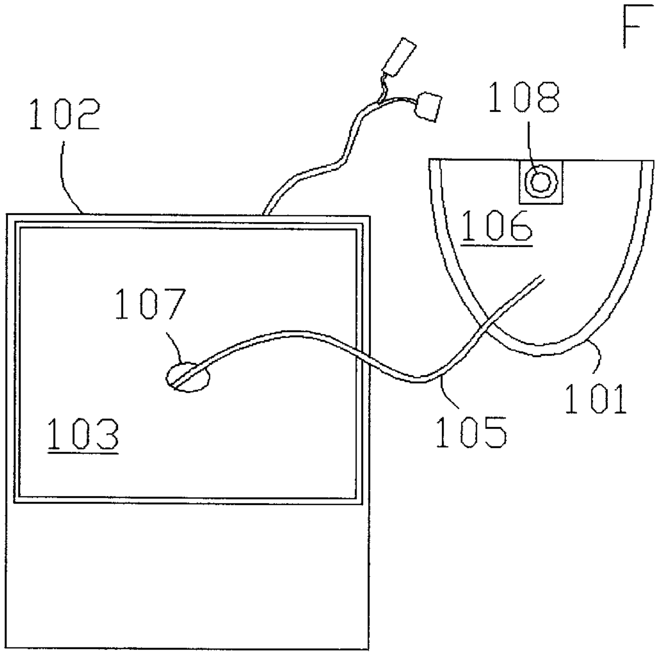
FIG. 2 is a top view of a mouse station and bottom view of a tailless mouse taken away from a mouse station.

FIG. 2 shows the top view of mouse station 102 and the bottom view of mouse 101. In this design, most of the mouse bottom area is taken to form a cavity 106. A mouse bottom cavity or hole is formed when portion of the mouse bottom surface is missing or indented inwards to the body of the mouse. A communication means which is the mouse cord 105 in this design with one end attached to the top of the cavity passes through a hole 107 on platform 103 into the mouse station. In this way, the mouse cord comes out from the bottom of a tailless mouse as differed from a conventional mouse where mouse cord comes out sideways of the mouse. A movement sensor 108 is positioned near the top edge of the tailless mouse, whereas conventional mouse usually position the movement sensors around the centre region of the mouse bottom. Other movement sensor such as optical movement sensor can be used instead of wheel base sensor, in which case the platform 103 can be changed to provide optical image needed by the optical sensor.

Figure 3:
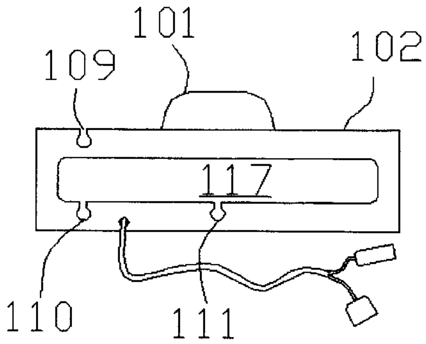
FIG. 3 is a rear view of a tailless mouse module.
Figure 10:
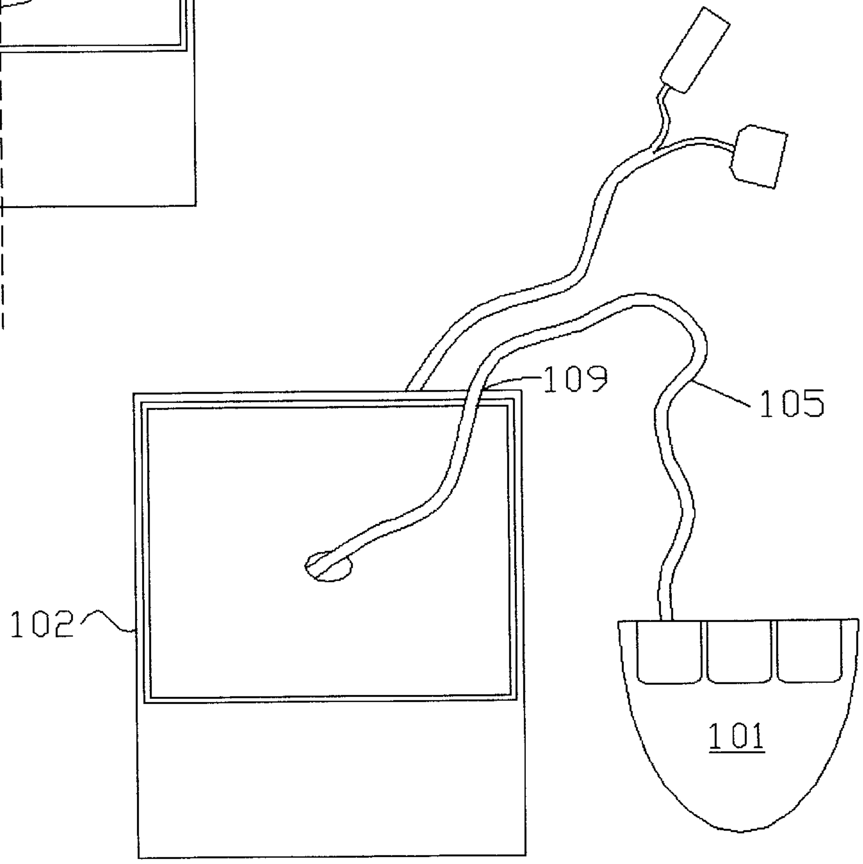
FIG. 10 is another top view of a tailless mouse module.
Figure 14:
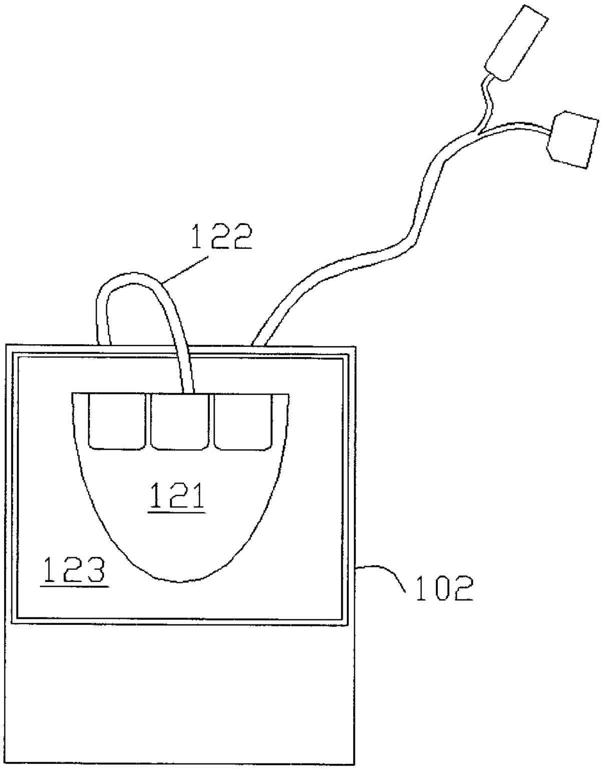
FIG. 14 is a top view of a conventional mouse on a mouse station.

FIG. 3 shows the rear view of mouse station 102 and tailless mouse 101. The notch 109 is to be used to hold the mouse cord 105 when mouse 101 is taken away from the mouse station and operated as a conventional mouse, as shown in FIG. 10. The notch 110 is used to hold the cable of an external device such as cable 119 shown in FIG. 11. The notch 111 is used to hold a mouse cord of a conventional mouse when which is operated on the mouse station, as shown in FIG. 14. The opening 117 allows the cable of an external device such as a computer keyboard to pass through.

Figure 5:
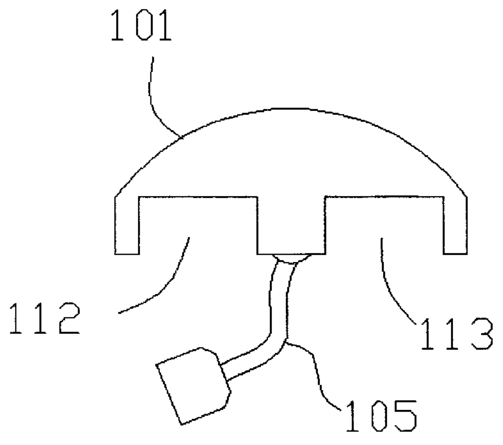
FIG. 5 is a rear view of a tailless mouse.
Figure 4:
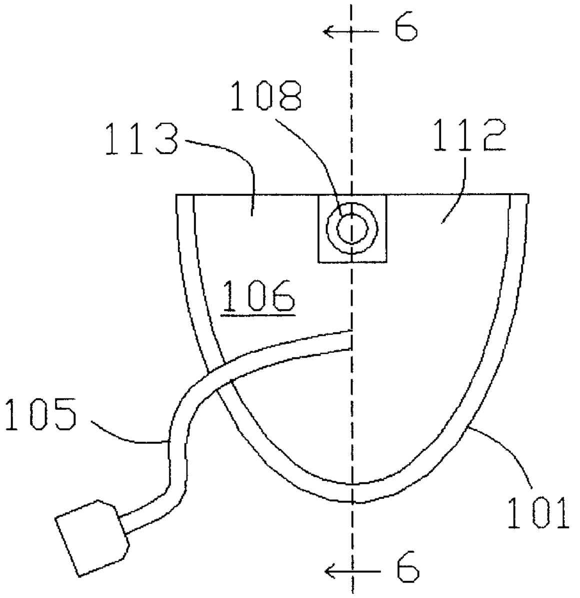
FIG. 4 is a bottom view of a tailless mouse.
Figure 6:
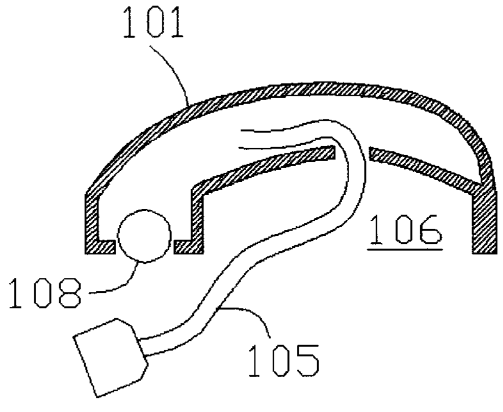
FIG. 6 is a section view taken along line 6—6 of FIG. 4.
Figure 8:
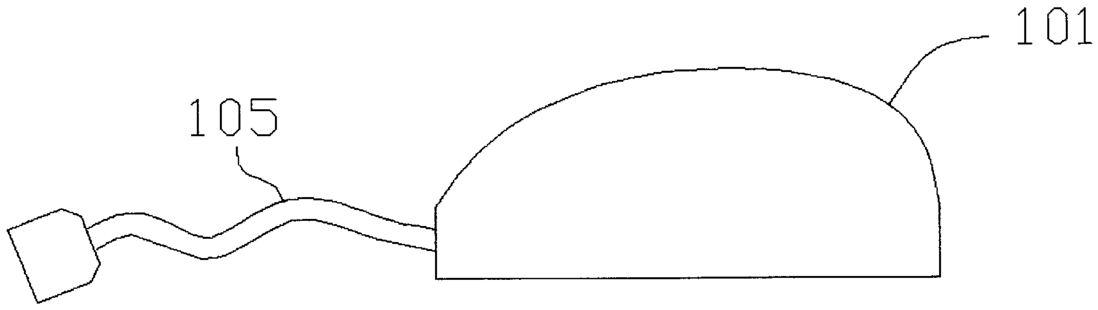
FIG. 8 is another side view of a tailless mouse.

FIG. 4 shows an enlarged bottom view of mouse 101, and FIG. 5 shows the rear view of mouse 101. The openings 112 and 113 allows the mouse cord 105 to pass through when mouse 101 operates on a surface such as a desk, as shown in FIG. 8. FIG. 6 shows a cross-sectional view along the centre of mouse 101.

Figure 7:
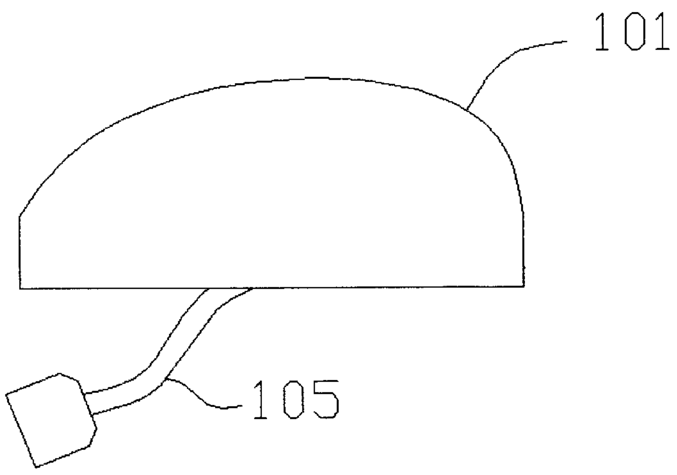
FIG. 7 is a side view of a tailless mouse.

FIG. 7 shows the side view of mouse 101 when operates over a mouse station (not shown). It shows that the mouse cord 105 comes out from underneath of the mouse. FIG. 8 shows the side view of mouse 101 when operates over a surface. It shows that the mouse cord 105 may come out from the rear through the openings 112 or 113 shown in FIG. 5. In this way, mouse 101 can function in the same way as a conventional mouse.

Figure 9:
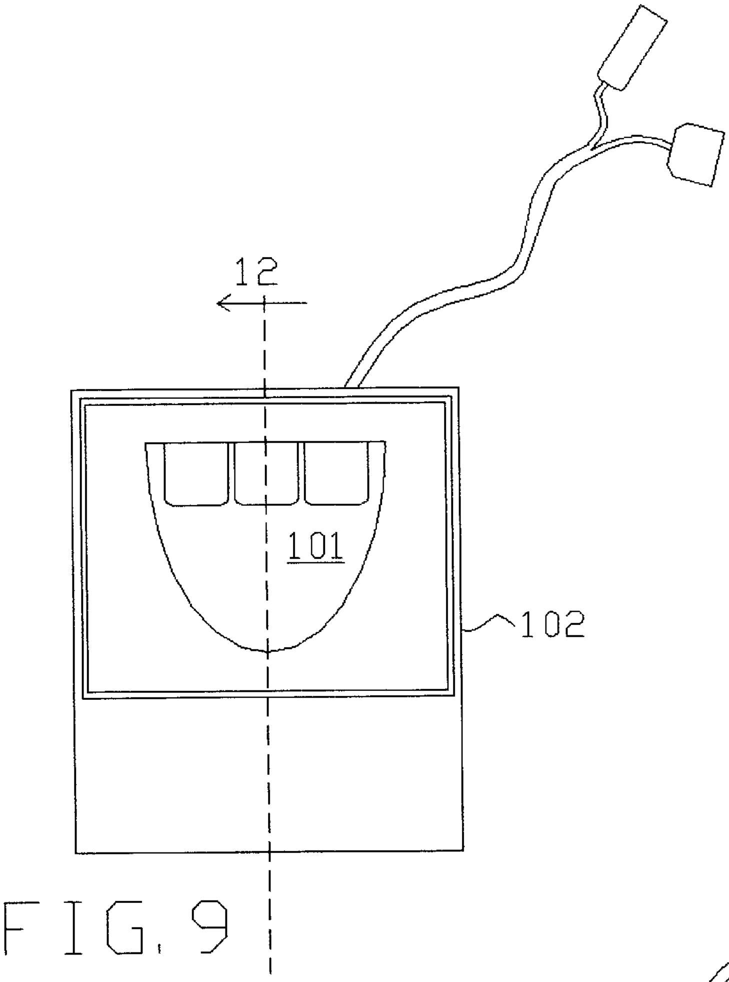
FIG. 9 is a top view of a tailless mouse module.

FIG. 9 shows the top view of mouse 101 resting on mouse station 102. FIG. 10 shows the top view of mouse 101 operating as a conventional computer mouse. It shows that the mouse cord 105 can be hold by the notch 109 at the edge of mouse station 102.

Figure 11:
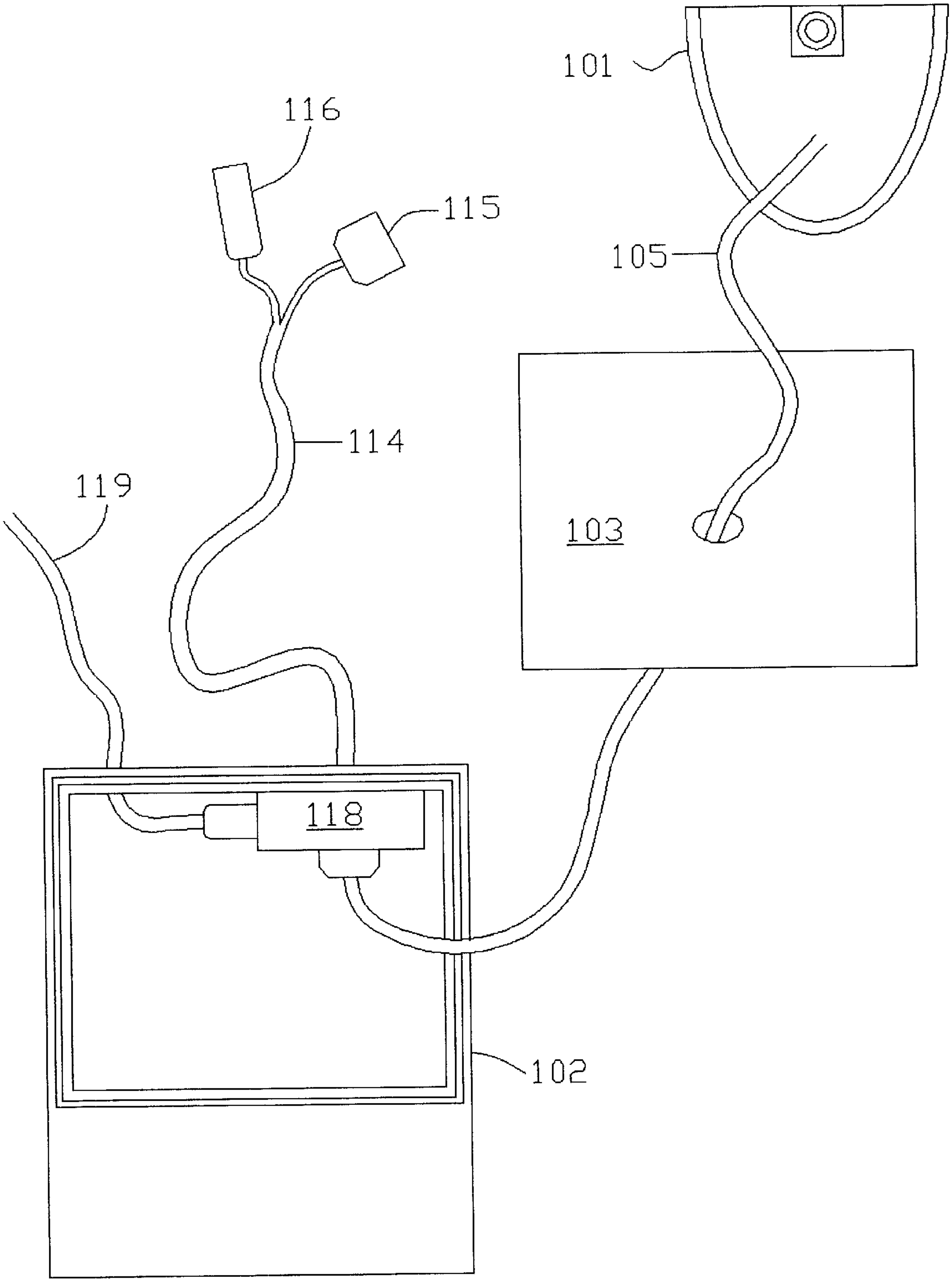
FIG. 11 is a top view of the inside of a tailless mouse module.

FIG. 11 depicts the top view of mouse station 102 with platform 103 lifted up. It also includes the bottom view of mouse 101. The converter 118 is a simple converter accepting the mouse cord 105 and an external cable 119. The signals are conveyed by the combination cable 114 which has the other end split into plugs 115 and 116. Plugs 115 and 116 can plug into a computer system.

Figure 12:
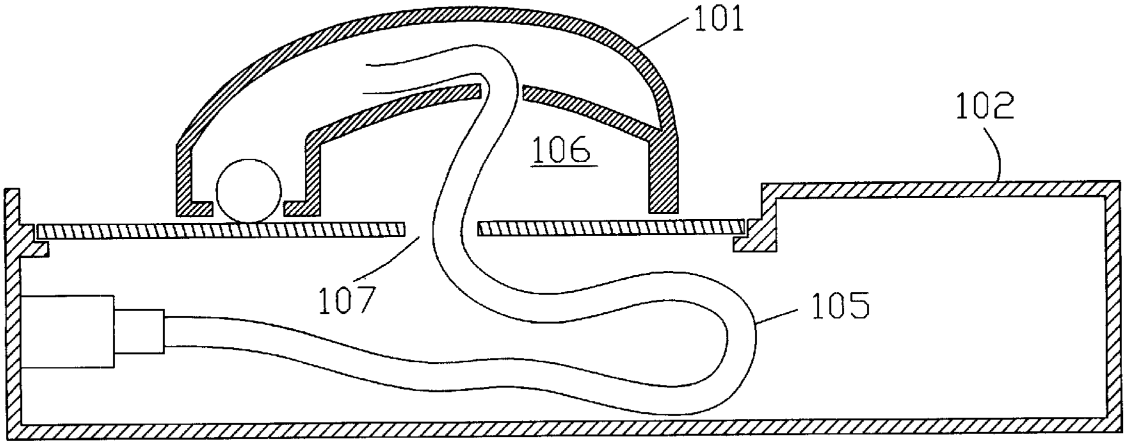
FIG. 12 is a section view of a tailless mouse module taken along line 12 of FIG. 9.

FIG. 12 depicts a cross-sectional view taken along line 12 in FIG. 9 showing how the mouse cord 105 comes out from underneath the mouse 101 passing through the cavity 106 and platform hole 107 into mouse station 102.

Figure 13:
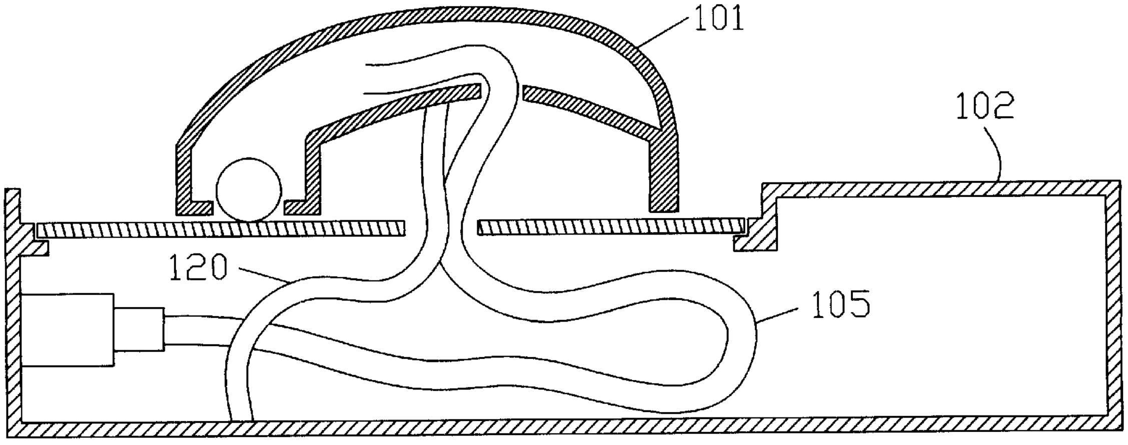
FIG. 13 is another section view of a tailless mouse.

FIG. 13 shows the same view as FIG. 12, but adding a rope 120 that has one end secured with the mouse 101 and the other end secured with the mouse station. Rope 120 is used to prohibit the mouse 101 from taken away such as when the device is used in public area. The rope 120 forms one type of mouse link in the present invention.

FIG. 14 shows how a conventional computer mouse 121 may also operate on mouse station 102. The mouse cord 122 may pass over the top edge and goes into the mouse station through the opening 117 shown in FIG. 3.

Figure 15:
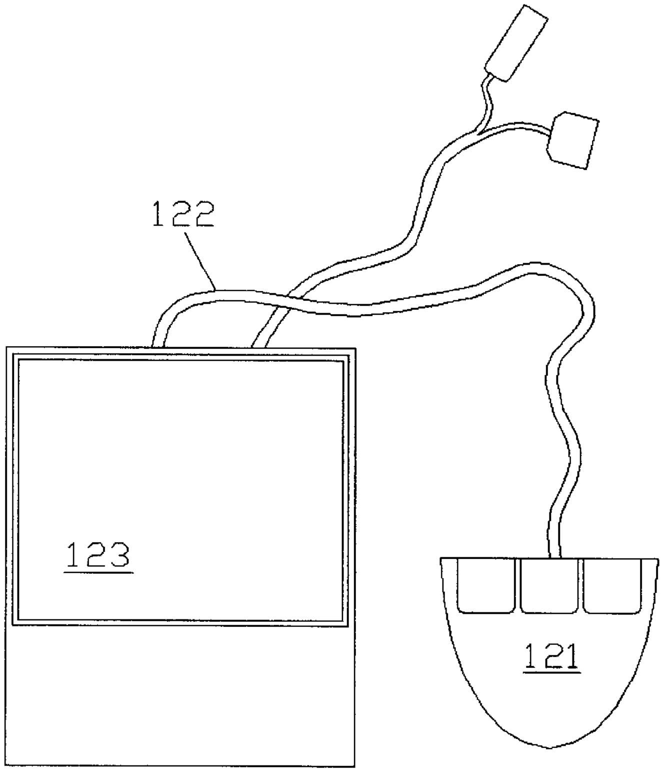
FIG. 15 is a top view of a conventional mouse placed next to a mouse station.

FIG. 15 depicts how the conventional computer mouse 121 may be operated when taken away from the mouse station. It also shows a platform 123 without platform hole may replace the platform 103 for use with the conventional mouse.

Figure 16:
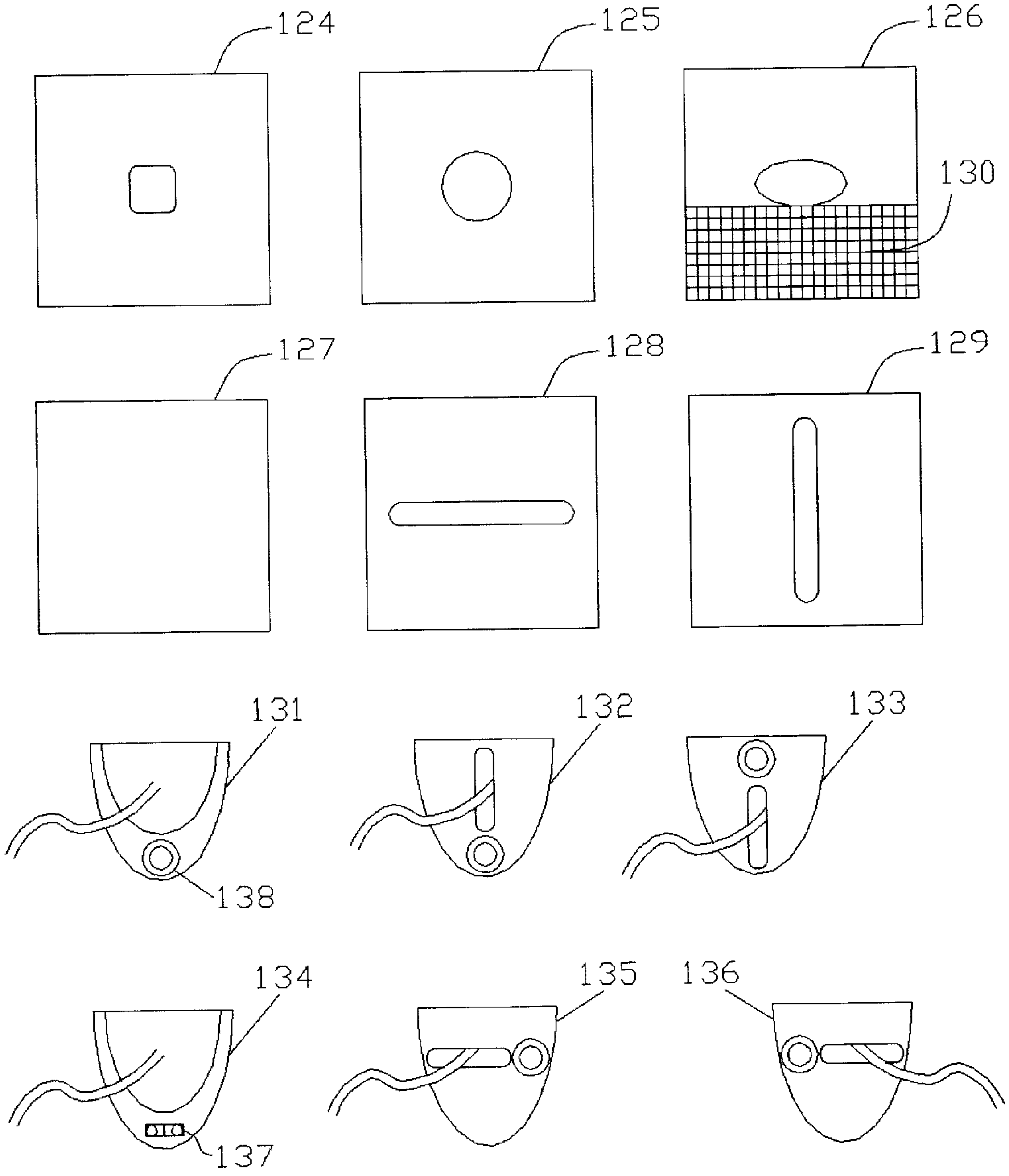
FIG. 16 are views of s ever al platform surfaces and mouse bottoms designs.

FIG. 16 depicts alternate designs for platforms labelled as 124, 125, 126, 127, 128 and 129 with different shapes of platform holes except platform 127 with no platform hole. Platform 127 is to be used with a conventional computer mouse. FIG. 16 also includes alternate designs for mouse bottoms labelled as 131, 132, 133, 134, 135 and 136 with different mouse bottom cavities and movement sensor locations. Note that, different types of movement sensors may be used. If optical movement sensor is used as shown in mouse 137, the corresponding platform should be marked with suitable optical marks to be read by the optical sensor, as in platform 126 with optical marks 130.

Different shapes of mouse bottom cavities and mouse platforms may be used provided that the mouse cord can always pass throw the mouse bottom cavity and mouse platform hole at any position the mouse may move, as well as the movement sensor will not be disabled by the platform hole also at any position the mouse may move.

Figure 17:
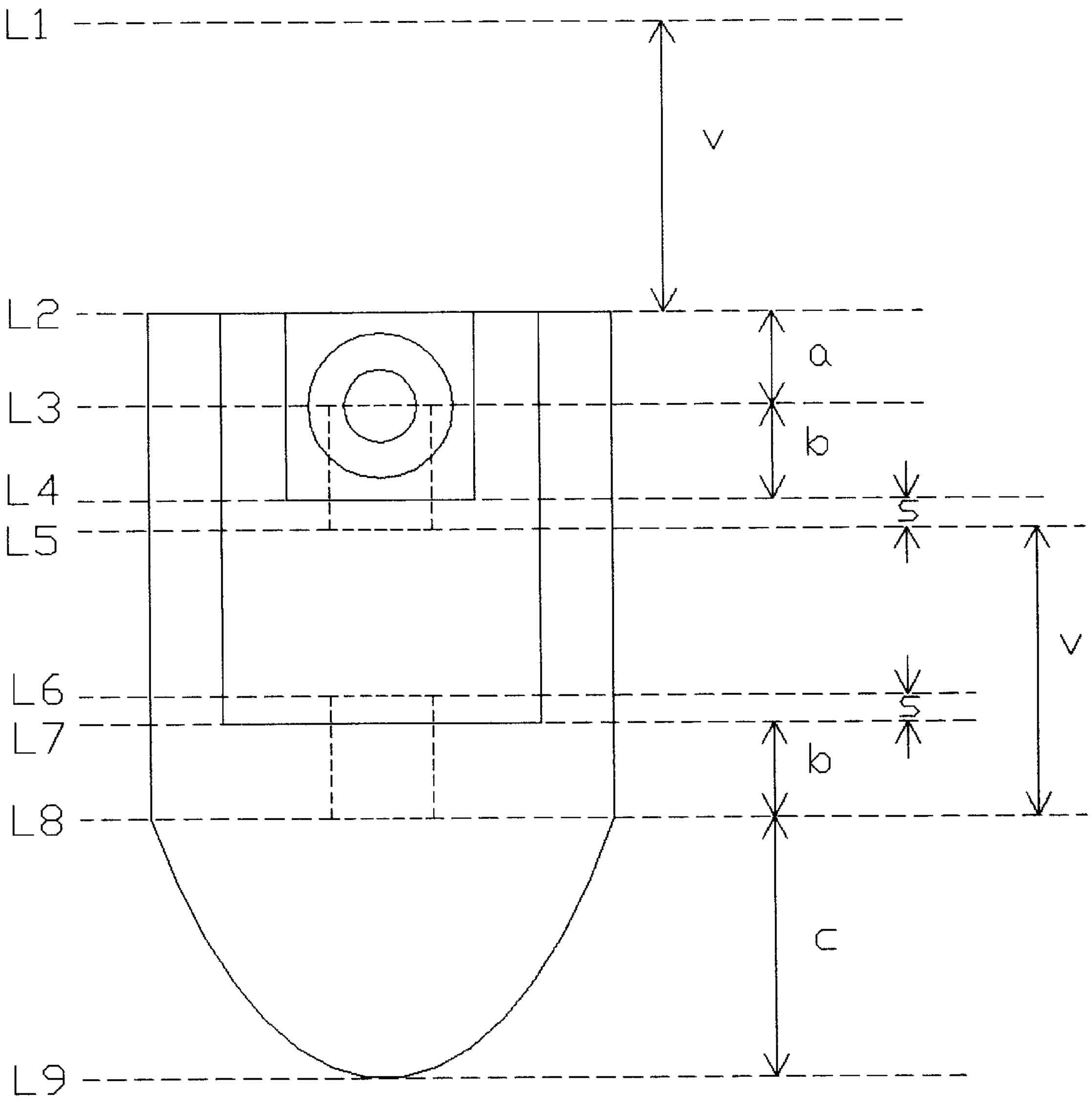
FIG. 17 is a diagram showing relative vertical movement of a platform hole with a mouse bottom design.

FIG. 17 is used to describe the relationship between the vertical dimensions of one design of tailless mouse and platform. In the figure, a mouse bottom is shown superimposed with the platform hole drawn as dashed boxes at 2 positions between lines L3 and L5 as well as L6 and L8. In this design, the mouse movement sensor is located near the top edge of the mouse bottom as shown between L2 and L4 with vertical dimension a+b. The rectangular platform hole between lines L3 and L5 represents the relative position of the mouse bottom with the platform hole when the mouse is moved to the lowest vertical position. If the mouse is to be moved up for a vertical length of v, the platform hole will relatively move downwards a length of v. Thus, the rectangular platform hole between line L6 and L8 represents the relative position of the mouse bottom with the platform hole when the mouse is moved to the highest vertical position. The length s between lines L4 and L5 as well as L6 and L7 represents the length required by the communication link such as a mouse cord to pass through. The length c between lines L8 and L9 is optional. In this design, if the mouse is to hide the platform hole in the vertical direction wherever the mouse may move, then:

| | |
|---|---|
| length of mouse bottom cavity | = length between lines L4 and L7 |
| | = v − b + s |
| length of mouse platform hole | = b + s |
| length of mouse bottom | = a + b + s + v + c |
| length of mouse platform | = v + length of mouse bottom |
| | = 2v + a + b + c + s |
| vertical position of platform hole | = line L5 from L9 |
| | = v + c |

If v=3, a=b=1.5, c=2 and s=0.4, then the length of mouse bottom and platform will be 8.4 and 11.4 respectively. The length of mouse bottom cavity and mouse platform hole will be both 1.9. And the vertical position of the platform hole on the platform is at L5, or 5, from the platform boundary.

Figure 18:
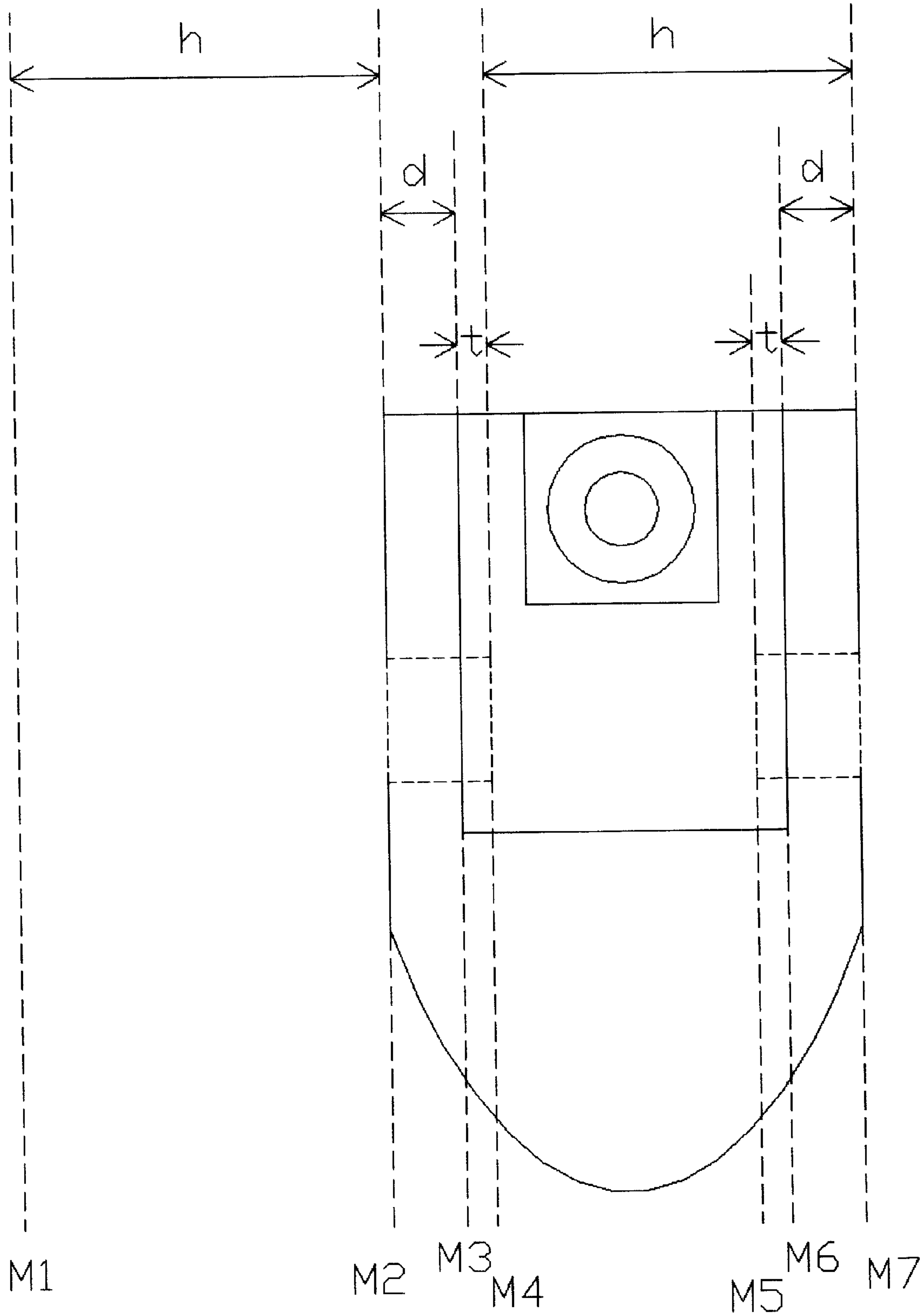
FIG. 18 is a diagram showing relative horizontal movement of a platform hole with a mouse bottom design.

FIG. 18 is used to describe the relationship between the horizontal dimensions of one design of mouse and platform. The 2 dashed boxes between the lines M2 and M3 as well as M5 and M7 represents the positions of the platform hole relative to the mouse bottom when which is moved to extreme right and left positions, respectively. In this design, the maximum horizontal displacement h of the mouse is from M1 to M2. The width t between lines M3 and M4 as well as M5 and M6 represents the width required by a communication link such as a mouse cord to pass through. The width d between the lines M2 and M3 as well as M6 and M7 is the width of the mouse bottom left and right edges respectively. In this design, if the mouse is to hide the platform hole in the horizontal direction wherever the mouse may move, then:

| | |
|---|---|
| width of the mouse bottom | = h + t + d |
| width of the mouse bottom cavity | = h − d + t |
| width of the platform | = 2h + t + d |
| horizontal position of platform hole | = line M2 from M1<br>= h |

For example, if h=5, t=0.4 and d=1, then the width of the mouse bottom, mouse bottom cavity and platform would be 6.4, 4.4 and 11.4 respectively. And the horizontal position of the platform hole will be at 5 from the platform boundary.

Note that hiding the platform hole wherever a tailless mouse moves is not a must. If it does, it can provide a better look and feel, as well as preventing dirt from getting into the platform.

FIG. 19 depicts the top view of another design of a platform 151 which has a conical shape platform hole 154. FIG. 20 depicts the cross-sectional view of a mouse link 152 in the present invention. Mouse Link 152 composes of 2 cylindrical tubes with one extended from inside of the other. The ends of the thus formed tube are wider than the tube body. FIG. 21 shows the cross-sectional view of an alternate mouse link 153 that can also be used with platform 151.

A mouse link in the present invention is used to link the handle with the housing, that is to link a tailless mouse with the mouse station. As will be described later, mouse links can also serve as movement sensors. Mouse link inhibits a mouse from being taken away from a mouse station, however, a mouse link will not obstruct the movement of the mouse. Mouse links also usually allow communication means to pass through from the mouse to the mouse stations. Mouse links can avoid tailless mouse from falling off the mouse stations during operation or in situations such as transportation. Mouse link can also be used to prevent a mouse from stolen such as when the mouse is used in public areas.

Figure 22:
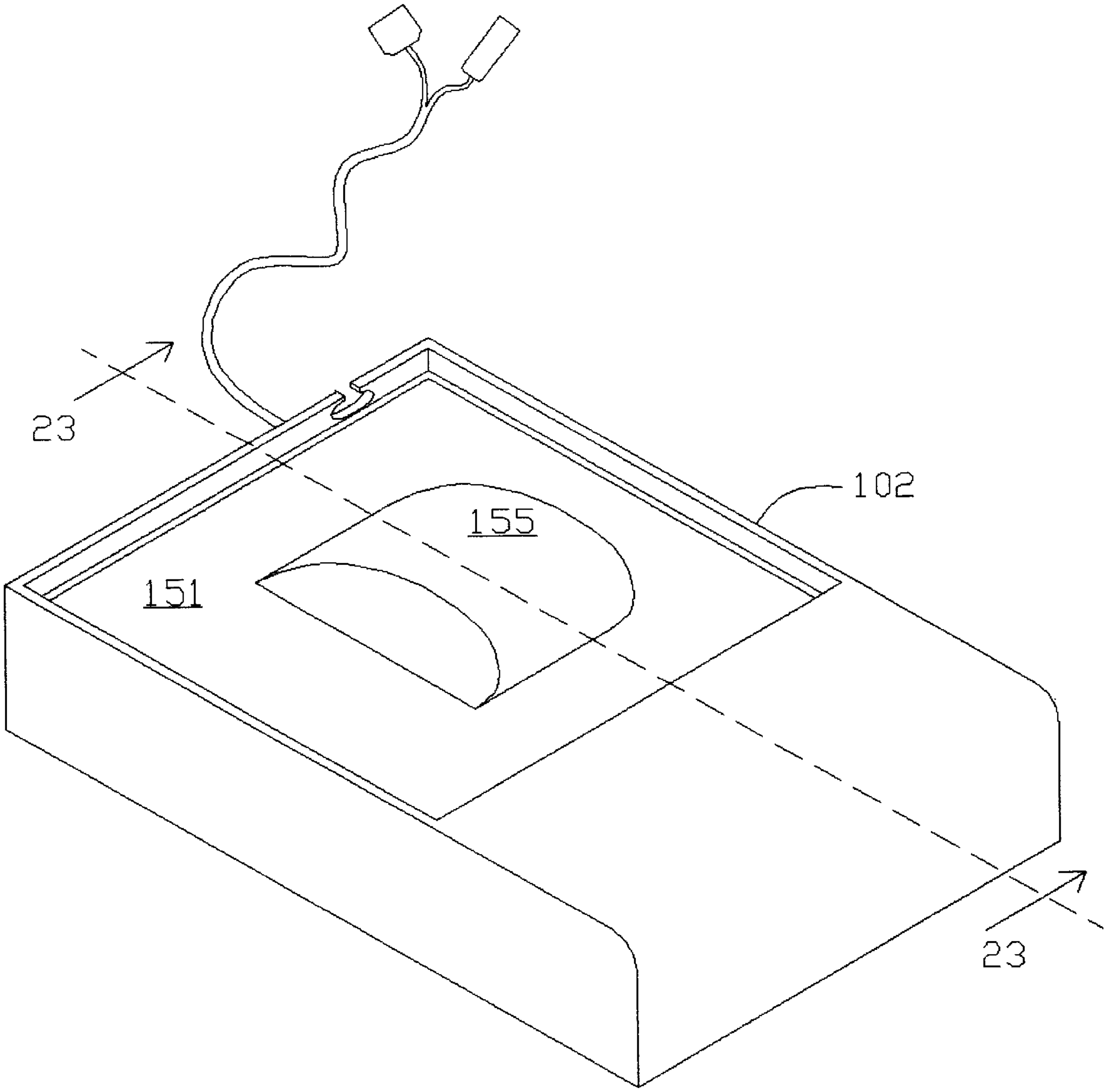
FIG. 22 is a perspective view of a tailless mouse module.

FIG. 22 shows a perspective view of a mouse 155 to be used with platform 151 and mouse link 153 (not shown).

Figure 23:
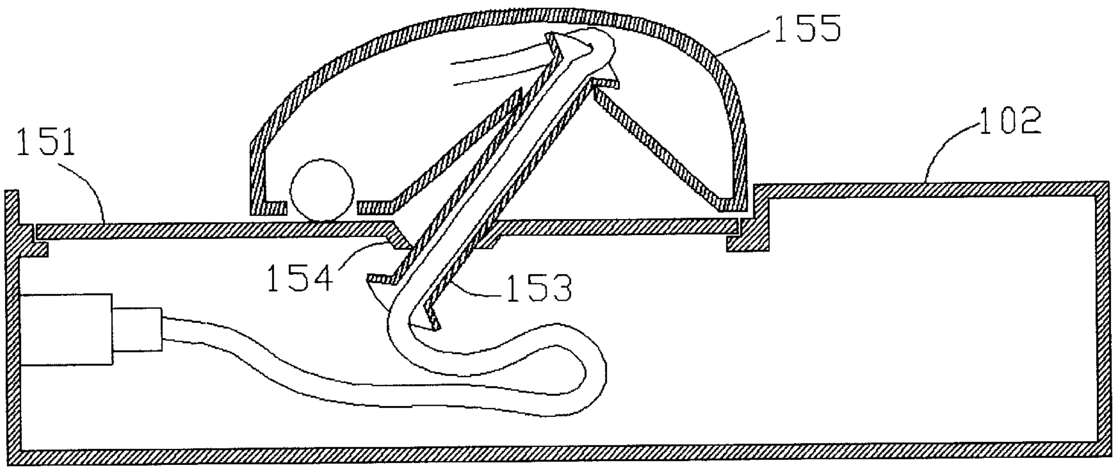
FIG. 23 is a section view of a tailless mouse module taken along line 23—23 in FIG. 22.
Figure 24:
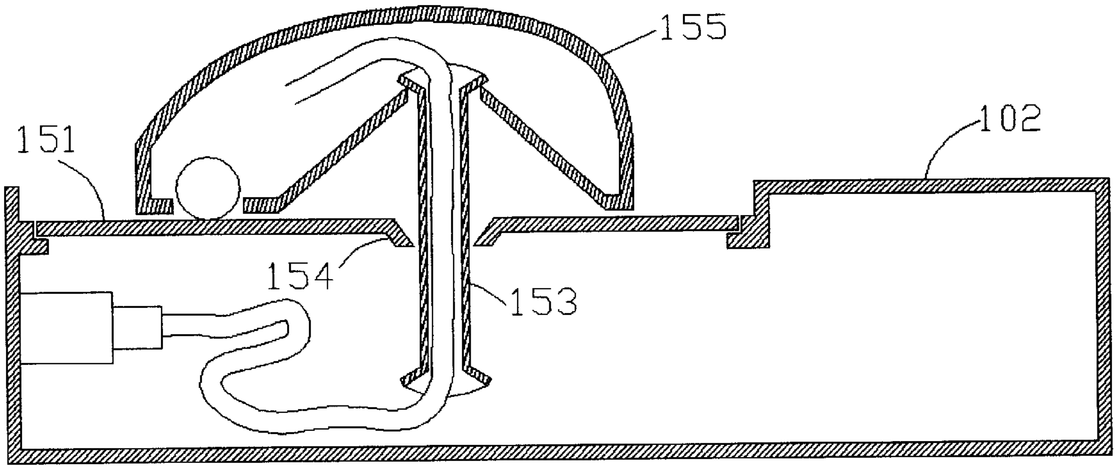
FIG. 24–FIG. 25 are section views showing a tailless mouse moving forward on a mouse station.
Figure 25:
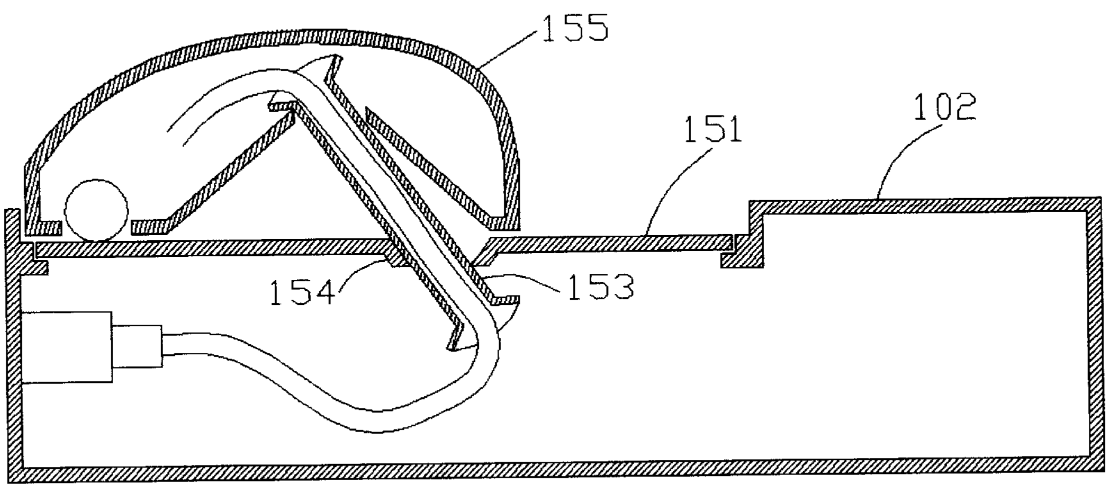
Figure 26:
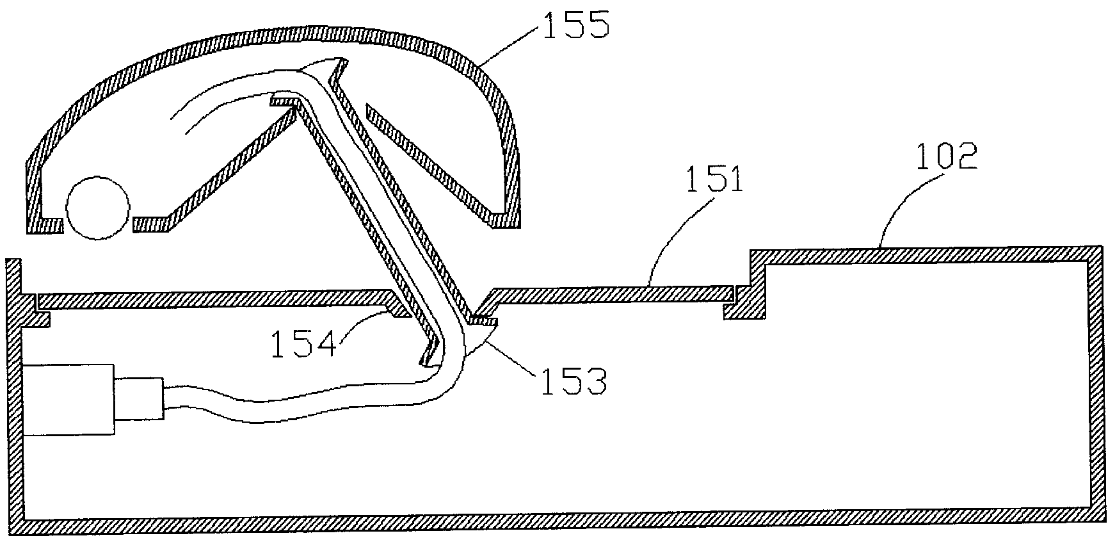
FIG. 26 is a section view showing a tailless mouse moving upward on a mouse station.

FIG. 23 to FIG. 26 illustrate how mouse 155 designed for use with platform 151 and mouse links 152 or 153 on mouse station 102 may be moved along the forward and up directions. Similarly, mouse 155 may be moved left or right (not shown). In FIG. 23, mouse 155 rests near the bottom edge of platform 151. FIG. 24 shows the mouse being moved to near the centre of platform 151 and FIG. 25 to near the top edge of platform 151. FIG. 26 shows the mouse 155 may be lifted up a distance from platform 151. Because the ends of mouse link 153 are wider and thus cannot be taken out of the mouse bottom nor the platform hole, the mouse is thus locked with the mouse station. Note that, the mouse platform should also be locked (not shown) to the mouse station, if the mouse and mouse platform are required to resist from strong pulling force.

Figure 27:
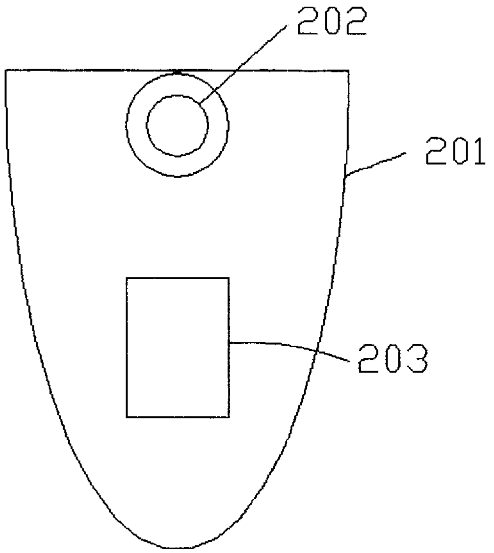
FIG. 27 is a bottom view of one design of a tailless mouse bottom.
Figure 28:
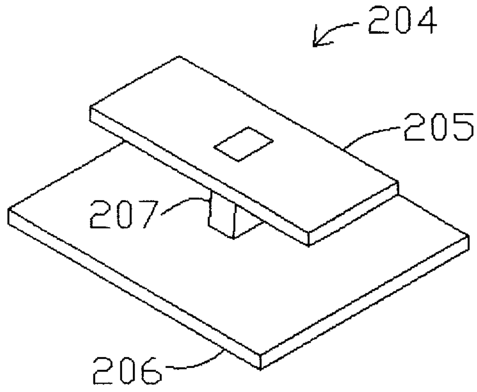
FIG. 28 is a perspective view of a mouse link.
Figure 29:
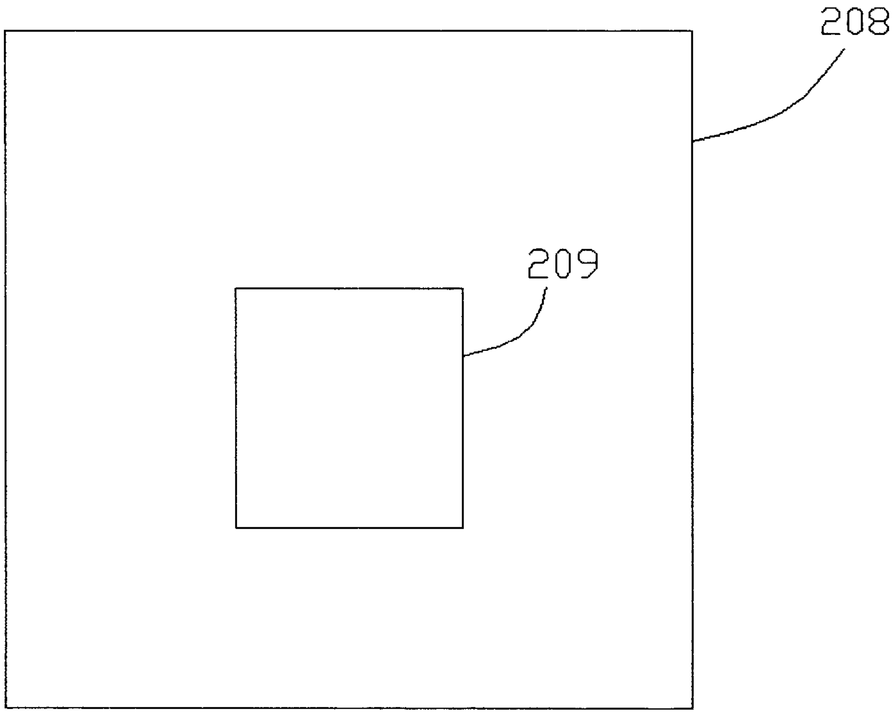
FIG. 29 is a top view of a platform surface.

FIG. 27 shows the bottom view of one design of a mouse 201. In this design, the mouse movement sensor 202 is located near the top edge of the mouse bottom. And there is a rectangular hole 203 located around the centre of the mouse bottom. FIG. 28 shows the perspective view of a mouse link 204 for use with mouse 201. Mouse Link 204 is I-shaped with 2 flat plates 205 and 206 at the ends and a hollow tube 207 in between. FIG. 29 shows a platform 208 for use with mouse 201 and mouse link 204. Platform 208 has a square hole 209 around the centre of the platform.

Figure 30:
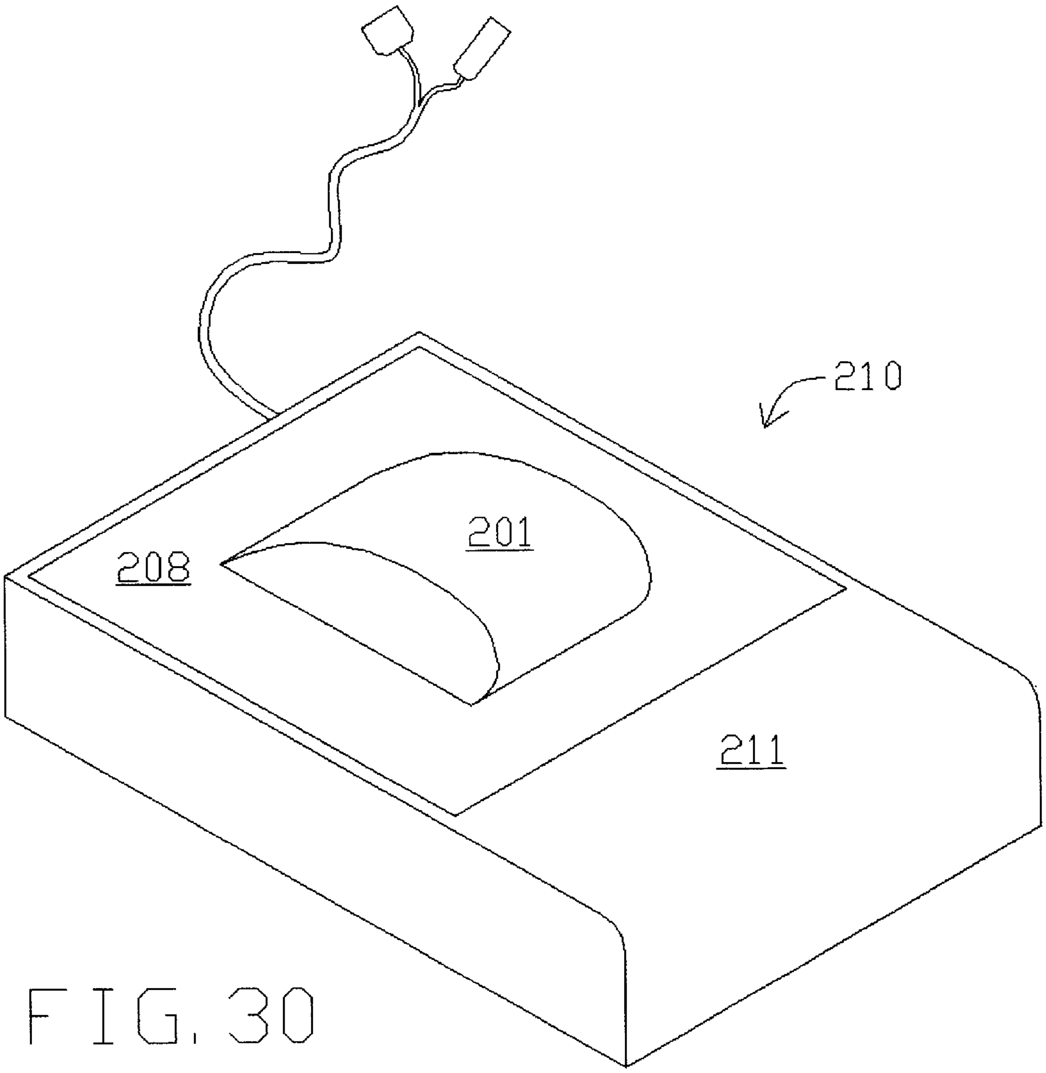
FIG. 30 is a perspective view of a tailless mouse module.

FIG. 30 shows the perspective view of mouse 201 used with platform 208 and mouse link 204 (not shown) on mouse station 210. Mouse station 210 has platform 208 placed at the same level with wrist support 211.

Figure 31:
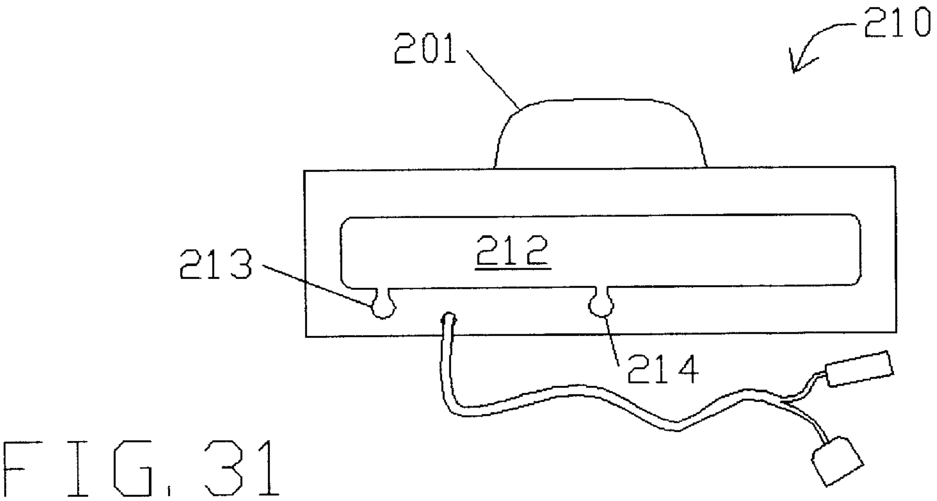
FIG. 31 is a rear view of tailless mouse module in FIG. 30.

FIG. 31 shows the rear view of mouse 201 and mouse station 210. There is an opening 212 to allow cables of external devices such as a computer keyboard to pass into the mouse station. The notch 213 may also be used to hold the cable of an external device, and the notch 214 may be used to hold the cord of a conventional mouse when which is used with the mouse station 210.

Figure 32:
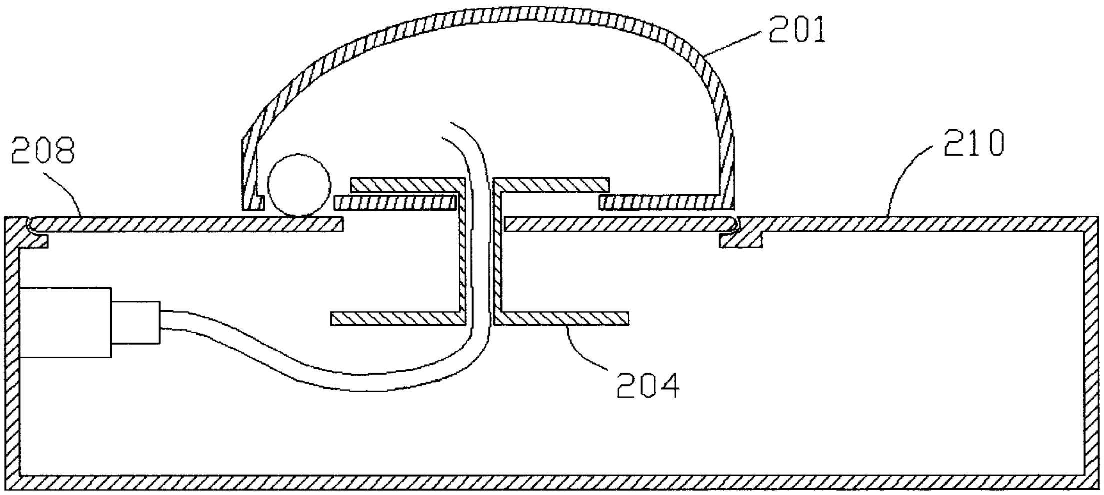
FIG. 32–FIG. 34 are section views showing tailless mouse in FIG. 30 moving forward on a mouse station.
Figure 33:
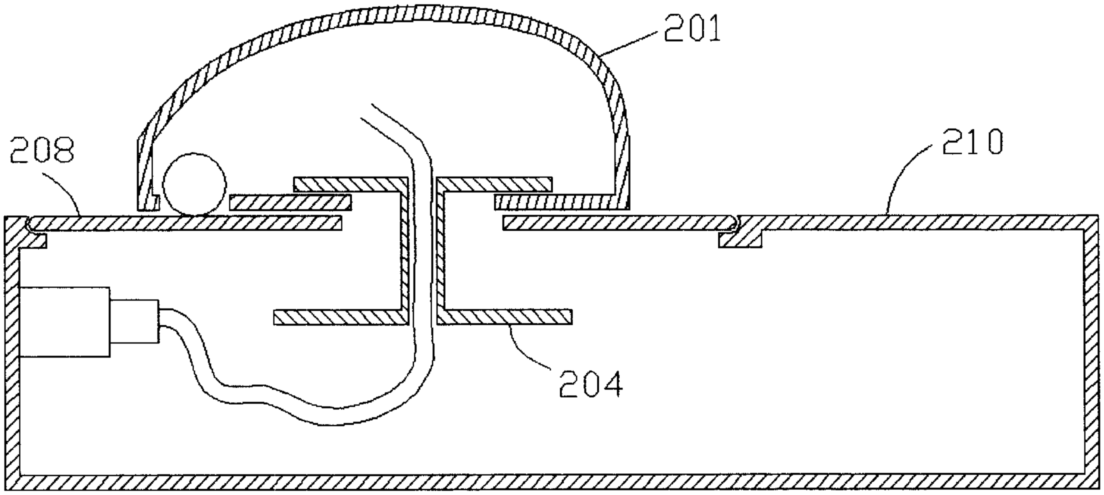
Figure 34:
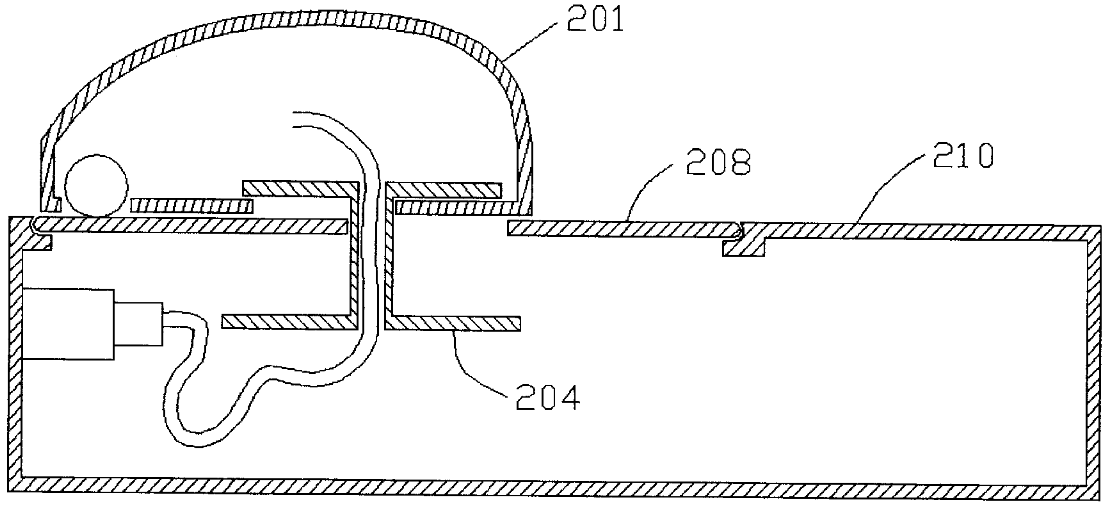

FIG. 32 to FIG. 35 illustrate how mouse 201 may be moved forward and up on platform 208 with mouse link 204. Similarly, mouse 201 may be moved left or right (not shown). In FIG. 32, mouse 201 rests near the bottom edge of platform 208. In FIG. 33, mouse 201 is moved to around the centre of platform 208, and in FIG. 34, mouse 201 is moved to near the top edge of platform 208.

Figure 35:
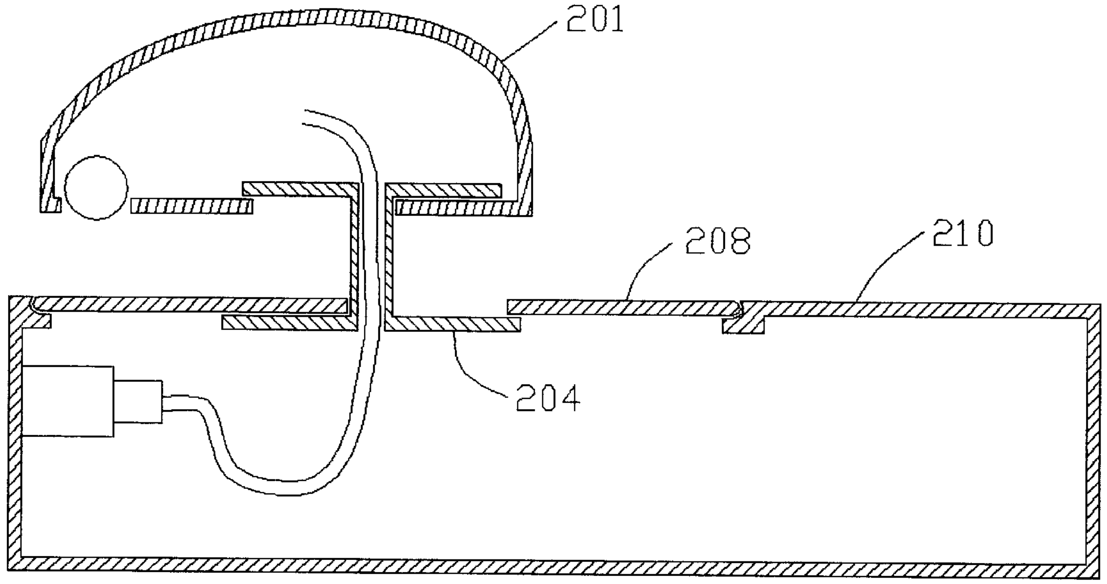
FIG. 35 is a section view showing tailless mouse in FIG. 30 moving upward on a mouse station.

In FIG. 35, mouse 201 is lifted upward. In this design, mouse link 204 has one end freely moveable within the mouse bottom cavity 203 in any direction, and another end freely Moveable within the platform hole 209 also in any direction.

Figure 36:
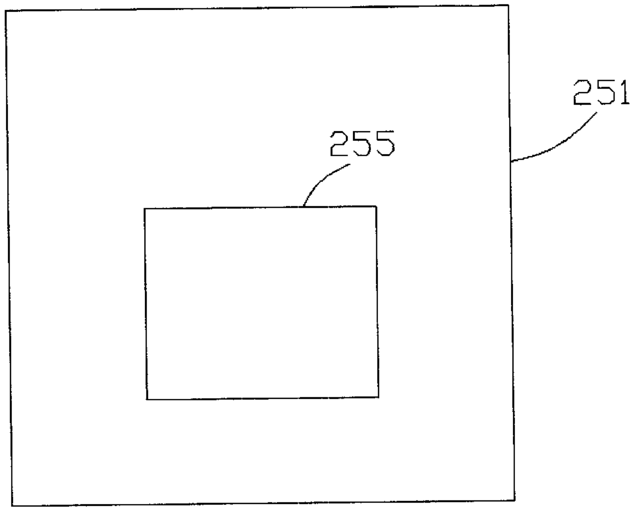
FIG. 36 is a top view of a platform surface.
Figure 37:
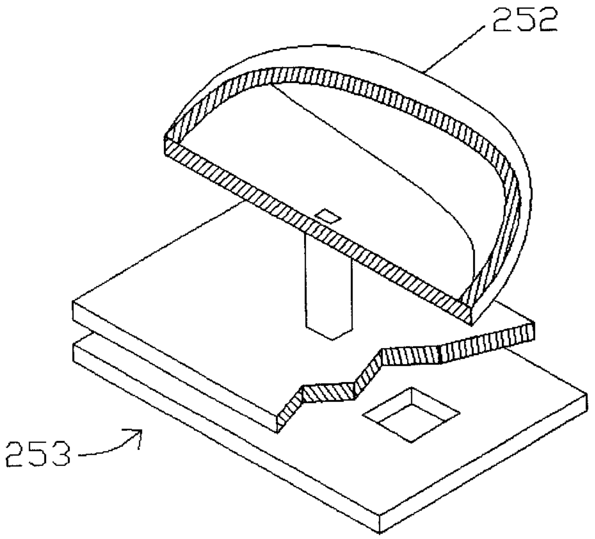
FIG. 37 is a perspective view of a tailless mouse.
Figure 38:
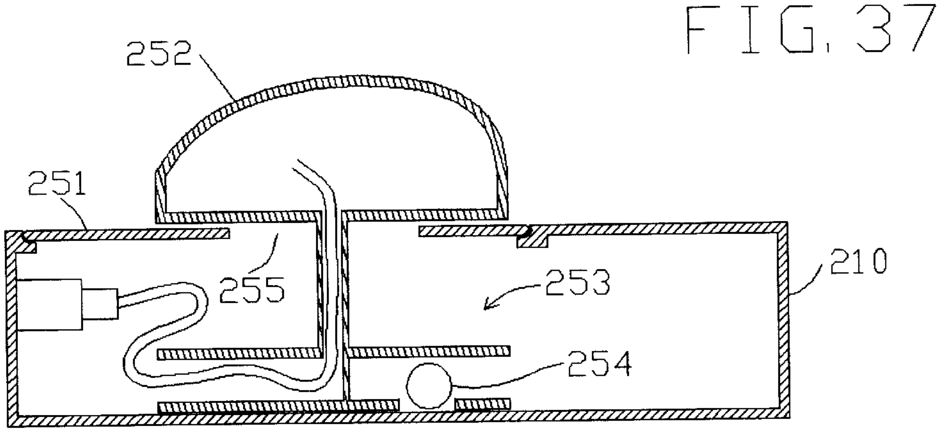
FIG. 38 is a section view of tailless mouse in FIG. 37 resting on a mouse station.

FIG. 36 shows a platform 251 to be used with mouse 252 shown in FIG. 37. Platform 251 also has a rectangular hole around the centre of the platform. Mouse 252 has an inverted T-shape mouse link 253 secured underneath mouse 252. A movement sensor 254 is secured to the mouse link as shown in FIG. 38. In this design of the present invention, there is no mouse bottom cavity. Mouse link 253 has one end capable of moving in any direction within the cavity formed by the platform hole 255. In other words, mouse 252 may be moved in any direction over the platform 251 including being lifted upwards.

On the other hand, another design may be to reverse the locations of the mouse link 253 and platform hole 255. That is, the platform hole 255 would be found on the bottom of mouse 252 thus making a mouse bottom cavity. And the mouse link 253 would be secured to the surface of platform 251. This design would be similar to invert FIG. 38 upside down. In this way, the mouse (the mouse station 210 in FIG. 38) would be able to move in any direction over the platform (the mouse bottom surface of mouse 252 in FIG. 38) provided that the boundary of the mouse bottom cavity (the platform hole 255 in FIG. 38) is allowed to move without hitting the mouse link. Also noted in this design is that there is no platform hole on the platform surface. This reviews that the cavity where the communication means passes through or the mouse link moves around may be provided by either the mouse bottom or the mouse station, or both.

Figure 39:
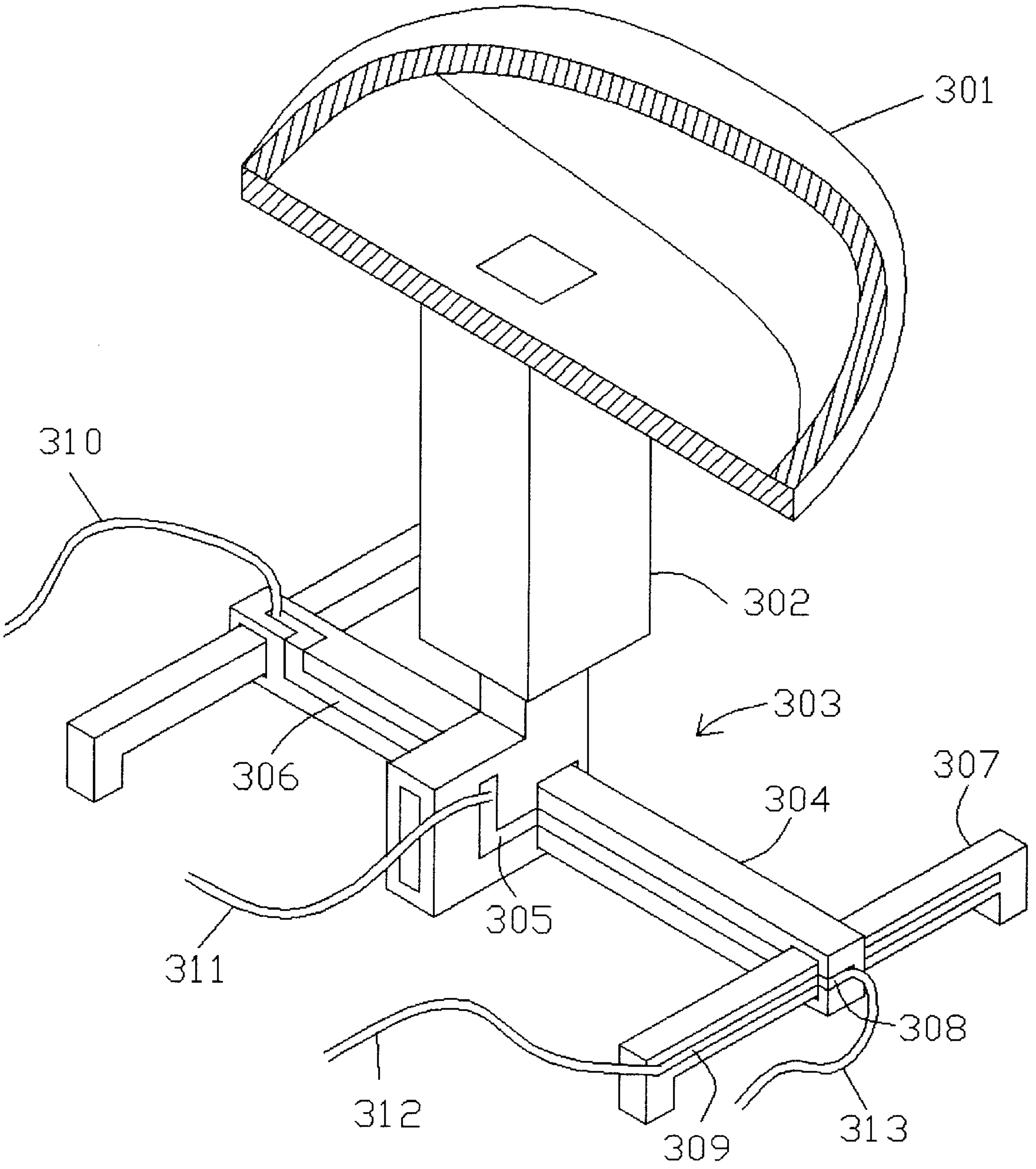
FIG. 39 is a perspective view of one design of a mouse link.

FIG. 39 shows a mouse 301 underneath which has secured a mouse link 302. It also includes a mouse position sensor 303. When the mouse 301 moves along axle 304, the position of contact of plate 305 with plate 306 will vary and thus change the electrical resistance of the circuit from 310 to 306 to 305 and to 311. Such change of electrical resistance can be detected by another sensor to determine the position of mouse 301 along the direction of axle 304. Similarly, when the position of mouse 301 along the direction of axle 307 may be determined by the change of contact between plate 308 and 309 using the circuit from 312 to 309 to 308 and to 313.

Figure 40:
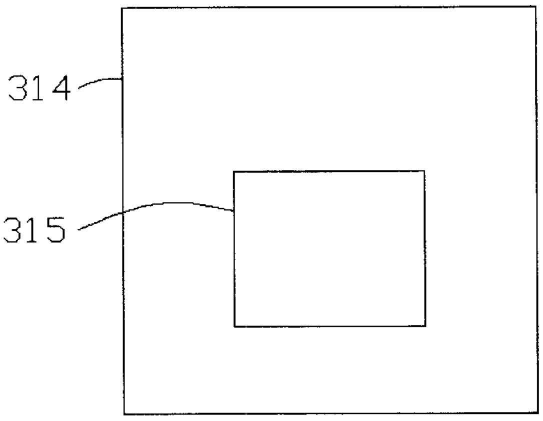
FIG. 40 is a top view of one design of a platform surface.

FIG. 40 shows the top view of platform 314 to be used with mouse 301. Platform 314 has a rectangular opening 315 around the centre of the platform.

Figure 41:
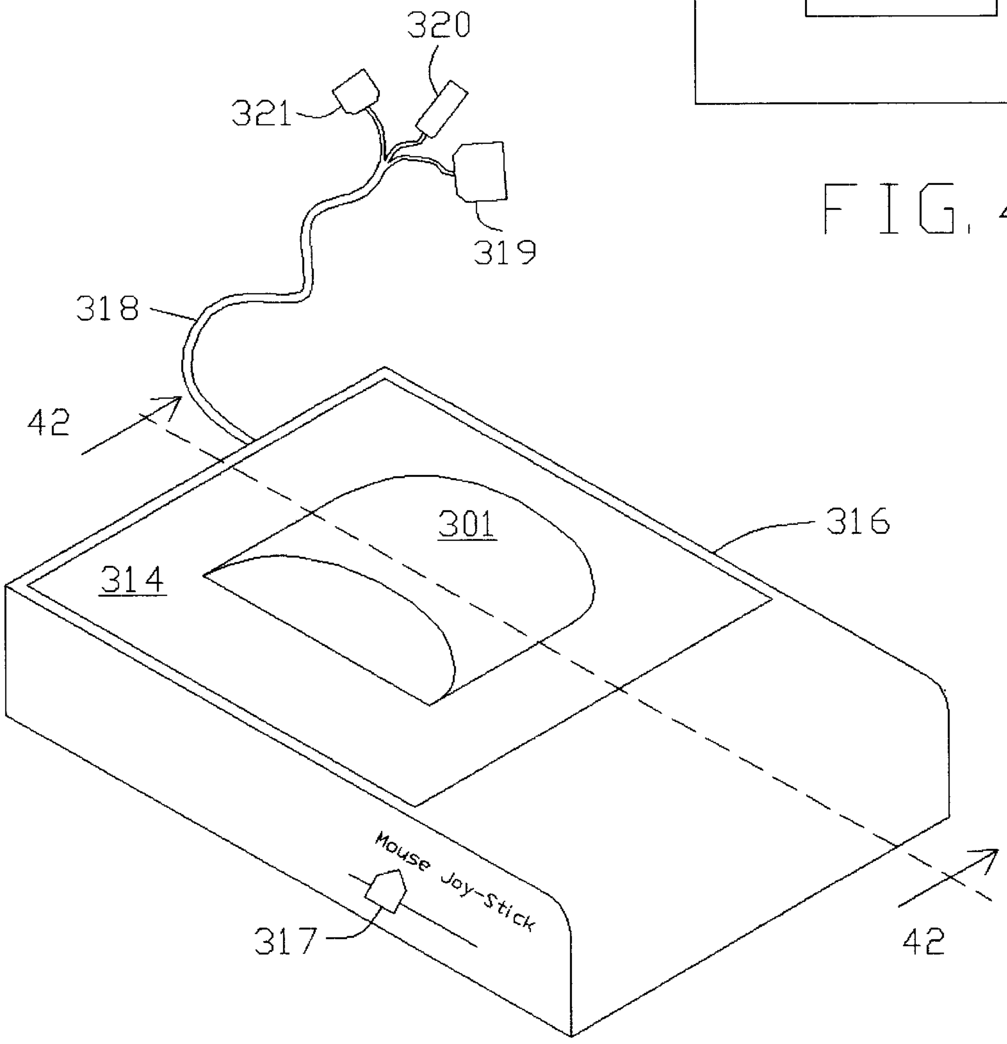
FIG. 41 is a perspective view of a tailless mouse module.

FIG. 41 shows a perspective view of mouse 301 resting on platform 314 on mouse station 316 which has a switch 317. The sensor 303 can generate continuous and absolute positional signals and thus mouse 301 may also be used as a joystick. Switch 317 is used to select the device between a computer mouse and joystick. Also, the outgoing end of cable 318 is divided into 3 plugs 319, 320 and 321. Socket 319 conveys signals generated by the device when which is, selected as a joystick. Socket 320 conveys signals of an external device that connects with the device. And socket 321 conveys signals generated by the device when which is selected as a computer mouse.

Figure 42:
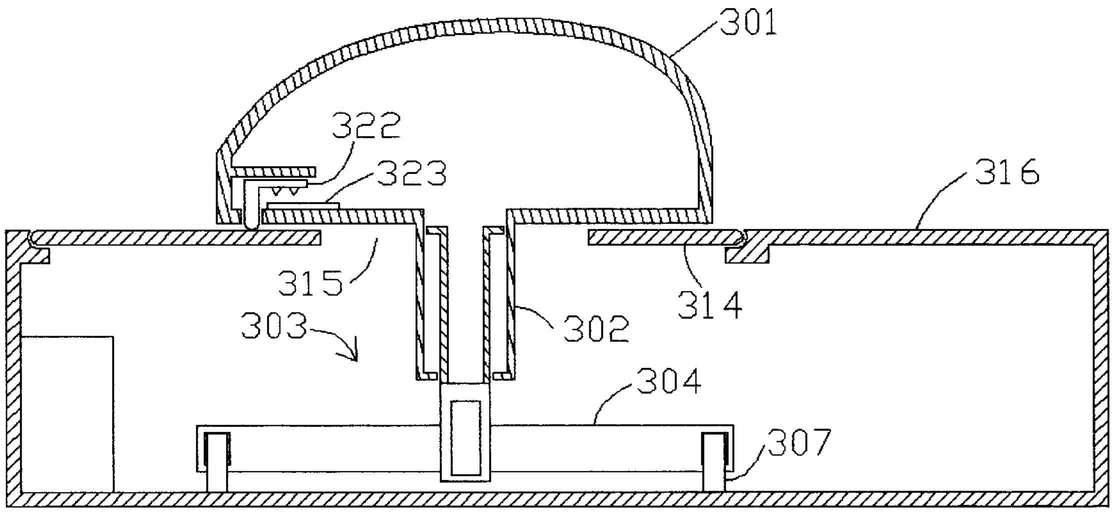
FIG. 42 is a section view of tailless mouse module taken along line 42—42 of FIG. 41.
Figure 43:
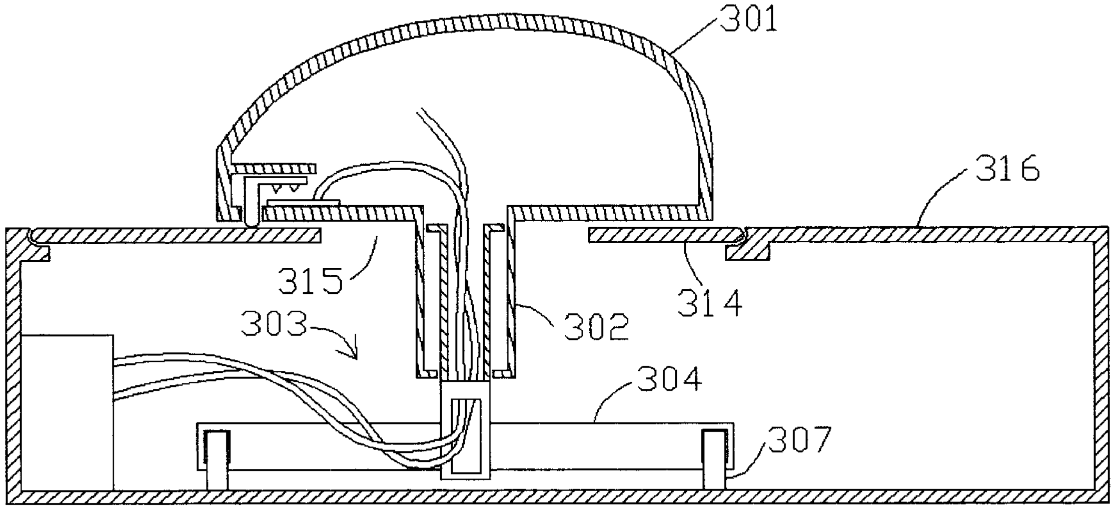
FIG. 43 is another section view of tailless mouse module in FIG. 41.

FIG. 42 and 43 shows the cross-sectional views taken from line 42 of FIG. 41. FIG. 42 reviews that a sensor unit 322 is equipped on the bottom of mouse 301. Sensor unit 322 is used to detect when mouse 301 is lifted up platform 314, in which case sensor unit 322 will fall downwards touching plate 323. A circuitry on plate 323 can thus be activated to inform the device that the mouse is lifted up. FIG. 43 depicts how communication wires can go from the mouse 301 through mouse link 303 into mouse station 316.

Figure 44:
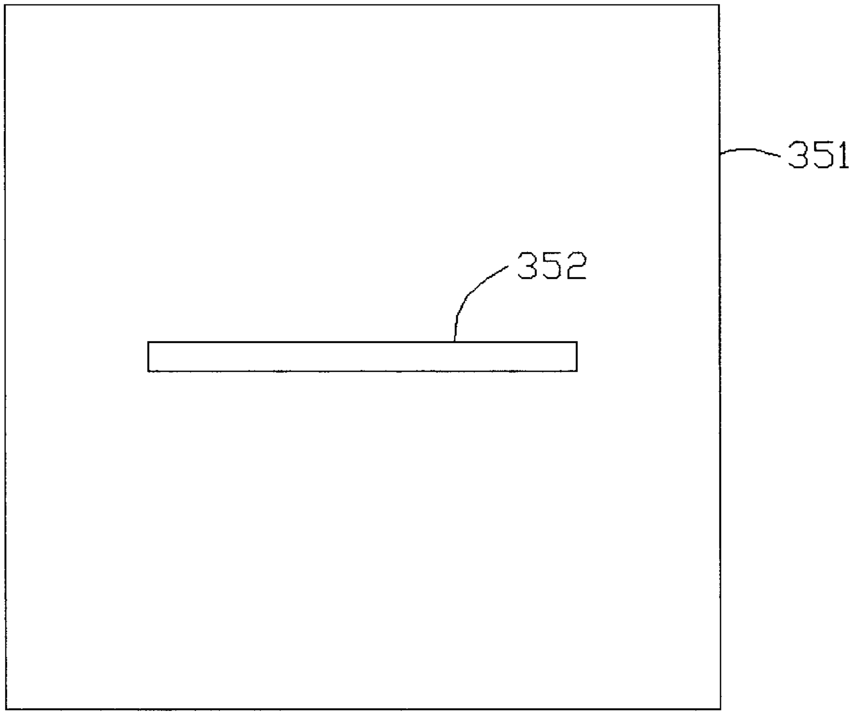
FIG. 44 is one design of a platform surface.
Figure 45:
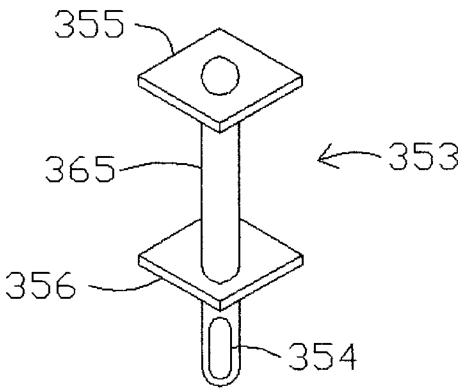
FIG. 45 is one design of a mouse link.
Figure 46:
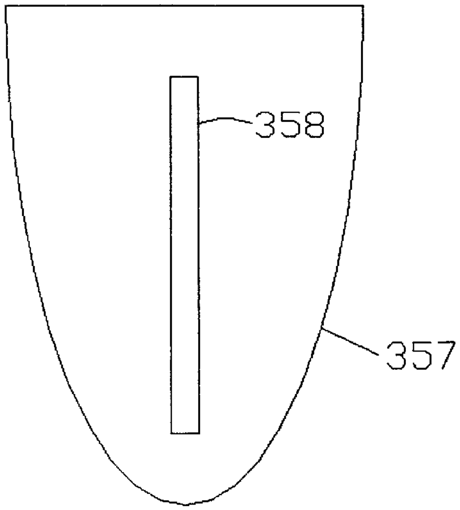
FIG. 46 is one design of the bottom of a tailless mouse.

FIG. 44 shows the top view of a platform 351 with a narrow rectangular opening 352 near the centre of the platform. FIG. 45 shows an I-shape mouse link 353 that has one end with a plate 355 and the other end with an opening 354. A second plate 356 is secured near the end with the opening. A hollow tube 365 connects the plates 355 and 356. FIG. 46 shows the bottom view of a mouse 357 that has a narrow rectangular opening 358 near the centre of the bottom.

Figure 47:
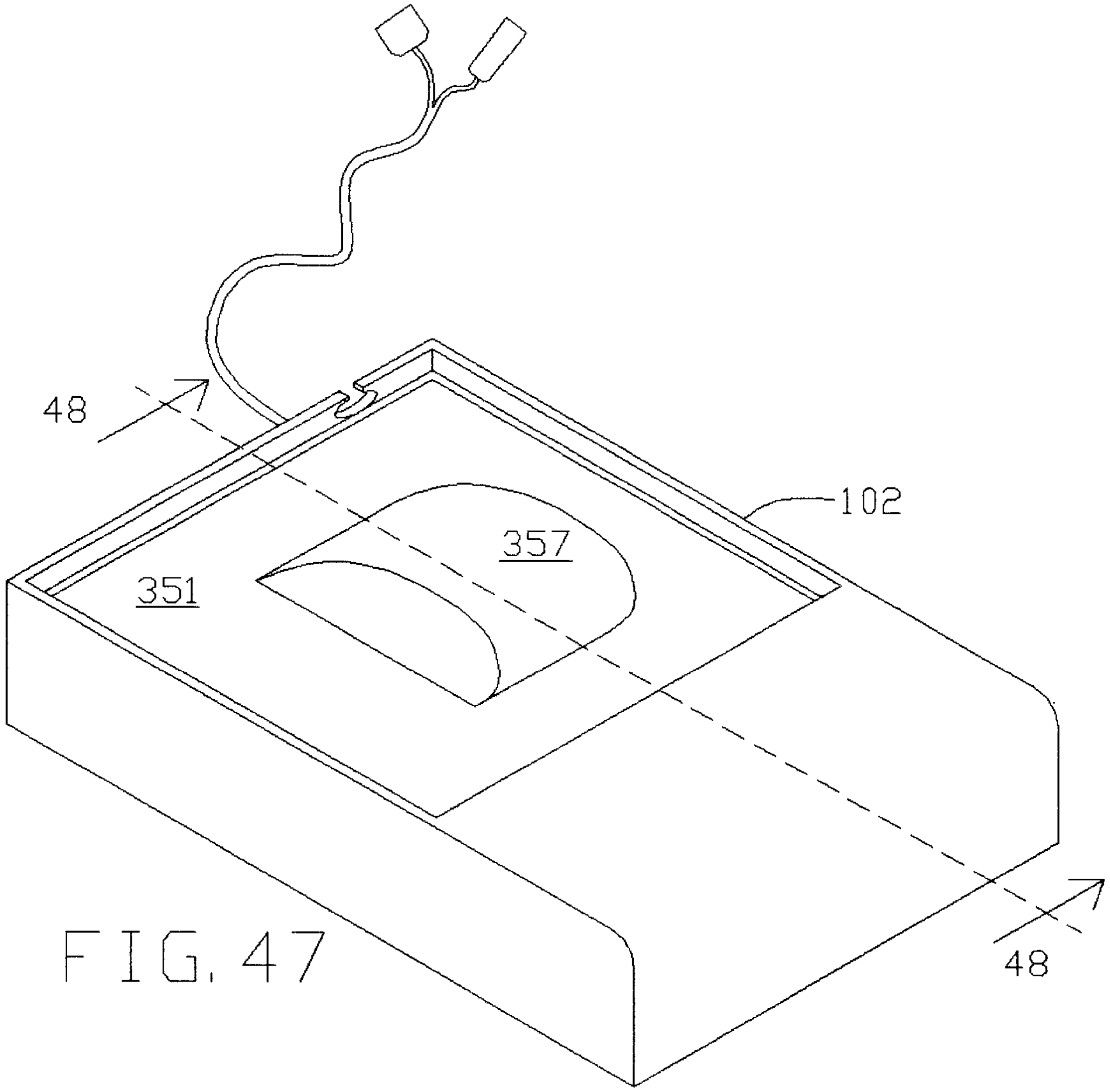
FIG. 47 is a perspective view of a tailless mouse module.
Figure 48:
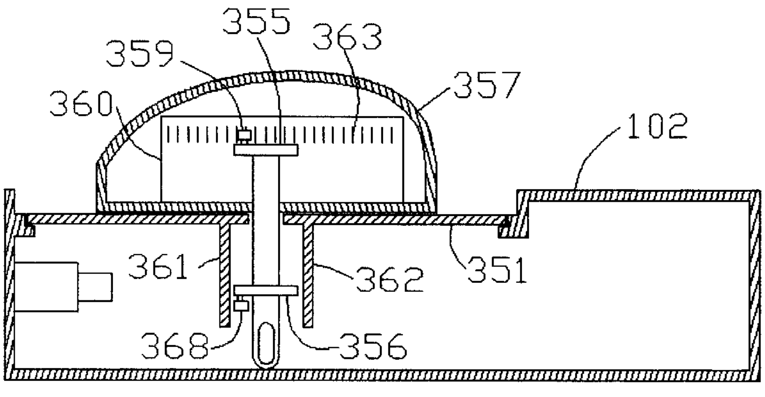
FIG. 48 is a section view taken along line 48—48 in FIG. 47 showing a link member with sensing components.

FIG. 47 shows a perspective view of mouse 357 resting on platform 351 on mouse station 102 with mouse link 353 (not shown). FIG. 48 shows the perspective view taken at line 48 of FIG. 47. In also depicts 2 optical sensors 359 and 368 secured on plates 355 and 356 respectively. Within mouse 357, there is a wall 360 on which is marked with optical marks 363 to be read by sensor 359. There are also 2 walls 361 and 362 extended from underneath platform 351. Optical marks (not shown) are marked on 361 to be read by sensor 368. Instead of optical sensor, other sensor such as similar to the one shown in FIG. 39 may be used.

Figure 49:
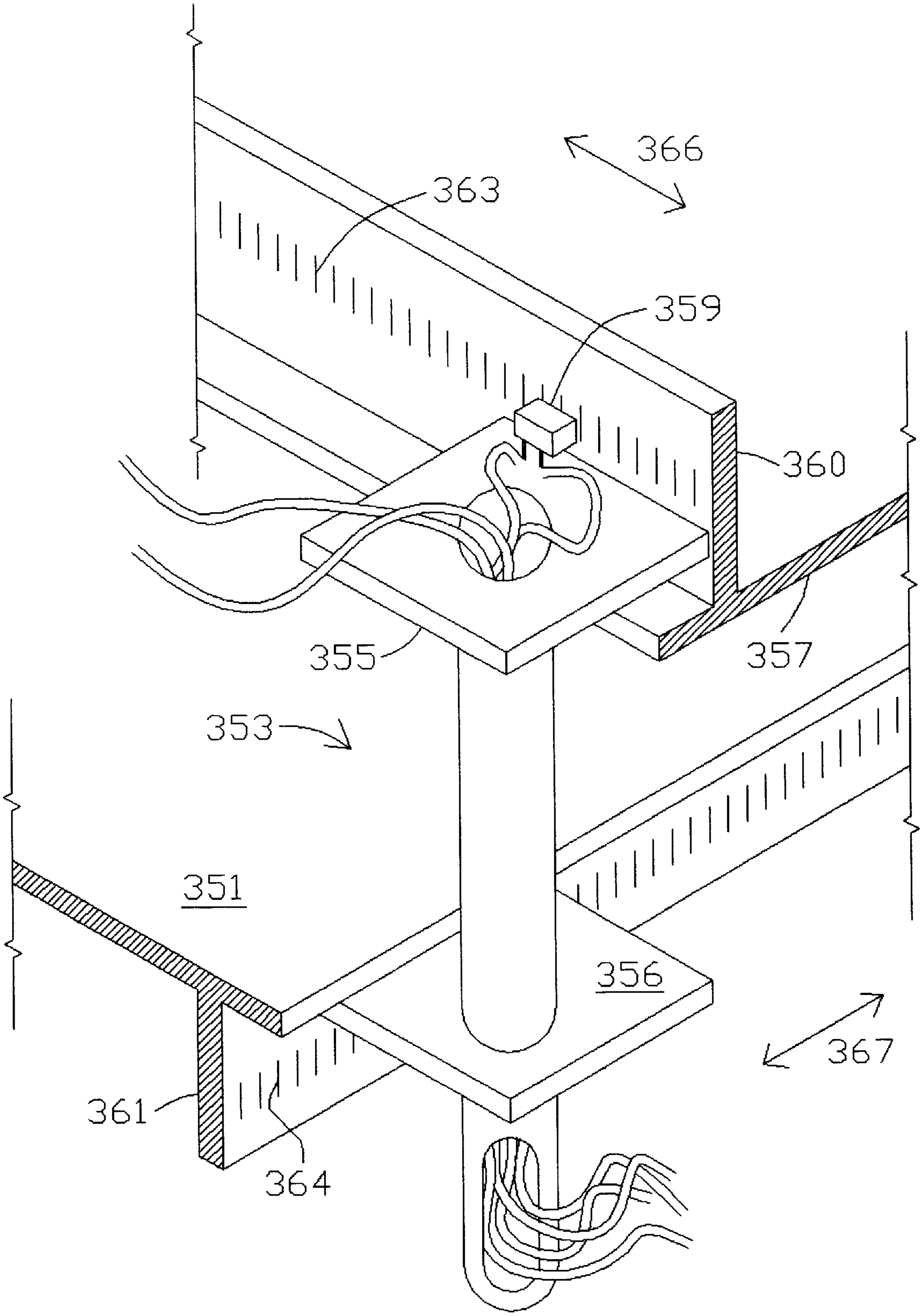
FIG. 49 is a perspective view of a link member inside a mouse bottom and platform surface.

FIG. 49 is a portion of the expanded perspective view of mouse link 353 within mouse 357 and mouse station 102 showing how mouse link 353 can move in the cavities formed by opening 358 on the bottom of mouse 357 and opening 352 on platform 351. The mouse bottom shown at the upper portion of the figure can be moved along the directions identified by the arrows 366 relative to mouse link 353. And the bottom of mouse 357 together with mouse link 353 can be moved along the directions identified by the arrows 367 relative to the surface of platform 351 shown at the bottom portion of the figure.

Figure 50:
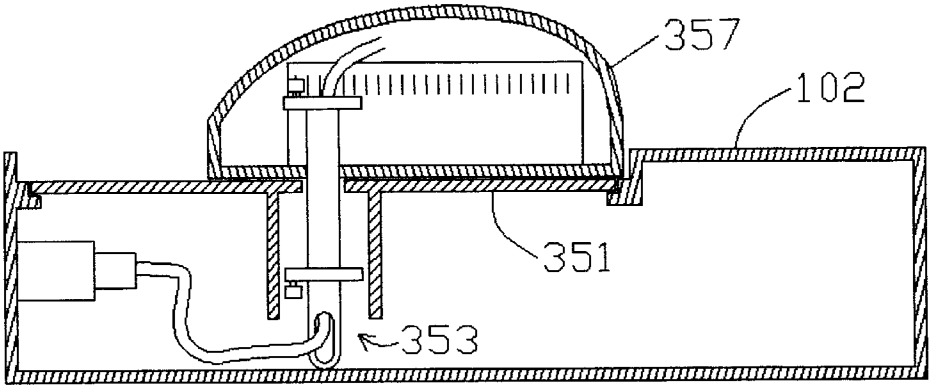
FIG. 50–FIG. 51 are section views showing a tailless mouse using link member in FIG. 49 moving forward on a platform surface.
Figure 51:
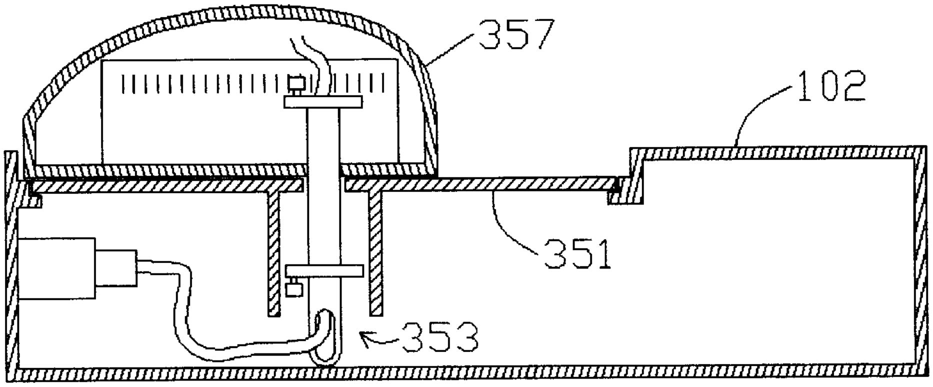
Figure 52:
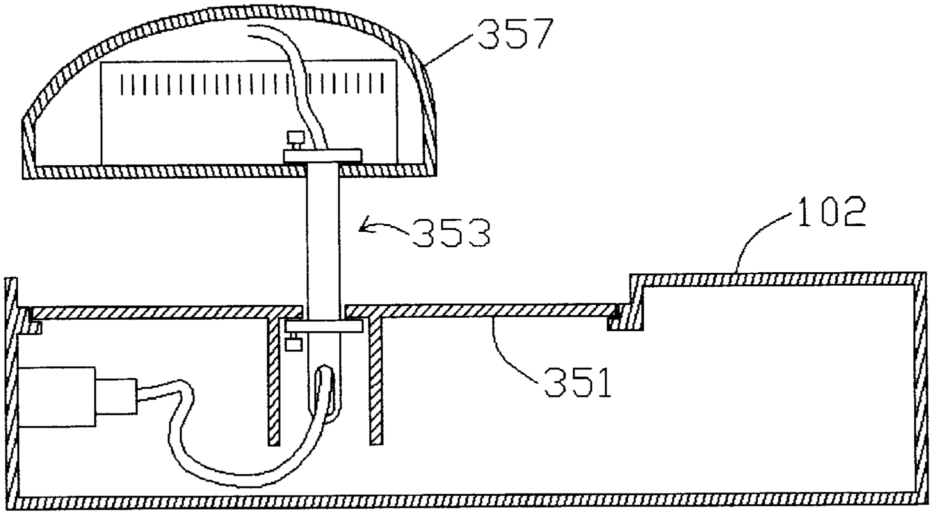
FIG. 52 is a section view showing a tailless mouse using link member in FIG. 49 moving upward on a platform surface.

FIG. 50 to FIG. 52 show the cross-sectional views taken in the same way as FIG. 48 which is along line 48 on FIG. 47. They further describe how mouse 357 may be moved along the opening 358 on the bottom of the mouse, as well as lifted up the platform 351. Similarly (not shown), mouse 357 together with mouse link 353 may move along the opening 352 on platform 351. In effect, mouse 357 can be moved freely in all directions coplanar to the surface of platform 351, as well as being lifted upwards. FIG. 50 shows mouse 357 at a position near the bottom edge of platform 351. FIG. 51 shows mouse 357 is moved to near the top edge of platform 351. And FIG. 52 shows mouse 357 is lifted up from the platform 351. When mouse 357 is lifted up, the optical sensors are automatically disabled because they no longer can read the optical images.

Figure 53:
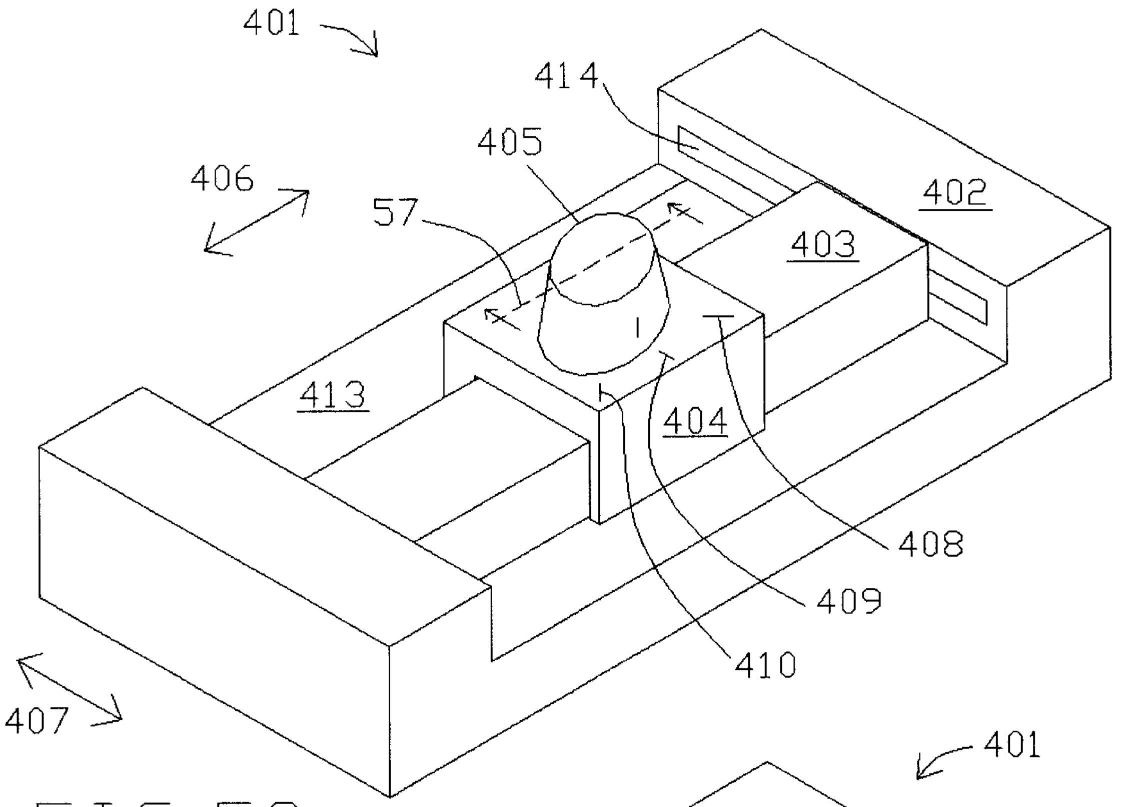
FIG. 53 is a perspective view showing one design of a position encoder system in the present invention.

FIG. 53 shows one embodiment of a positional decoder 401 in the present invention. It consists of a mouse station 402 on which a slide switch 403 may slide in one dimension along the opening 414. A second slide switch 404 may slide in a second dimension over slide switch 403. A rotary button 405 is mounted on slide switch 404. An user may hold rotary button 405 and move it along the directions identified by arrows 406 and 407, thereby moving rotary button 405 in any direction coplanar to the plane 413 of mouse station 402. Sensors (not shown) such as that described in FIG. 39 may be built into the device to detect the positions of slide switches 403 and 404, thereby producing positional information along 2 dimensions. Rotary button 405 can be pressed, which can be detected such as by means of making contact with unit 411 shown in FIG. 54 and thus connecting a circuit. Rotary button 405 may also be lifted upward slightly, which can also be detected such as by means of losing contact with unit 411 and thus disconnecting a circuit. Rotary button 405 may be rotated in clockwise and anti-clockwise directions thereby generating rotational information in both directions to a host computer. Rotary button 405 may be also rotated to point at 3 positions labelled as 408, 409 and 410. When rotary button 405 is pressed, depending on the position it points, it will generate different signals that would correspond to mouse buttons on conventional computer mouse. And when rotary button 405 is lifted upwards slightly, the device will disable itself and not generate any signals, which would correspond to a conventional computer mouse being lifted up. Thus, an user may lift rotary button 405 up and then move it to a desired position over surface 413 without generating any signals.

A second approach would be to make the opening 414 wider so that portion of the slide switch 403 may move in and out the opening 414 at the direction shown as arrows 406. In this design, slide switch 403 would be able to move in 2 dimensions, that is the arrows 406 and 407, within the cavity 414. And thus the slide switch 404 would not be needed. However, this approach would increase the size of the base station 402 in order to allow the slide switch 403 to move in and out.

Figure 54:
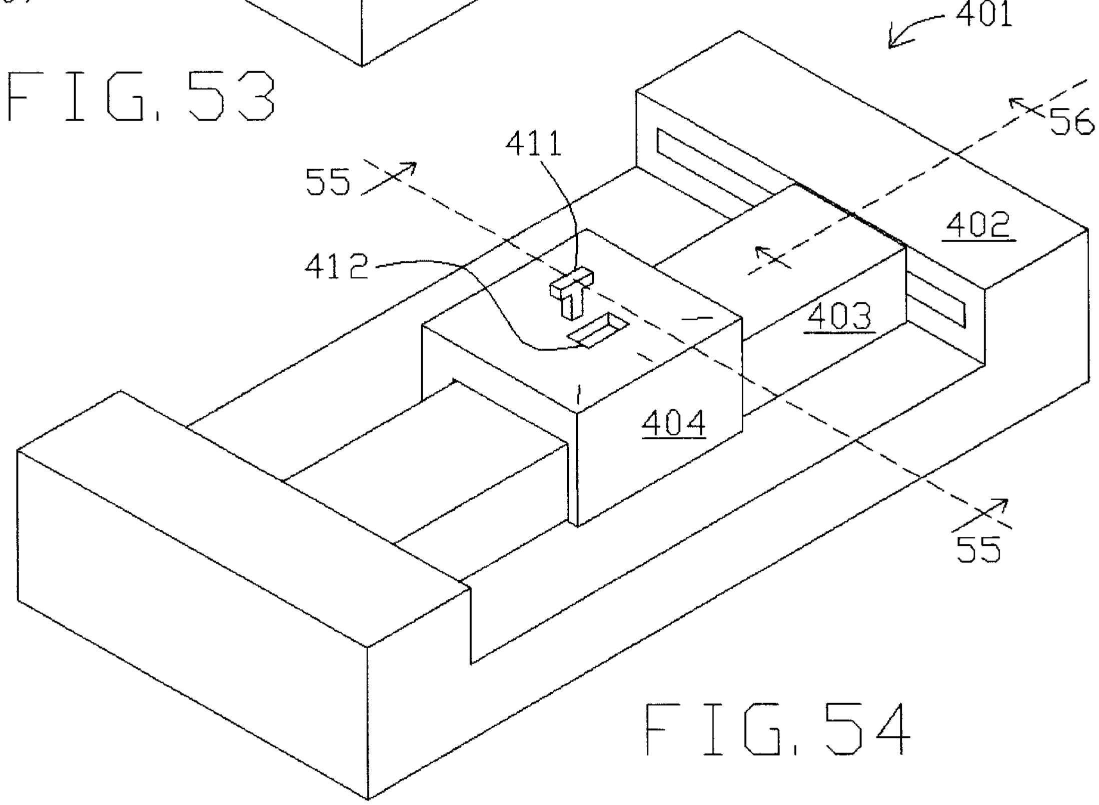
FIG. 54 is another perspective view of position encoder in FIG. 53 with a member removed.

FIG. 54 depicts the same view as FIG. 53 but with the rotary button 405 removed. It shows a T-shaped unit 411 mounted on slide switch 404. The T-shaped unit 411 enables rotary button 405 to rotate as well as move upwards and downwards slightly. An opening 412 allows signals to be carried from rotary button 405 into slide switch 404.

In this design of the present invention, the handle is the rotary button 405 and the housing is the mouse station 402. The slide switches 403 and 404 as well as the unit 411 form the mouse link. This design reviews that the opening on a mouse station such as opening 414 does not always have to face upwards.

Figure 55:
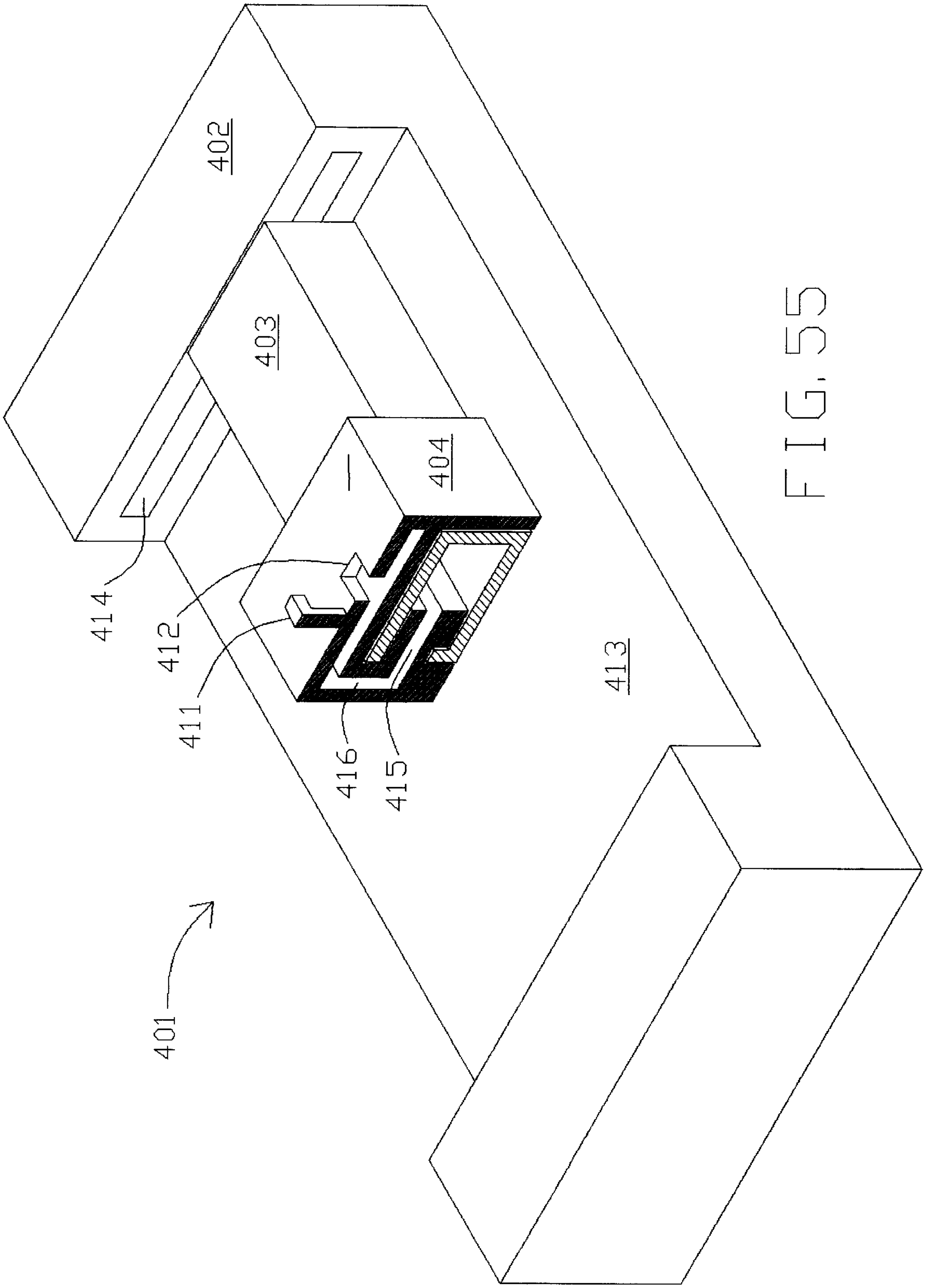
FIG. 55 includes a section view taken along line 55—55 in FIG. 54.

FIG. 55 shows the cross-sectional view of positional decoder 401 taken along line 55 in FIG. 54. It depicts that slide switch 403 has an opening 415 along the back side, and a portion of slide switch 404 extends into slide switch 403 through opening 415, thus enabling slide switch 404 to be moved along the opening 415. Signals generated by rotary button 405 can be conveyed through opening 412 and cavity 416.

Figure 56:
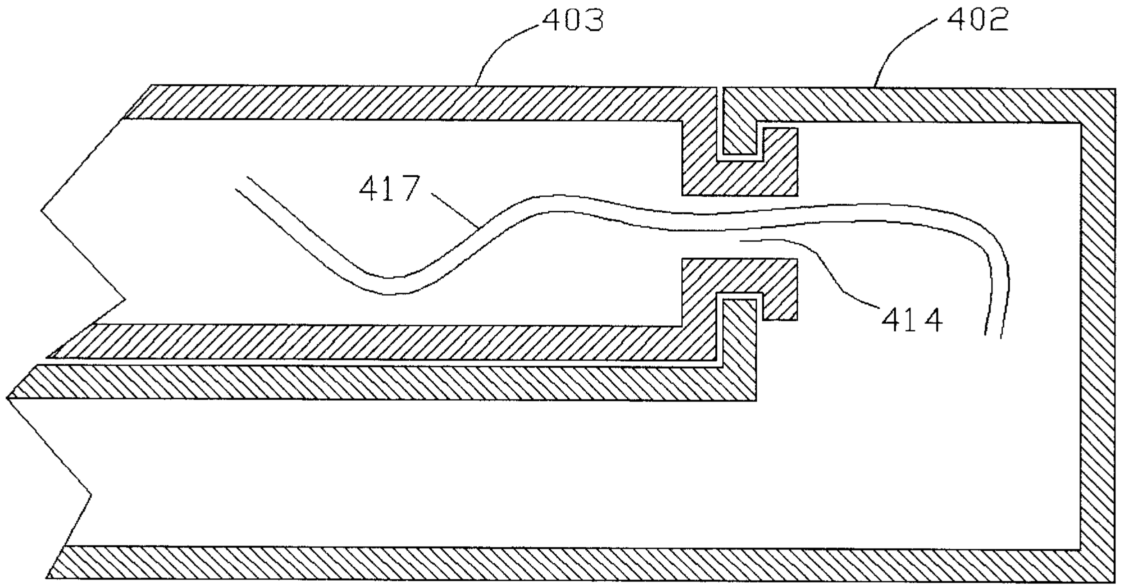
FIG. 56 is a section view taken along line 56—56 in FIG. 54.

FIG. 56 shows the cross-sectional view of slide switch 403 and mouse station 402 taken along line 56 in FIG. 54. It shows that portion of slide switch 403 extends into mouse station 402 and forms a lock allowing slide switch 403 to be moved along opening 414. FIG. 56 also shows how a communication line 417 may pass from slide switch 403 through opening 414 into mouse station 402.

Figure 57:
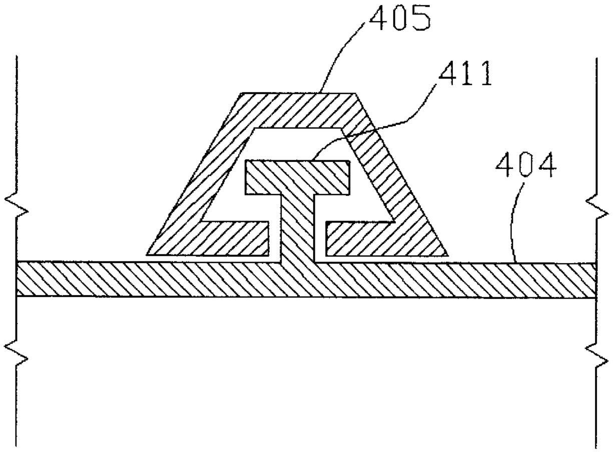
FIG. 57 is a section view taken along line 57—57 in FIG. 53.

FIG. 57 shows the cross-sectional view of rotary button 405 taken along line 57 in FIG. 53. It demonstrates that rotary button 405 may be rotated about, lifted up and down the T-shaped unit 411.

Figure 58:
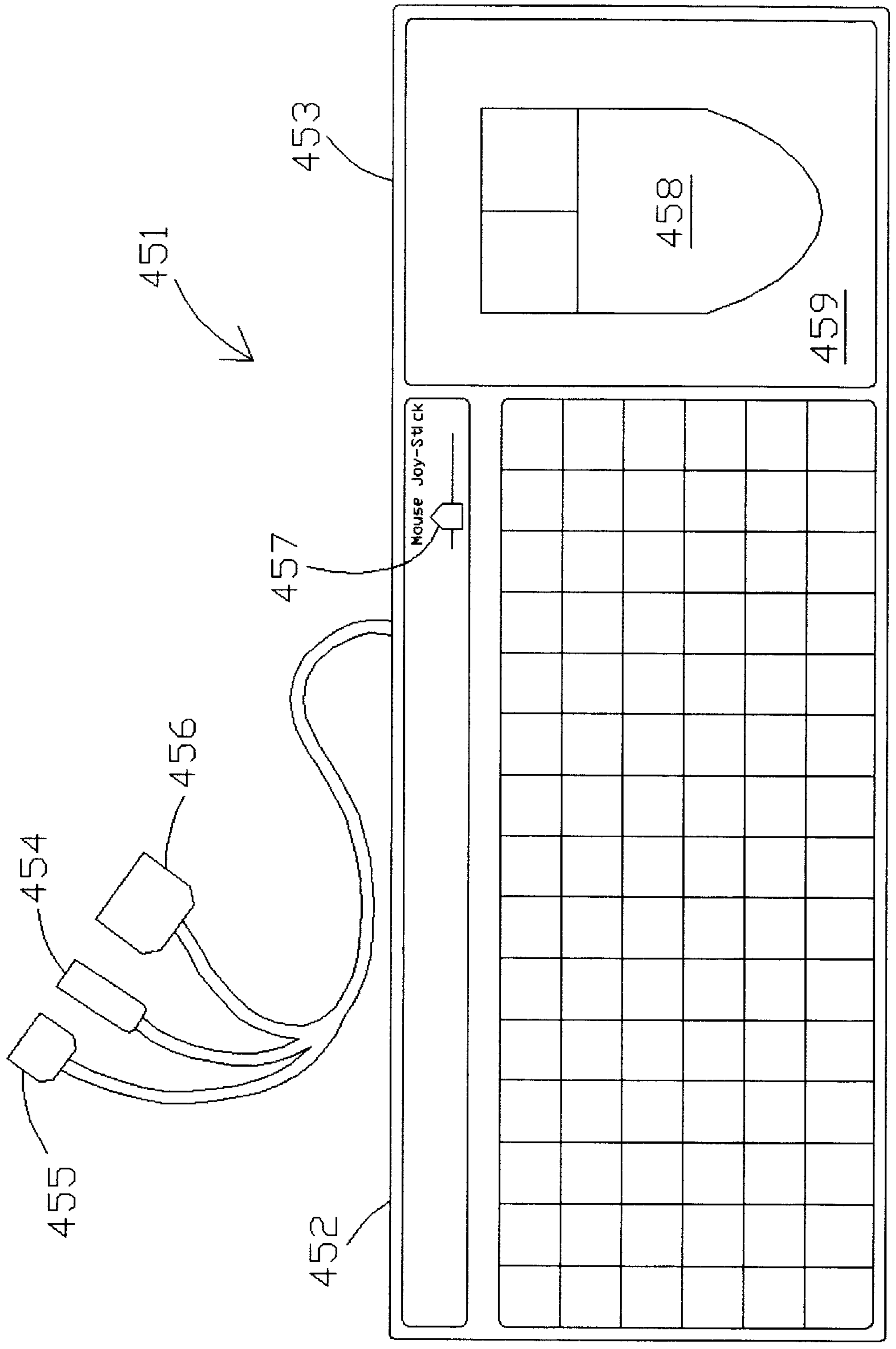
FIG. 58 is a top view of a tailless module integrated with a keyboard.

FIG. 58 depicts the top view of an integrated keyboard 451 consisting an ordinary computer keyboard 452 incorporated with a position decoder 453 of the present invention. Plug 454 is used to transmit signals generated by the keyboard to an external device such as a computer. Plug 455 and 456 are used to transmit signals generated by position decoder 453 when which functions as a computer mouse and joystick respectively. Switch 457 is used to select position decoder 453 as a computer mouse or joystick.

Figure 59:
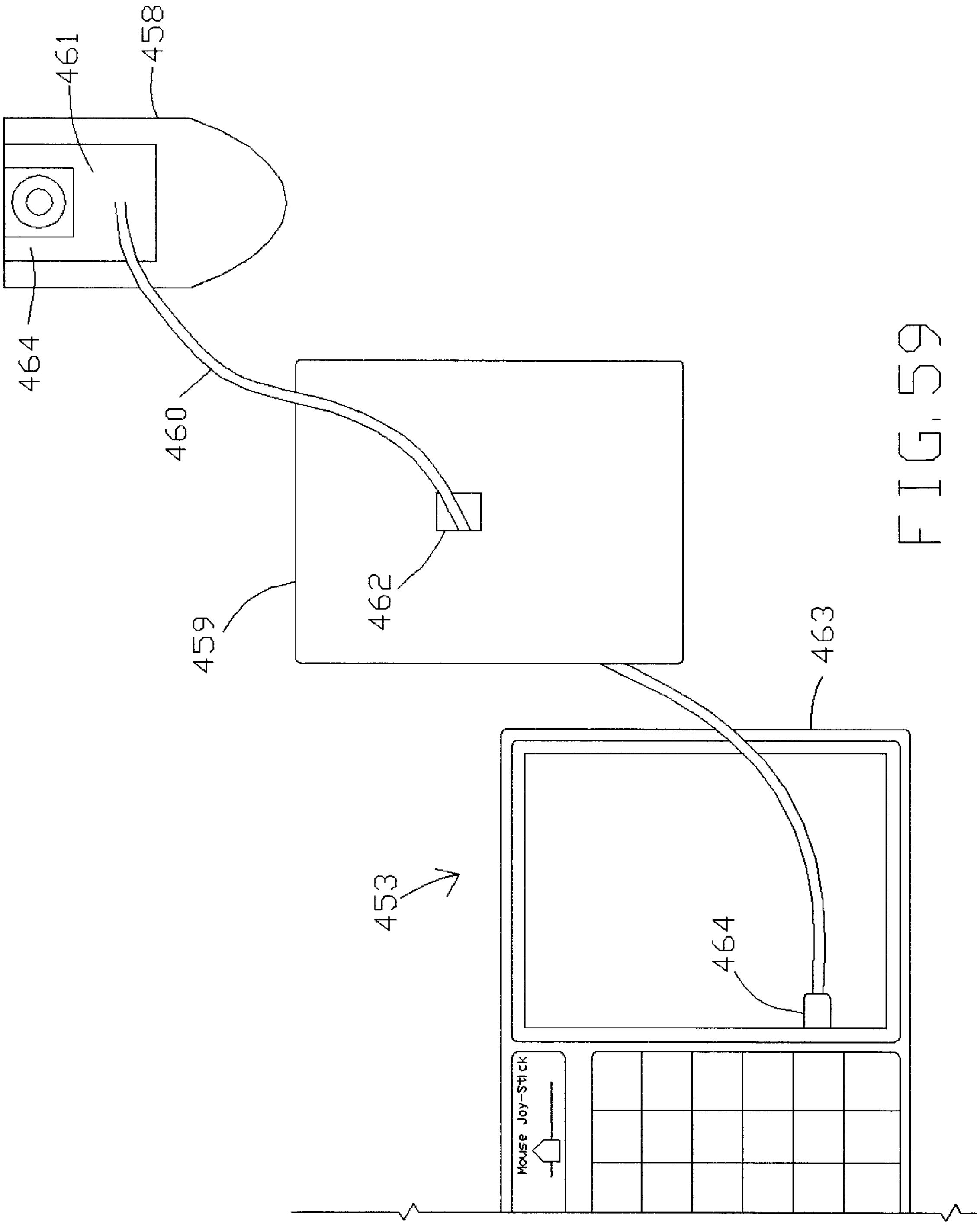
FIG. 59 is another top view of tailless module in FIG. 58.

FIG. 59 shows a communication means 460 extended from mouse bottom cavity 461 passing through platform hole 462 on platform 459 into mouse station 463. The end of communication means 460 is a plug 464 that plugs into the integrated device. It also shows that the bottom of mouse 458 has an opening 464.

Figure 60:
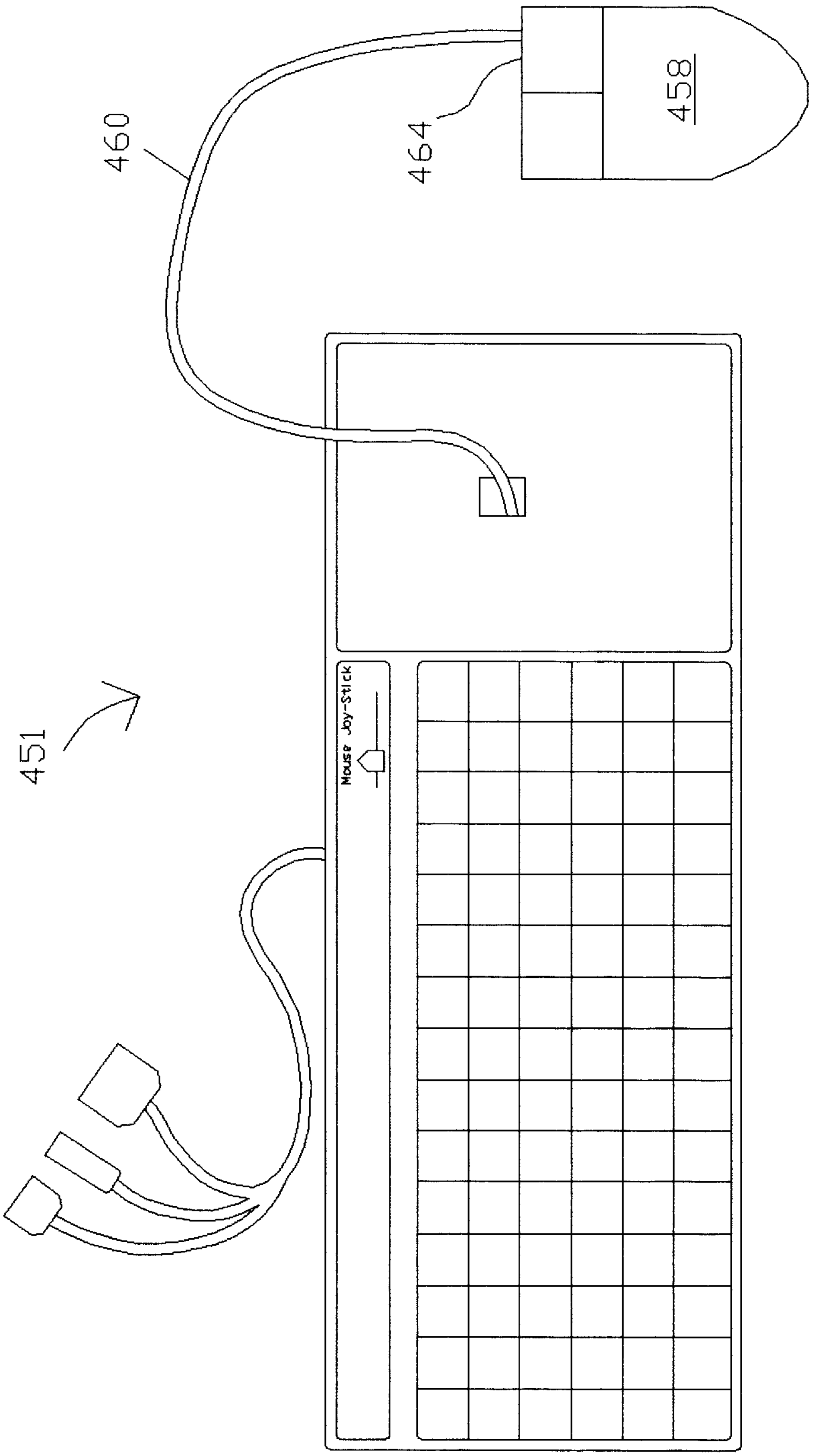
FIG. 60 showing a tailless mouse placed next to a keyboard.

FIG. 60 shows mouse 458 working as a conventional computer mouse by letting communication means 460 goes out from opening 464 on the bottom of the mouse.

Figure 61:
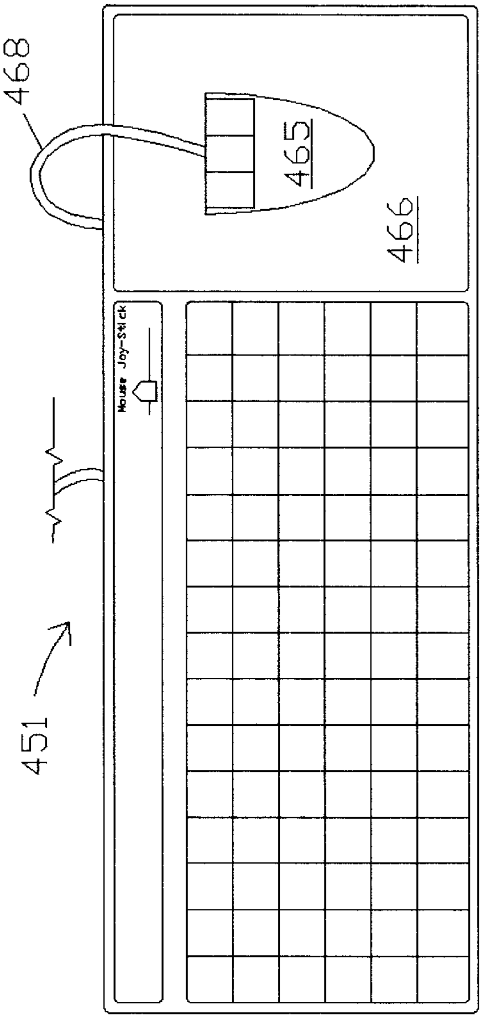
FIG. 61 is a top view of a conventional computer mouse placed on an integrated keyboard and mouse module device.
Figure 62:
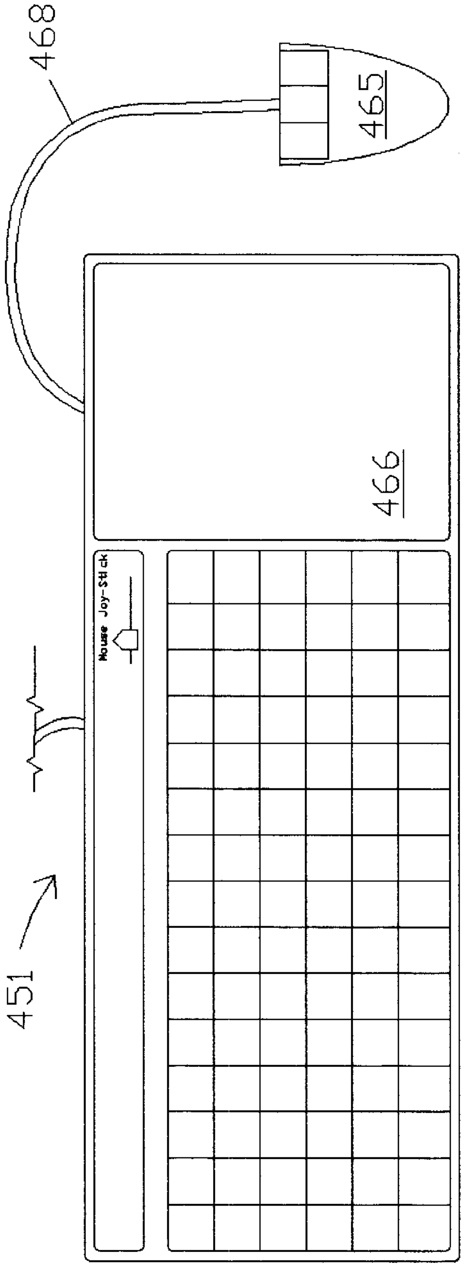
FIG. 62 is a top view when a conventional computer mouse placed next to an integrated keyboard and mouse module device.

FIG. 61 shows a conventional computer mouse 465 using the integrated device 451 with a platform 466 that has no platform hole. FIG. 62 shows computer mouse 465 may also be operated on other surface such as a table.

Figure 63:
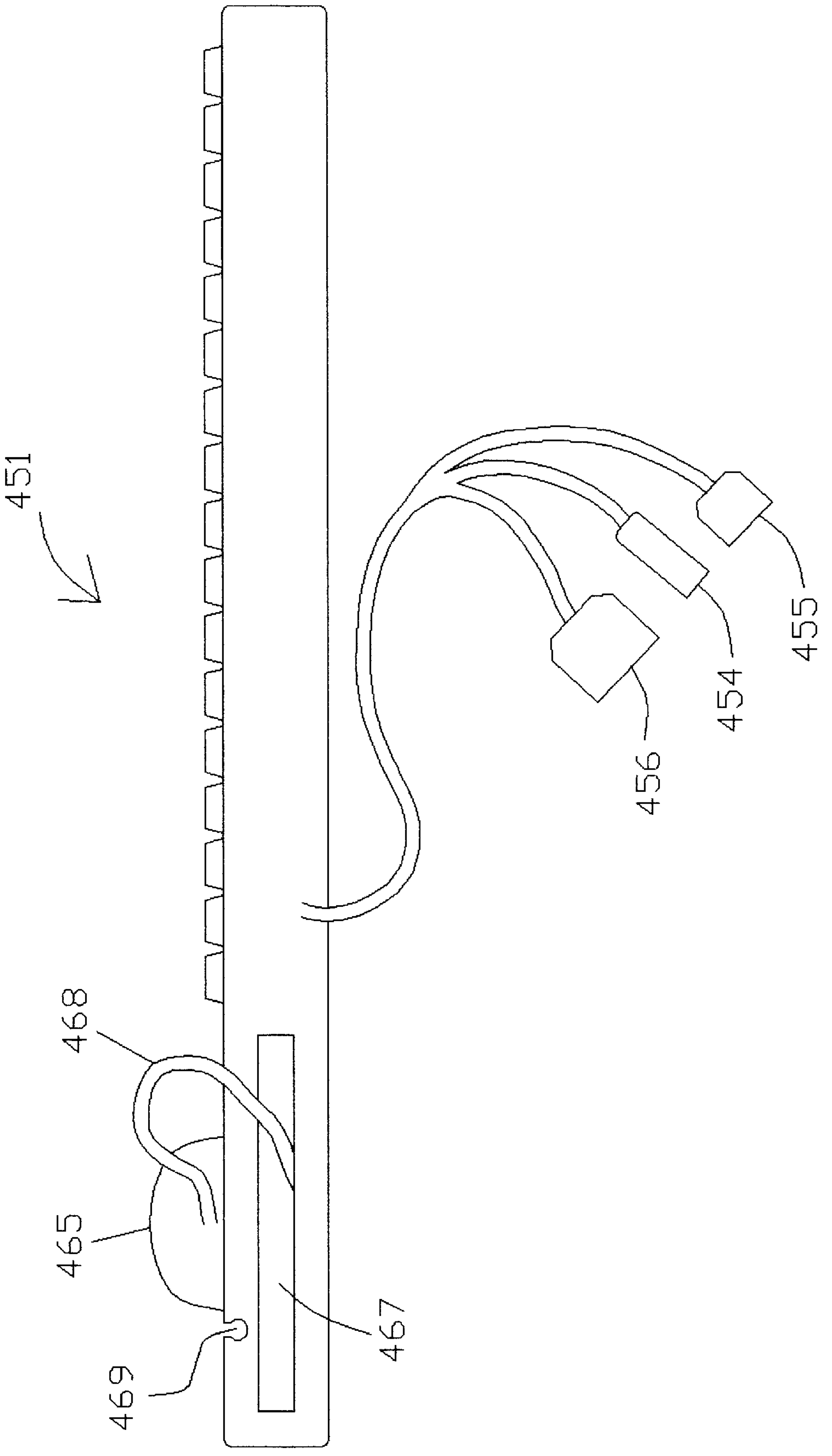
FIG. 63 is a rear view of a tailless mouse module integrated with a keyboard.

FIG. 63 shows the rear view of integrated device 451 with conventional computer mouse 465 having a mouse cord 468 going into the device through an opening 467. A notch 469 may be used to hold mouse cord 468, or communication means 460 as shown in FIG. 60.

Figure 64:
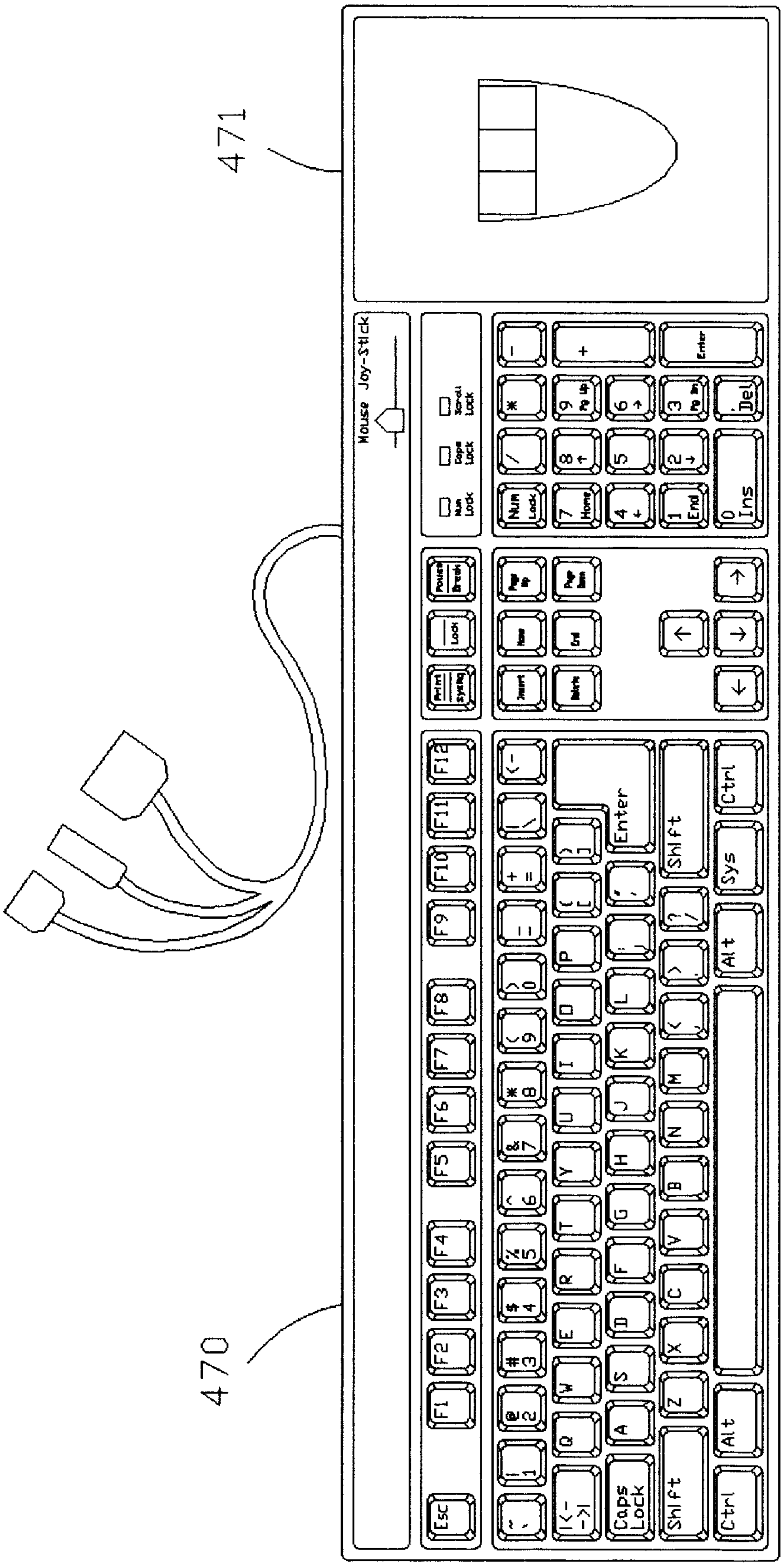
FIG. 64 is a top view of a tailless mouse module integrated with a keyboard.

FIG. 64 shows a conventional computer keyboard 470 integrated with a position decoder 471 of the present invention.

Figure 65:
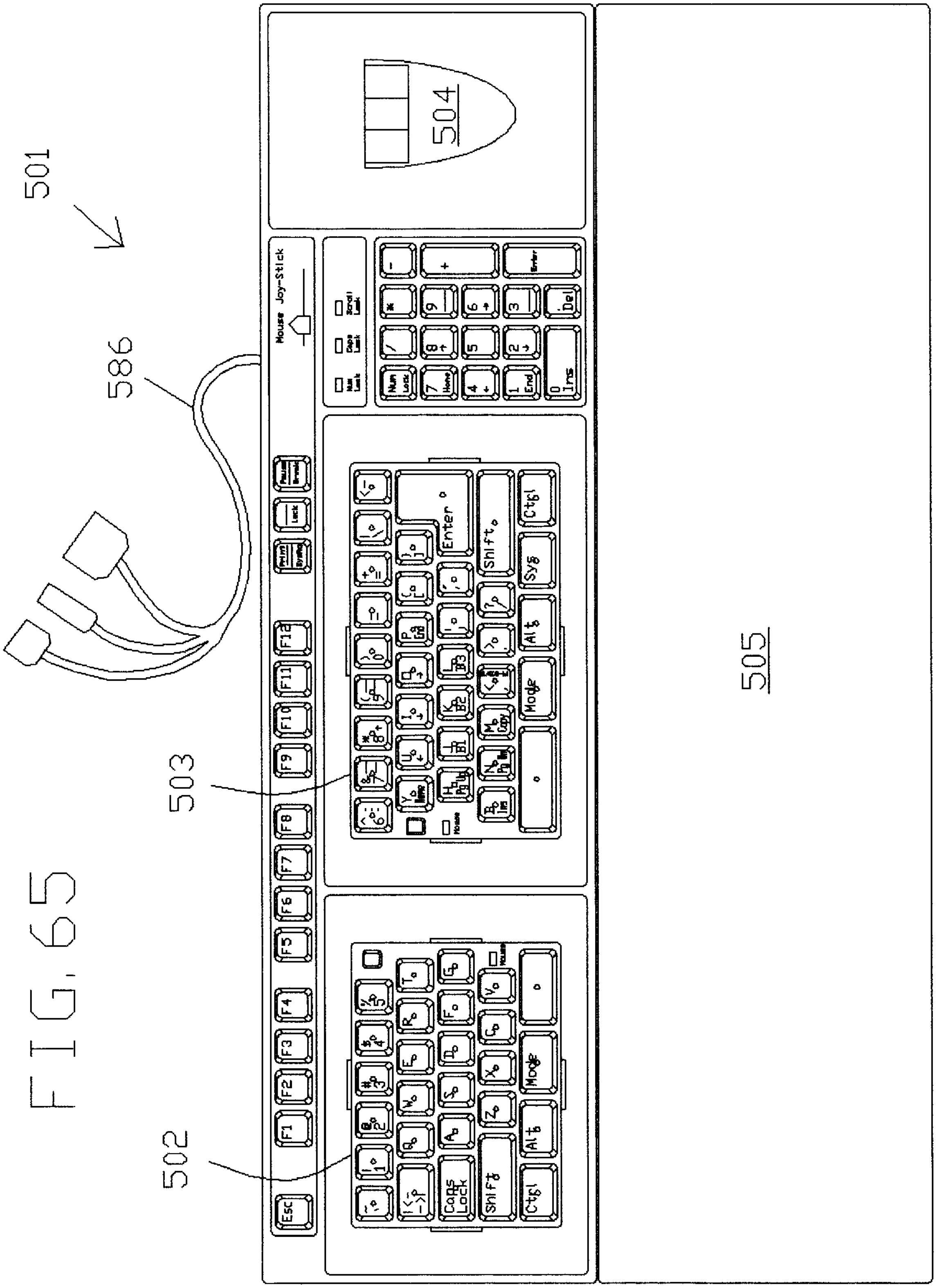
FIG. 65 includes top view of 2 mouse boards, and a top view of an arm support.

FIG. 65 shows an integrated keyboard and position encoder device 501 consisting of 2 mouse boards 502 and 503 as well as a tailless mouse 504 all of which developed using techniques in the present invention. A mouse board is basically a tailless mouse in the present invention with flat body and usually equipped with plurality of buttons on the top of the tailless mouse. The entire integrated device 501 can also be treated as a large mouse station on which operates multiple tailless mouse. FIG. 65 also includes a wrist support 505 to be used with the integrated device.

Figure 66:
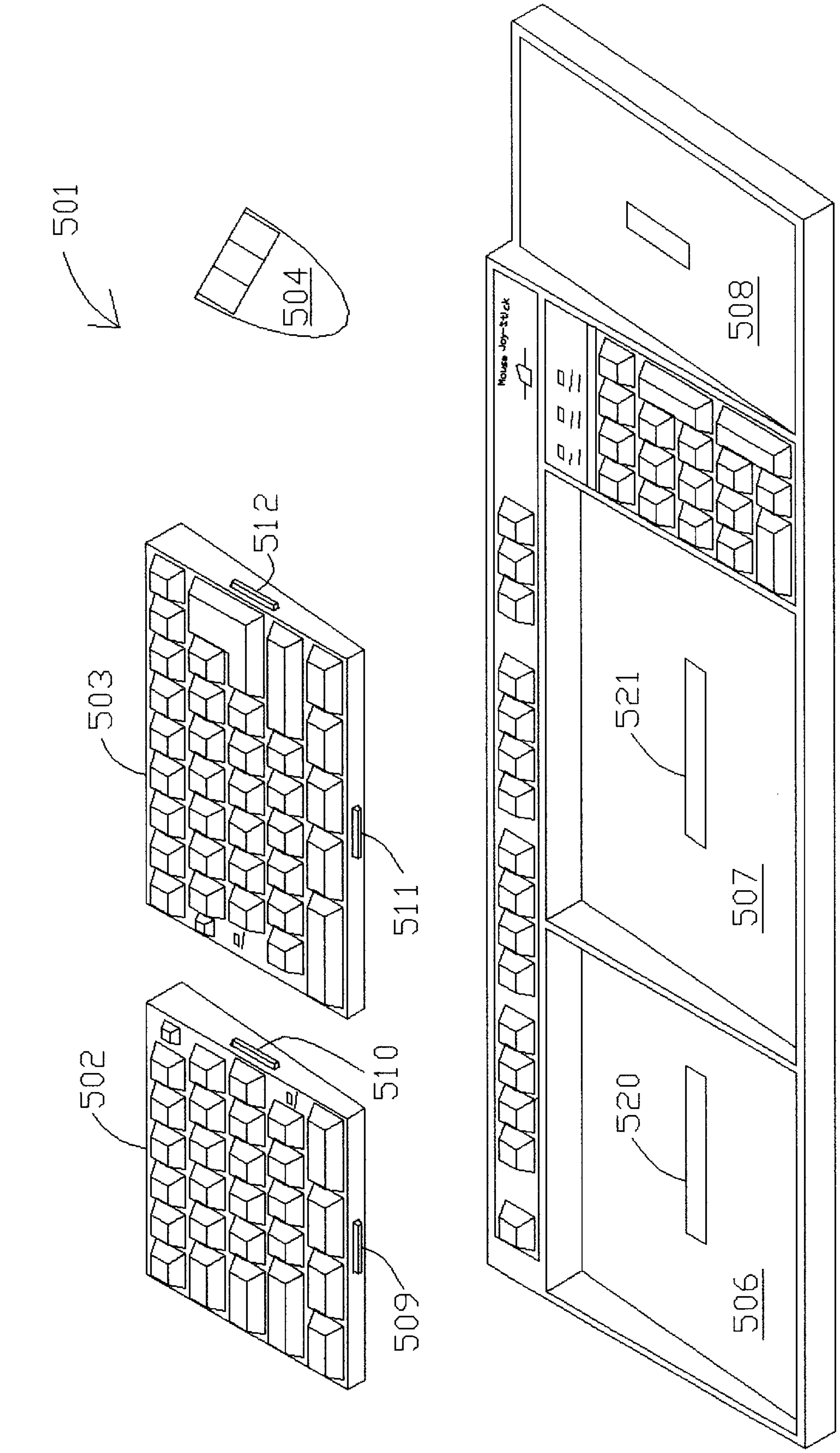
FIG. 66 is a perspective view of a tailless mouse module with 2 mouse boards on a keyboard case.

FIG. 66 shows a perspective view of integrated device 501. Mouse boards 502 and 503 are flat tailless mouse that may move coplanar to its base mouse stations 506 and 507 respectively. Similarly, tailless mouse 504 moves coplanar to its base mouse station 508.

Mouse boards 502 and 503 may be operated in either keyboard or mouse mode. Basically, when the board is moved, it functions as a computer mouse. And when the board is resting still and touching any of the boundaries of its base mouse station, the board functions as a computer keyboard. There are other rules to control the mode, and there is a mode button on each of the mouse boards to change the mode explicitly.

Sensors such as that labelled as 509, 510, 511 and 512 are equipped around the edges of the mouse boards to detect if the boards are touching their base station boundaries. These sensors are simply buttons that will be pressed by the base station boundaries when the mouse boards are touching the base boundaries. Any other sensors or techniques can be used to detect if the mouse boards touch the base boundaries. In particular, because the mouse boards are equipped with position sensors such as that shown in FIG. 68, another possible way to detect if the mouse boards touch their base station boundaries is to make use of the position sensors.

Each of the buttons on the top of mouse boards 502 and 503 is equipped with sensor to detect if the user's finger is touching the button. Signals will be generated to denote buttons that are touched. Moreover, signals identifying the board, the mode of the board, the buttons that are pressed as well as the positions or movement information of the board, will all be transmitted to the receiving device using the integrated device 501. The receiving device can interpret these signals and perform different functions accordingly.

Table 1 below lists some popular functions that a computer operating system might be defined base on the signals generated by device 501:

TABLE 1

| Signals generated by device 501 | | | | | | |
|---|---|---|---|---|---|---|
| Mode (502) | Mode (503) | Buttons Pressed | Buttons Touched | Move | Board Id. | Example operations performed by a computer operating system |
| Any | Any | None | J, K | Yes | 503 | Mouse Move |
| Any | Any | J | K | No | None | Perform any operation that is normally activated by clicking the mouse Button 1. |
| Any | Any | K | J | No | None | Perform any operation that is normally activated by clicking the mouse Button 2. |
| Any | Any | L | J | No | None | Perform any operation that is normally activated by clicking the mouse Button 3. |
| Any | Any | None | J, I | Yes | 503 | Highlight/Drag (Mouse Button 1 pressed + Mouse move) |
| Any | Any | None | M, K | Yes | 503 | Window Contents Scroll with same direction of mouse move. |

TABLE 1-continued

| Signals generated by device 501 | | | | | | |
|---|---|---|---|---|---|---|
| Mode (502) | Mode (503) | Buttons Pressed | Buttons Touched | Move | Board Id. | Example operations performed by a computer operating system |
| Any | Any | None | N, M | Yes | 503 | Activate next or previous application window if the mouse moves to the right or left respectively. |
| Any | Any | None | U, I | Yes | 503 | Window size expands with same direction of mouse movement |
| Any | Any | None | U, 8 | Yes | 503 | Window size shrinks with same direction of mouse movement |
| Any | On | H | None | No | None | Window close |
| Any | On | Y | None | No | None | Window minimise |
| Any | On | N | None | No | None | Window maximise |
| Any | On | B | None | No | None | Window restore |
| Any | Any | U | K, L | No | None | Page Up |
| Any | Any | M | K, L | No | None | Page Down |
| Any | Any | R | S, D | No | None | Perform same operations as the up arrow button is pressed. |
| Any | Any | V | S, D | No | None | Perform same operation as the down arrow button is pressed. |
| Any | Any | None | W, E, F | Yes | 502 | Toolbar buttons will be highlighted as the mouse board moves. The button to be highlighted should follow the direction of the move. |
| Any | Any | F | W, E | No | None | Toolbar button that is highlighted is activated. |
| Any | Any | None | S, D, C | Yes | 502 | Menu options will be pulled down and highlighted. |
| Any | Any | C | S, D | No | None | The menu option that is highlighted is activated. |

Figure 72:
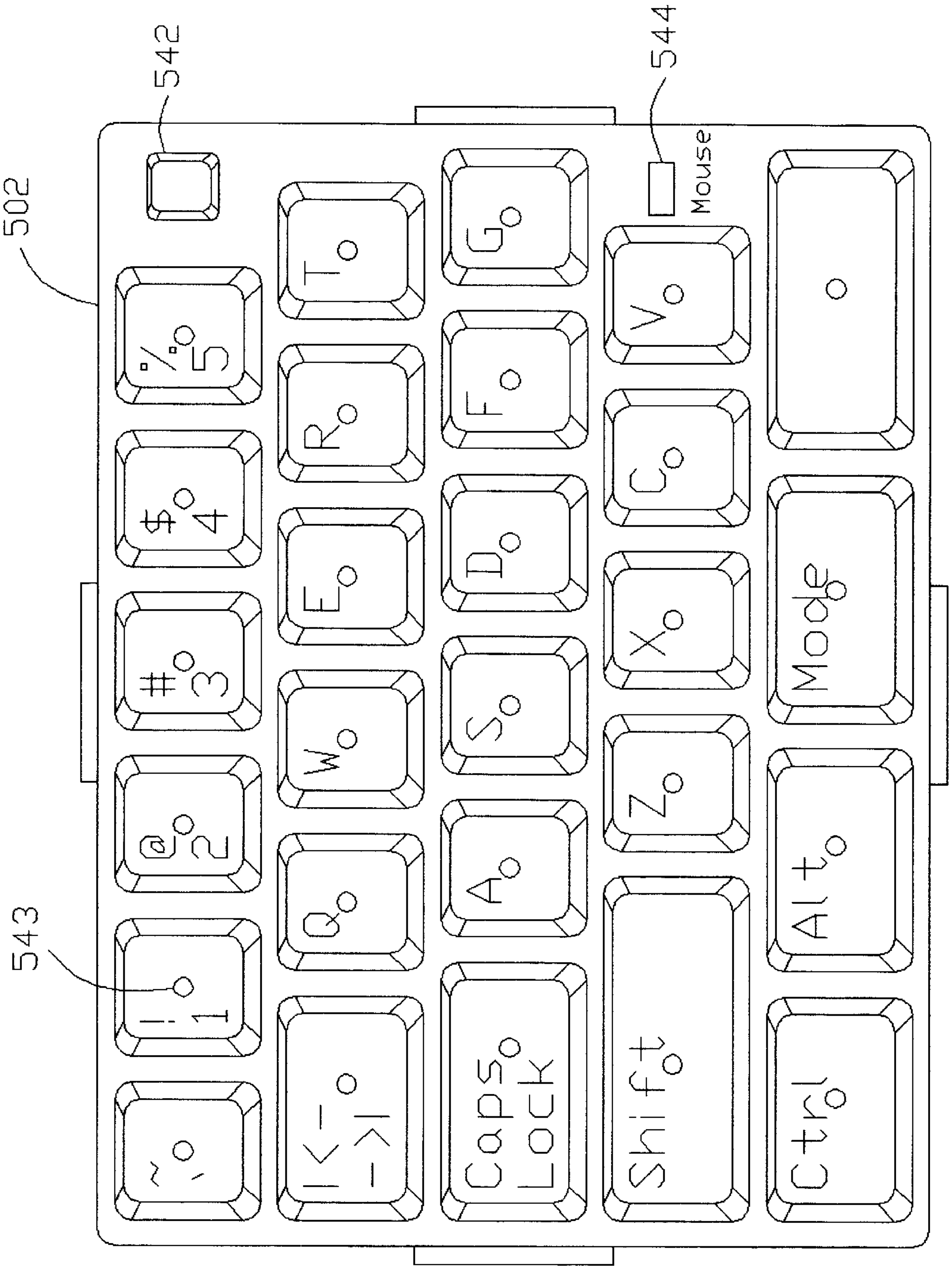
FIG. 72 is an enlarged top view of a mouse board.
Figure 73:
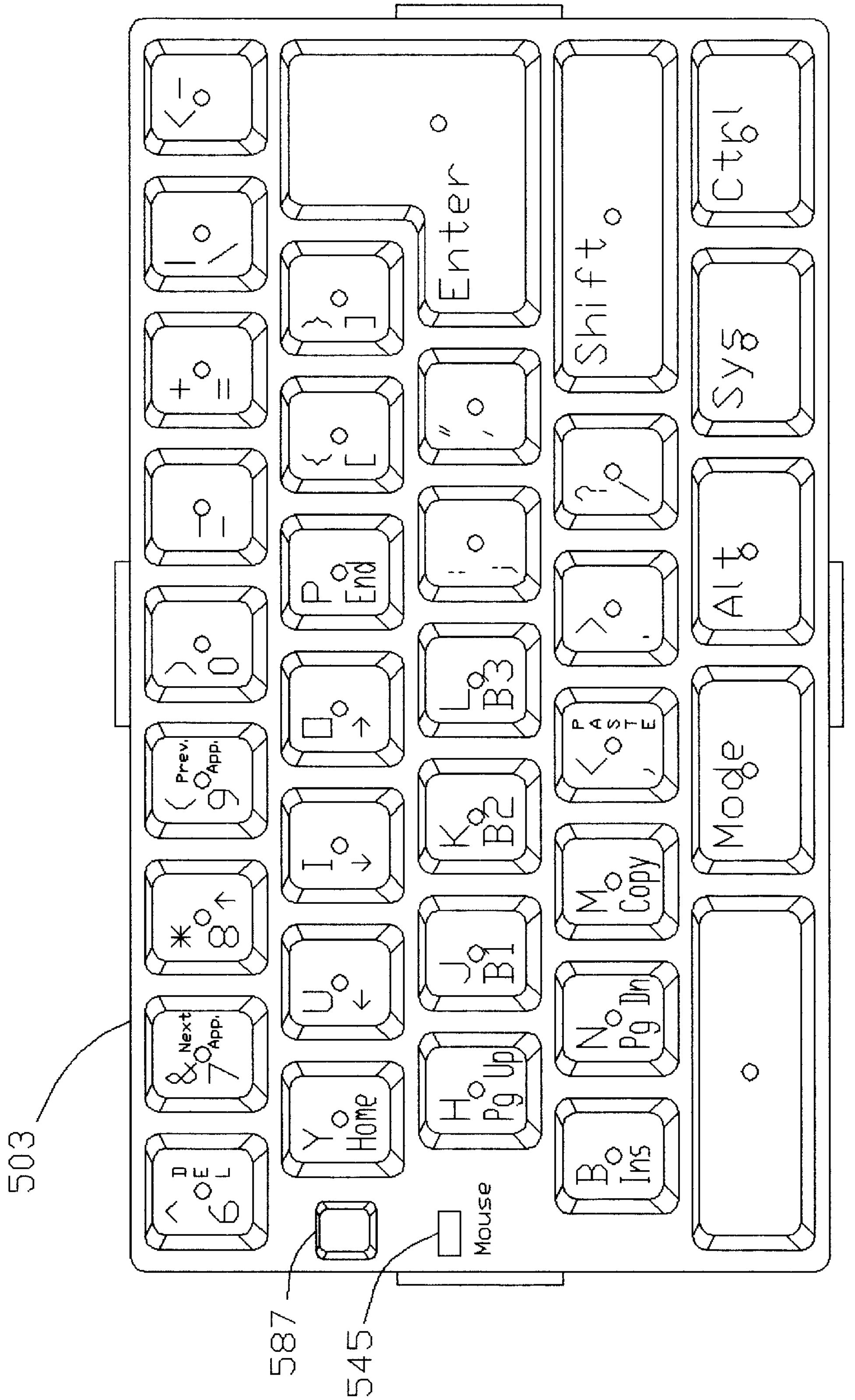
FIG. 73 is an enlarged top view of another mouse board.

The first 2 columns in table 1 with title "Mode (502)" and "Mode (503)" denote the modes of the mouse boards 502 and 503 respectively. The modes of the mouse boards are controlled by the mode buttons on the mouse boards as shown in FIG. 72 and 73. When the mode button is pressed, the mode of the mouse board is toggled between keyboard and mouse mode. In table 1, a value of "On" in these columns means that the mouse board is in mouse mode, and a value of "Any" means that the mode can be either mouse or keyboard mode.

The columns with title "Buttons Pressed" and "Buttons Touched" denote the buttons that are pressed and touched while the signals are generated.

The column with title "Move" refers to signals that indicate the movement or position of the mouse board such as the amount of distance being moved by or the new position of the mouse board. The receiving device using the integrated device 501 may be required to compute the amount of distance moved by the mouse board by checking more than one signals from device 501.

The column with title "Board Id" refers to the identification of the mouse board that generate the movement signals.

Table 1 is by no means complete. It is used solely to assist the explanation of the present invention. There are vast number of combinations of signals that can be generated by the integrated device 501. The receiving device using the integrated device 501 would decide how to use the signals, for example, to determine if touching J and K and L buttons is equivalent to touching J and K buttons. The receiving device should respect the mode included in the signals. That is, if the mode is mouse than it would imply that the user wishes to use the device as mouse, and thus the signals are better to be interpreted for mouse operations.

A mouse board can be used to emulate many conventional computer mouse by making use of gestures of the user's hand. That is, different combinations of finger positions over the buttons can be interpreted as different conventional computer mouse.

In this way, an user can simply change the gesture of the hand to perform many different operations. This would greatly reduce the need for hand movement that is required to move the hand away from a conventional computer keyboard to a conventional computer mouse. And, the user nearly does not need to leave the eye sight from the computer screen in order to change the fingers positions on the buttons. On the other hand, many operations can be achieved even without pressing any key. For example, a drag operation can be carried out by touching the J and I key and moving the mouse boards.

The action where a conventional mouse is lifted upwards can also be easily achieved. This can be simply by not defining a combination of buttons, or use some specific combinations of buttons. For example, when an user touches the J and K buttons and moves the mouse board, and if then the mouse board reaches the base mouse station boundaries thus preventing the mouse board to move, the user may simply raise one of the fingers so that either J or K button is not being touched, and then move the mouse board to a desired position (this move will not be interpreted as mouse move). After that, the user may lower the finger so that the J and K buttons will be touching again and continue the mouse move operation.

Computer mouse emulated can be named according to the buttons being touched and/or pressed when moving the mouse board. For example, the conventional computer mouse can be emulated when the user's fingers touch the buttons J and K while moving the mouse board 503. Thus, the emulated computer mouse named JK, or simply mouse JK, will correspond to the conventional computer mouse. Similarly, mouse JIO and mouse [ ] would refer to the computer mouse emulated by the board when the user's fingers are touching the buttons J, 1, 0 and [, ] respectively. Theoretically, more than ten buttons can be simultaneously touched by an user because it is possible to touch more than one button with one finger. And thus the name of an emulated computer mouse may take more than 10 characters. Actually, the usability of an emulated computer mouse mostly depends on the system that receives the signals from the integrated device 501.

Buttons having no corresponding symbol, such as the Shift button, will be referred to by a name enclosed by the {and} characters. For example, {Ctrl}Z{Alt} refers to the emulated mouse when touching the Ctrl, Z and Alt buttons. Specifically, the name of the emulated computer mouse when no button is being touched, that is simply moving the board, is called the mouse {Move}. The buttons for the symbols {and} are usually referred by the symbols [and ] because these symbols usually reside on the same buttons, respectively. Thus the symbols {and} are normally not used to form emulated mouse names. However, if they must be used, {and} can be referred to by {Left-Brace} and {Right-Brace} respectively.

If mouse boards 502 and 503 are moved at the same time, signals generated from both mouse boards should be sent simultaneously to the receiving device that is using the integrated device 501. The signals can be sent such as by multiplexing the communication line between the receiving device and the integrated device 501. The receiving device can decide to use signals from which mouse boards by checking the board identification information in the signals. The receiving device can also use signals from both mouse boards at the same time. For example, a computer graphic display system may direct the signals from both mouse boards to 2 different applications base on the board identification signals. This will enable the user to control the 2 applications simultaneously with both hands.

Emulated mouse technique enabled by the present invention allows for the implementation of parallel operations. Traditionally, computer operations are done serially. That is, operation is performed one after one. For example, to copy and paste a portion of text, an user would have to go through a series of operations that include highlighting a portion of text, performing a copy operation, moving the mouse pointer to a desired position and performing a paste operation. If during the step of performing the paste operation, the user wants to redo the copy operation, then the whole process needs to be performed from the very beginning.

With multiple emulated mouse, multiple mouse pointers can be displayed on a computer screen simultaneously. Each of the mouse pointers can be designated by specific emulated mouse. In particular, in addition to the conventional mouse pointer that is usually represented by an arrow pointing upward from right-bottom, a second mouse pointer can be simultaneously displayed on the screen represented by an arrow pointer upward from left-bottom. The conventional mouse pointer can be designated to be controlled by the emulated mouse named JK that is the emulated mouse when touching the J and K buttons while moving mouse board 503. The second mouse pointer can be designated to be controlled by the emulated mouse named DF which is the emulated mouse when touching the D and F buttons while moving the mouse board 502.

To perform a copy and paste function with parallel operation ability, an user may choose to begin the paste operation first by moving the second mouse pointer to a desired position on the screen. Then the user may start the copy operation by moving the conventional mouse pointer to a portion of text on the screen, and then perform a copy operation. If the user wants to redo the copy operation, the user may do so without affecting the paste operation. After the copy operation is completed, the user simply continue to finish the paste operation using the second mouse pointer.

A second cursor may also be defined in addition to the conventional I-bean cursor which is usually used to denote the position on the screen to where keyboard character inputs will be directed. For example, the second cursor may be represented by a circle of size similar to the I-bean cursor. The second cursor should normally be controlled by the second mouse pointer stated above. The second cursor would be useful such as in the paste operation mentioned above in which the second cursor can define the position on the screen to where the text will be placed. In this way, the position of the conventional cursor on the screen will not be changed by the paste operation. However, keyboard character inputs will have to be directed to one of the cursors that is active. An operation such as pressing a specific function button can be designated to select the active cursor which may be visually differentiated from the inactive cursor such as by blinking.

With multiple emulated mouse, operations can be easily directed to multiple locations on the screen. There is no need to move a mouse pointer around different locations in order to perform operations associated with the locations. For example, in some graphical display systems, the screen controlled by a graphical display application is divided into multiple sub-windows. With multiple emulated mouse, a sub-window can be designated to be operated by a specific emulated mouse.

Thus the user may just change the hand gesture to activate the emulated mouse designated for a sub-window in order to operate on the sub-window. This would be much faster than the conventional computer mouse approach in which the only mouse pointer must be moved from a location on the screen to the location to where the operation is directed. Moreover, efficiency is also gained because the user's hands and eye sight need not to leave the keyboard and screen respectively.

It is not necessary to have a corresponding mouse pointer for every emulated mouse. However, it would be better to visually indicate if an emulated mouse is exercised. For example, if an emulated mouse is designated to select a button in a toolbar on the screen, then the toolbar may be visually emphasised such as by displaying a frame around the tool bar when the associated emulated mouse is exercised.

Similar to emulated mouse, the present invention also enables the use of emulated buttons. An emulated button is defined by a set of buttons pressed while touching another set of buttons. The set of buttons pressed include the empty set, that is, no button is pressed. In such cases, the emulated buttons are achieved only by touching some buttons. An emulated button is named also similar to an emulated mouse. The name of an emulated button consists of 2 parts separated by a colon symbol. The first part lists all the names of the buttons pressed, and the second part lists all the names of the buttons being touched. For example, N:KL is the name of the emulated button formed when the N button is pressed while touching the K and L buttons. Buttons having no symbolic name are also represented by names enclosed by the {and} symbols. The symbols {} can be used to denote where no button is pressed. For example, { }:KL is the name of the emulated button formed when no button is pressed while touching the K and L buttons. Emulated buttons can be designated for frequent operations, or to carry the same meaning as some of the frequently used buttons. For example, the emulated buttons U:KL and M:KL can be defined to be equivalent to the Page Up and Page Down buttons respectively. Emulated buttons are easy to access with little arm movement, and will improve efficiency substantially.

Most existing devices such as a conventional computer system are not made to interpret the signals that buttons are being touched, and thus might not able to take benefit from the present invention. However, owning to the integration design of sending mouse and keyboard signals through a common carrier such as cable 586 to an external system, signals may be emulated by device 501 before sending to the external system. For example, the device 501 may detect itself that a certain emulated mouse such as the mouse MN is being exercised, and thus device 501 generates a signal sequence corresponding to the button pressed signal sequence of Alt and Tab buttons. This key sequence will switch the active application to another in some graphical user interface systems.

Figure 67:
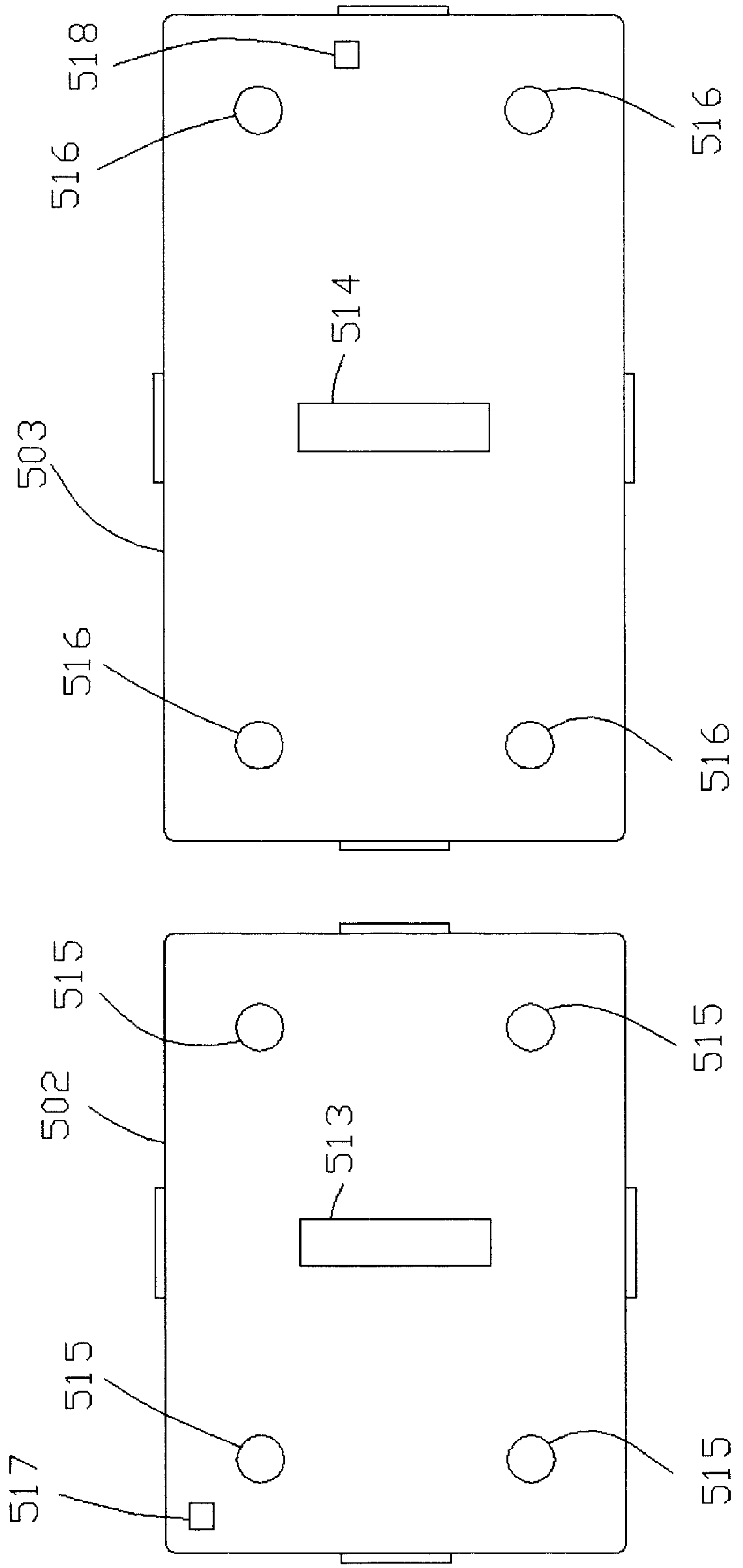
FIG. 67 is are bottom views of 2 mouse boards in FIG. 66

FIG. 67 shows the bottom view of mouse boards 502 and 503. It shows that there are openings 513 and 514 on the bottoms of the mouse boards. There are also bearings 515 and 516 on the bottoms of the mouse boards. The bearings are used to lower the friction when moving the mouse boards. A button 542 (see FIG. 72) on mouse board 502 can be used to toggle the stopper 517. When button 542 is pressed, stopper 517 will extend and touch the base mouse station 506 thus adding some friction to prevent mouse board 502 to move. When the button is pressed again, stopper 517 will retract and not touching the base mouse station 506. Similarly, stopper 518 is controlled by the button 587 (see FIG. 73) on mouse board 503. The stoppers 517 and 518 may be used to temporarily prevent the mouse boards from moving in situations where mouse operations are not needed.

Figure 68:
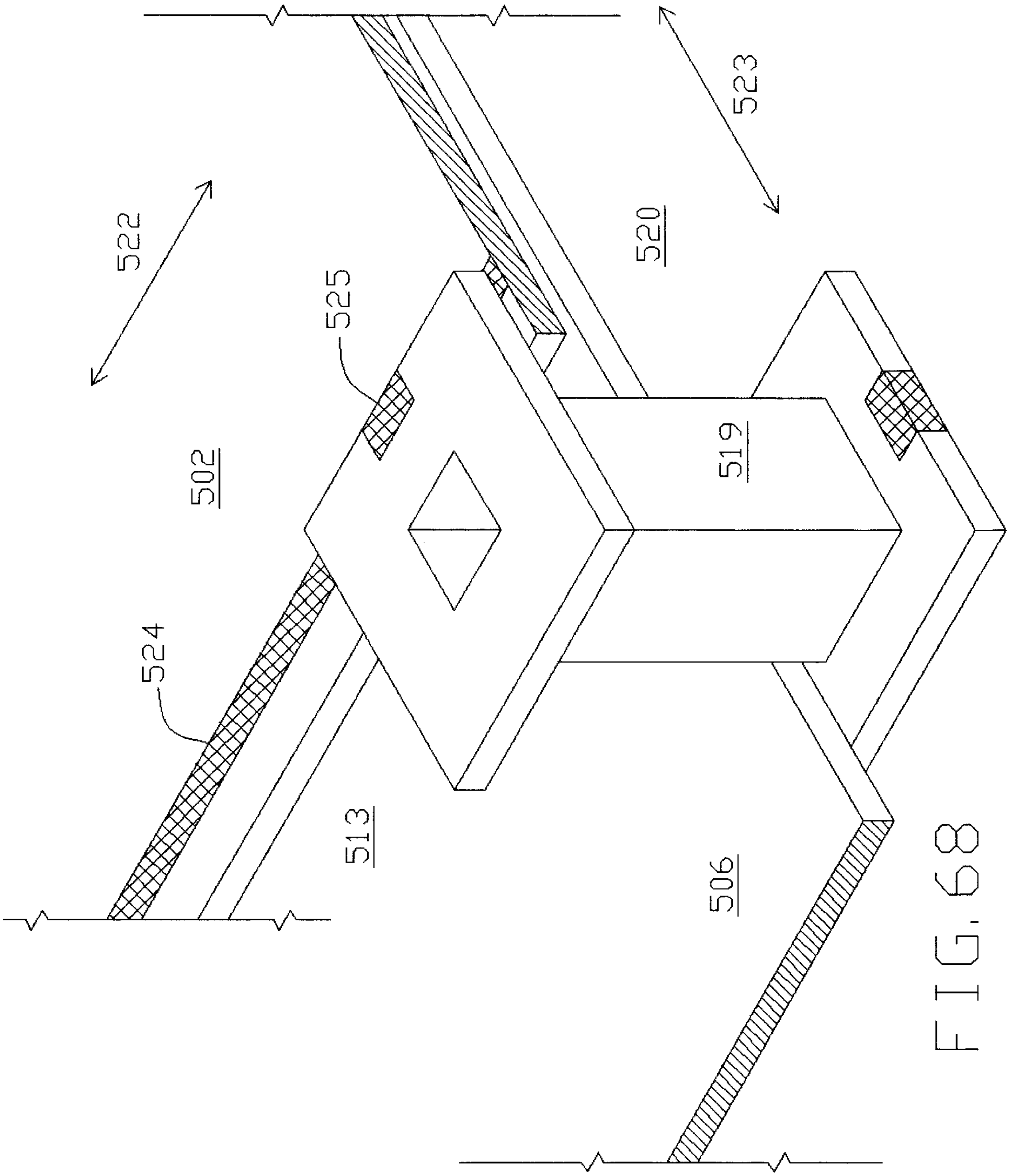
FIG. 68 shows a perspective view of one design of a mouse link.
Figure 69:
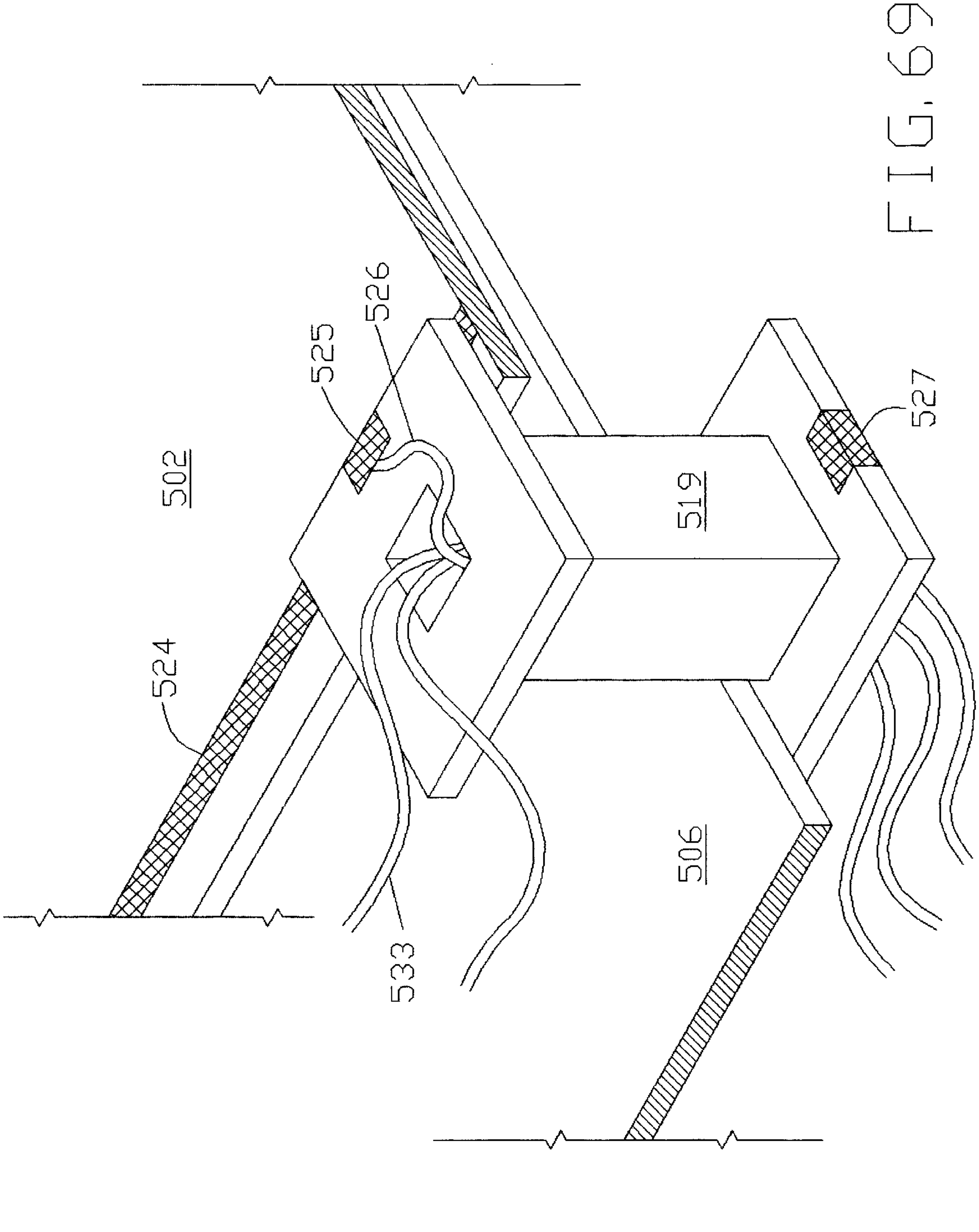
FIG. 69 shows another perspective view of one design of a mouse link.

FIG. 68 shows a I-shaped mouse link 519 to be used by mouse boards 502 and 503. The mouse link 519 is similar to the design of mouse link 353 in FIG. 45. With the mouse bottom opening 513 (also shown in FIG. 67), mouse board 502 may move in the direction indicated by the arrow 522 relative to mouse link 519. Similarly, mouse board 502 together with mouse link 519 may move in the direction indicated by the arrow 523 along the platform hole 520 (also shown in FIG. 66). There is a conductive plate 524 along the inner bottom surface of mouse board 502. A conductive plate 525 is also secured on mouse link 519 as shown in the figure. Conductive plate 525 will always touch conductive plate 524 when mouse board 502 moves relative to mouse link 519. As shown in FIG. 69, the circuit formed by conductive plate 524, 525 and a communication wire 526 can be used to detect the position of mouse link 519 by measuring the electric resistance of the circuit. Similarly, the position of mouse link 519 relative to mouse station 506 can be measured by the circuit formed by the conductive plate 527 and another conductive plate (not shown) along the inner surface of mouse station 506.

Figure 70:
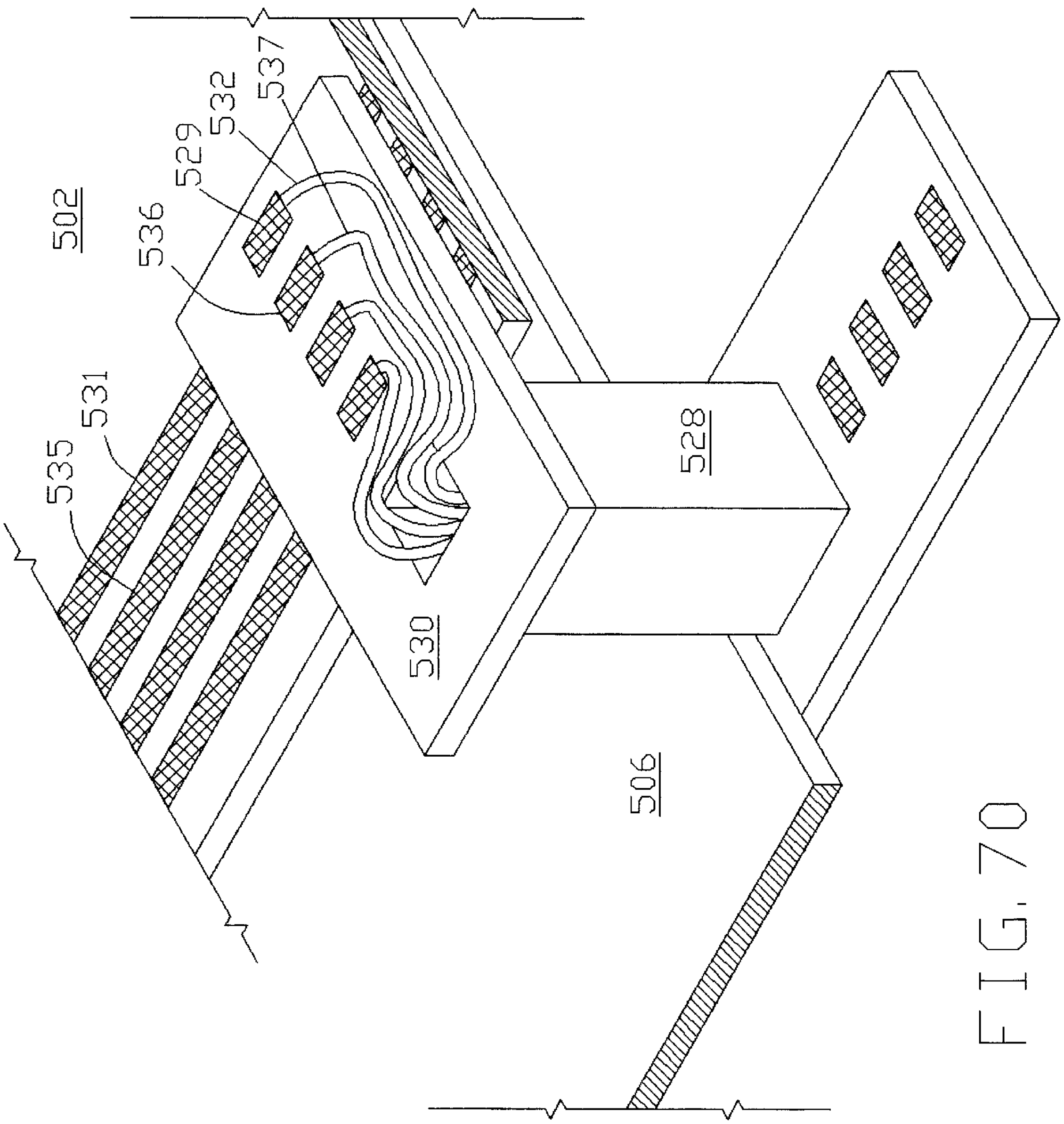
FIG. 70 shows another perspective view of one design of a mouse link supporting multiple connections.

FIG. 70 shows an alternative design of mouse link 528 that may be used to replace mouse link 519. In this design, multiple conductive plates are equipped on the inner surface of the bottom of mouse board 502. The conductive material labelled as 529 passes through the plate 530 and thus touching the conductive plate 531. The circuit thus formed along 532, 529, 531 up to either end of 531 and then back from either end of 535, through 536 and then 537, will form a complete circuit capable of conveying signals from mouse board 502 into base station 506. This design avoid a possible problem of wires such as 533 shown in FIG. 69 to obstruct the movement of mouse link 528.

Figure 71:
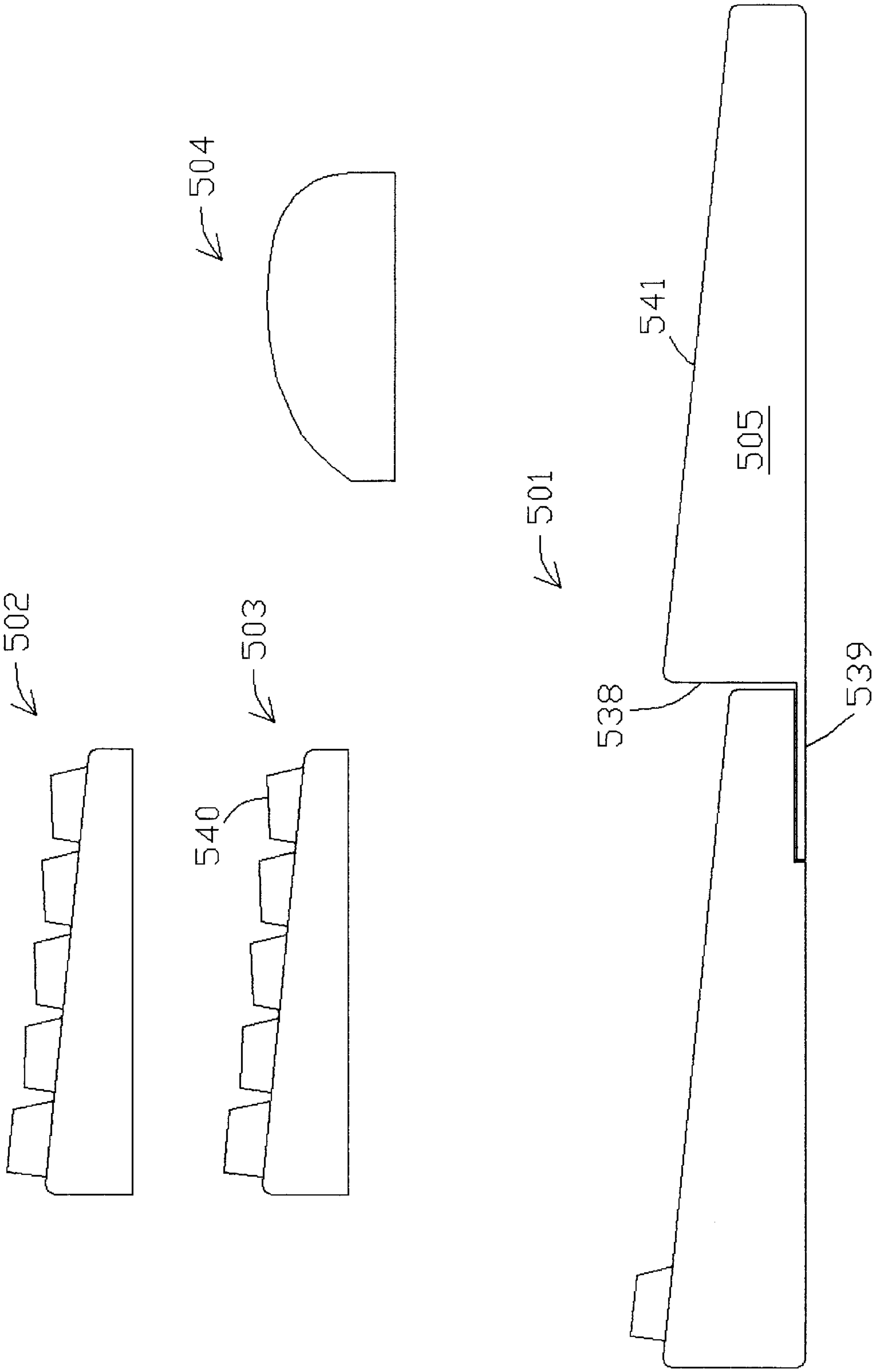
FIG. 71 are side views of 2 mouse boards, a tailless mouse and a keyboard case.

FIG. 71 shows the side views of the components of integrated device 501. The wrist support 505 has a portion 539 extended to the bottom of the keyboard unit. Wrist support 505 also has a wall 538 of sufficient height which is usually higher than the first row of buttons 540 on the mouse boards 502 or 503. The height of the wall 538 will enable an user's hand to hang over the mouse boards 502 or 503 when the user rests his/her wrists over support 505. With the user's hands hanging over the mouse boards, which is a preferred hand gesture to operate the present invention, the user's fingers will be easier to move the mouse boards 502 or 503 with little or no arm movement. The wall 538 is also important when support 505 is used with other mouse boards such as mouse boards 552 and 553 in FIG. 76. In such cases, wall 538 will act as a boundary that enables sensors in those mouse boards to detect if the mouse boards have been moved to extreme (or home) positions so as to change the mode of the mouse boards. The length 541 of support 505 should also be sufficient long preferably allowing the entire forearms of the user to rest on.

FIG. 72 and 73 shows the enlarged top views of mouse board 502 and 503 respectively. Each of the buttons has an small opening such as the one labelled as 543 that functions as a sensor to detect if an user's finger is touching the button. However, other types of sensors that do not require a hole on the button top may be used. In particular, the button surface may be translucent, which would enable the use of optical sensor for sensing contact with human finger. On the other hand, translucent surface may also be illuminated to indicate which buttons are touching by an user. The top surface of the buttons can be made with material that provide moderate friction with the user's fingers to assist moving the mouse boards. But because mouse boards are equipped with bearings, only a very small frictional force would be enough. The top surface of the buttons may also be made slightly curved so that the centre of the top surface is lower than the boundary so as to enhance friction with the user fingers.

There are visual indicators 544 and 545 located on mouse boards 502 and 503 respectively to indicate visually the mode of the mouse boards. For example, the indicator may change its colour to green when the corresponding mouse board is in keyboard mode. And it may change its colour to yellow when the corresponding mouse board is in mouse mode. Note that the ultimate operating mode should be determined by the receiving device using the mouse boards as the receiving device will interpret the signals generated by the mouse boards. The receiving device should consider the mode of the mouse boards in using the signals.

Figure 74:
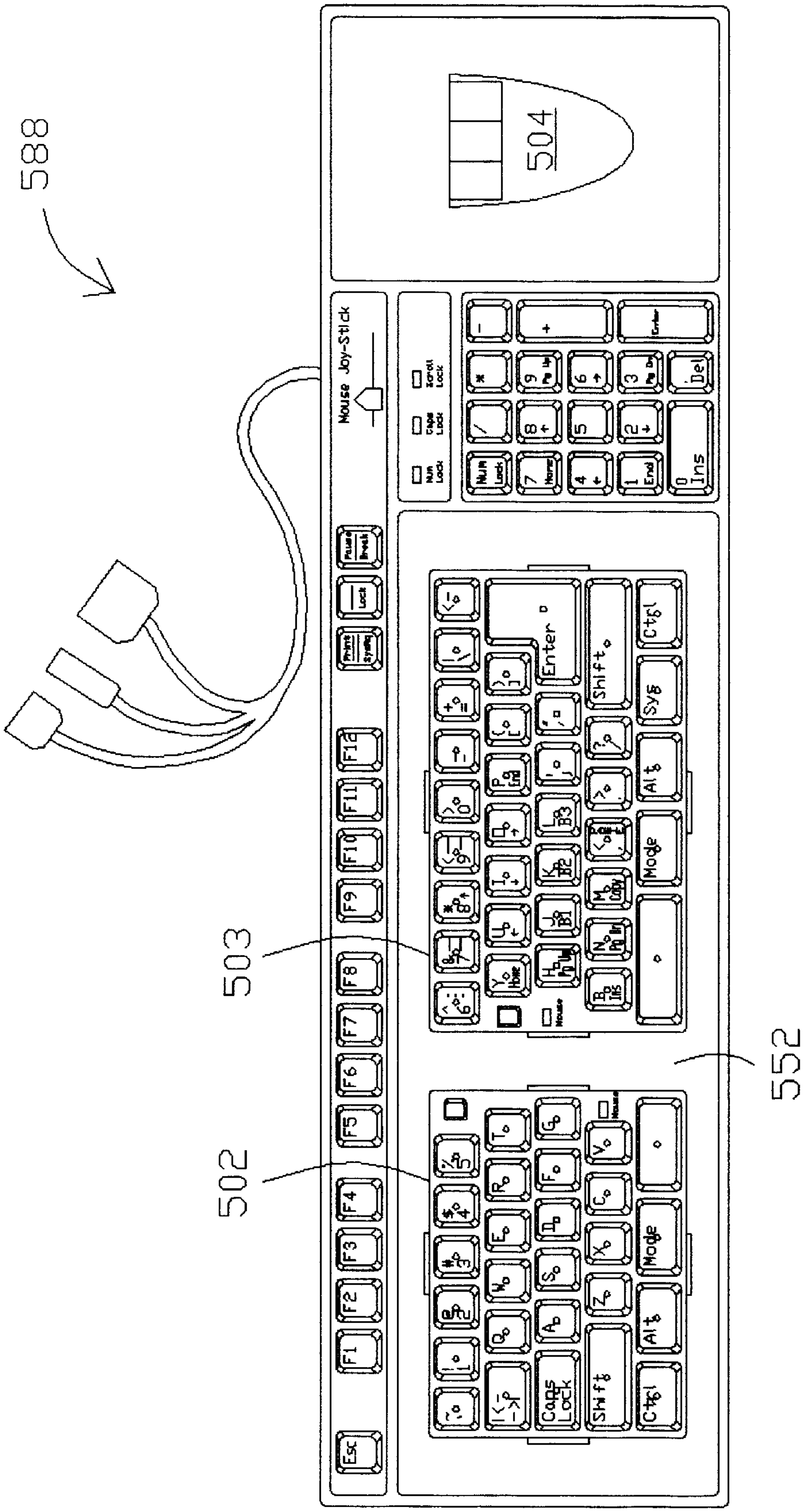
FIG. 74 is a top view of another design of 2 mouse boards integrated with a tailless mouse.

FIG. 74 shows an alternate design of integrated keyboard and mouse device 588 using mouse boards 502 and 503 and tailless mouse 504. The major difference of integrated device 588 with 501 is that in device 588 the mouse boards 502 and 503 share a common space 552 to move around. In this way, the total width of device 588 can be shortened. In this design, mouse boards 502 and 503 may touch each other during operation.

Figure 75:
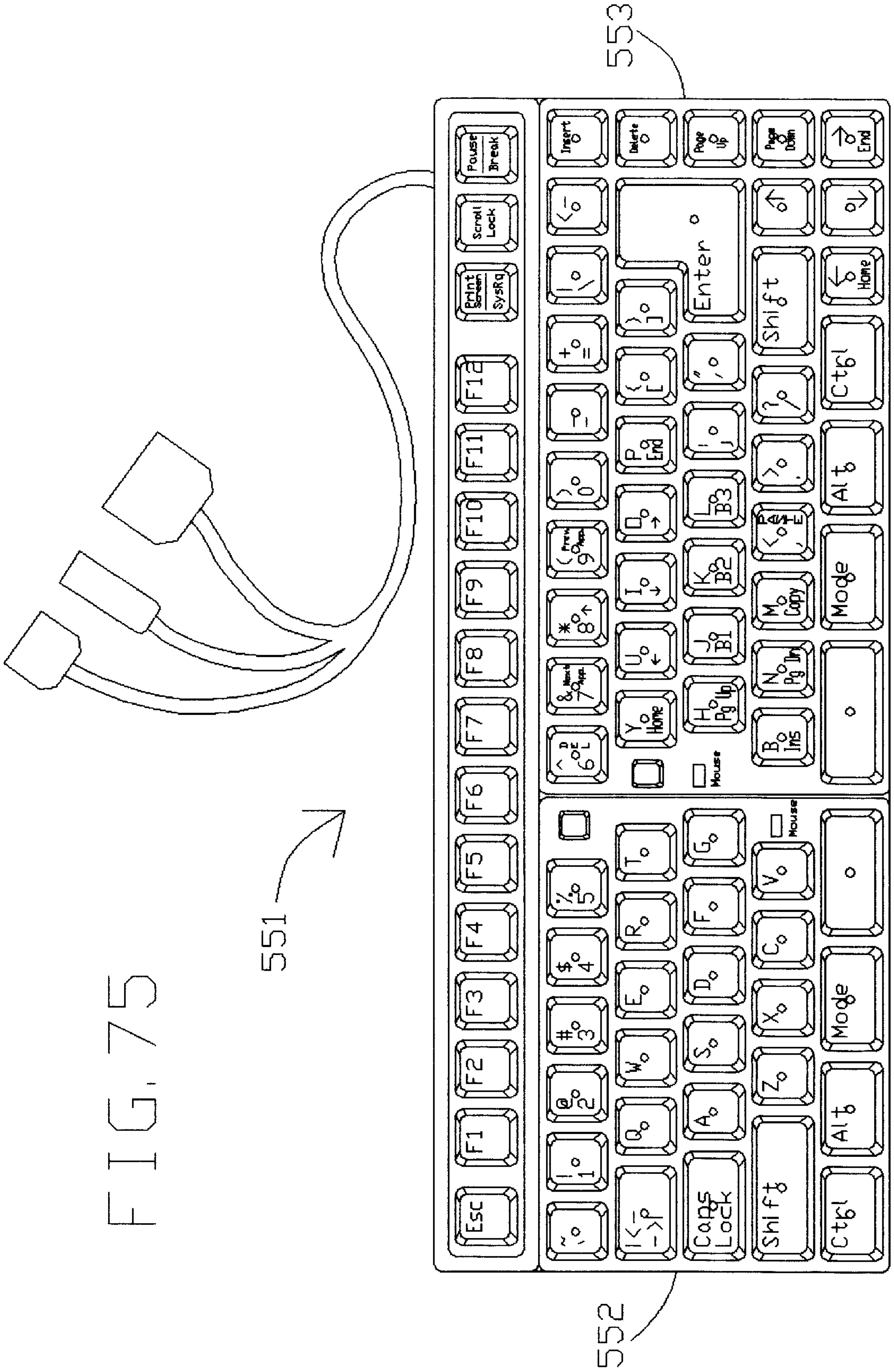
FIG. 75 is a top view of one design of 2 mouse boards.
Figure 76:
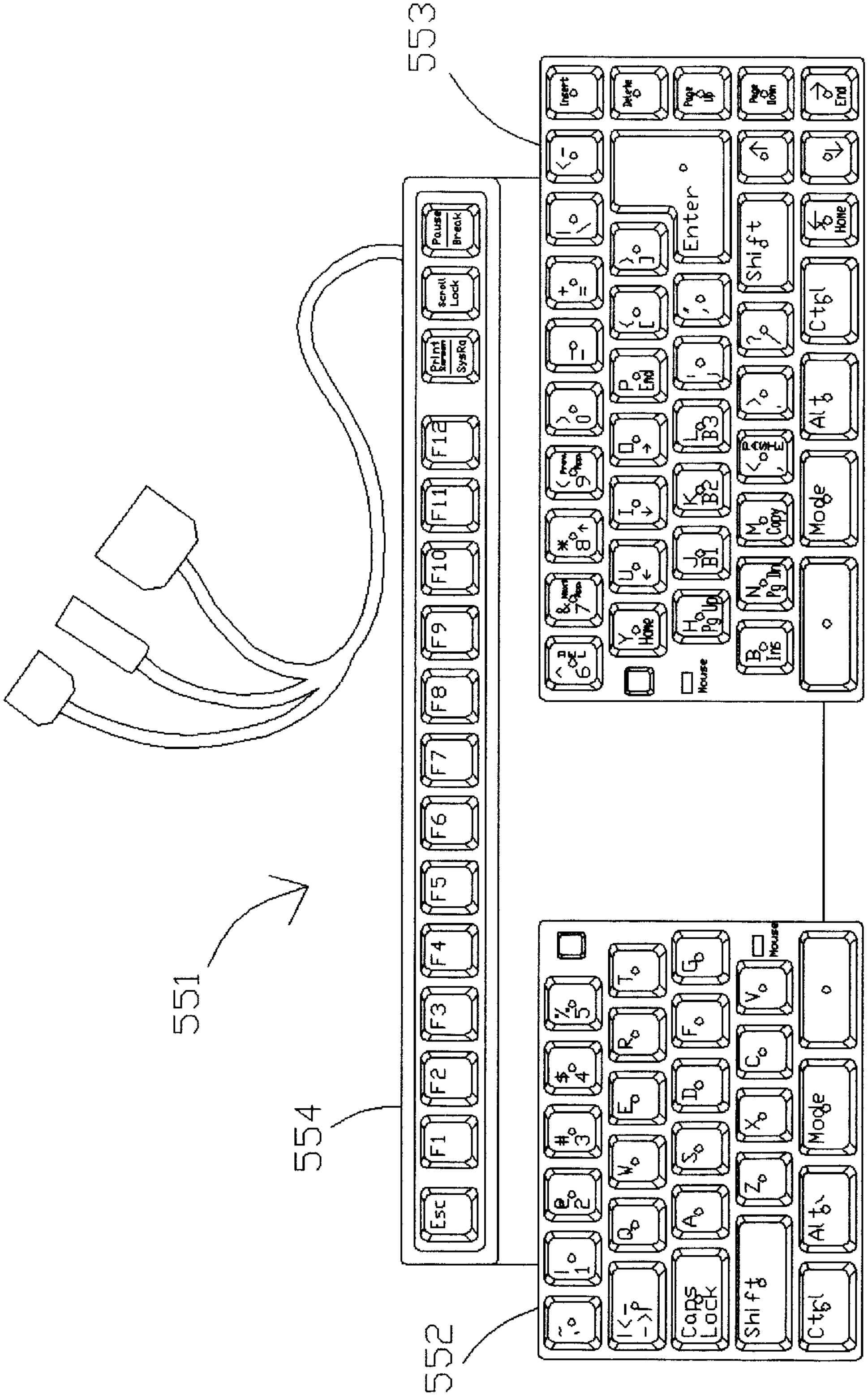
FIG. 76 is a top view of the 2 mouse boards being moved apart.
Figure 77:
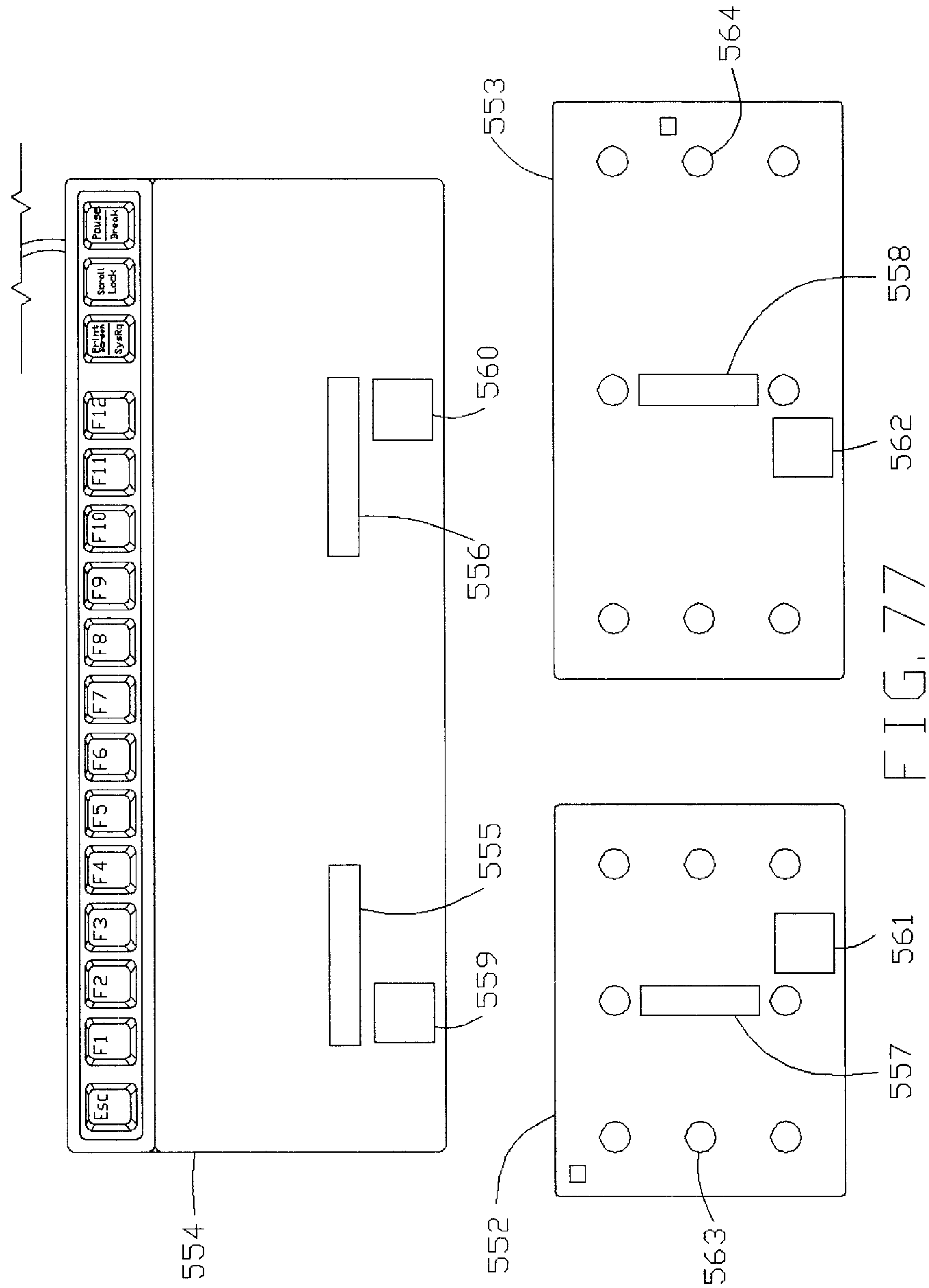
FIG. 77 shows the top view of a supporting platform and the bottom views of 2 mouse boards.

FIG. 75 shows one design of an integrated keyboard and mouse device 551. In this design, two mouse boards 552 and 553 may move in one base mouse station 554 (see FIG. 76). FIG. 76 shows the top view when mouse boards 502 and 503 move slightly away from the centre of base mouse station 554. FIG. 77 shows the top view of base mouse station with the mouse boards removed, as well as the bottom view of the mouse boards. In the base mouse station 554, there are two platform holes 555 and 556 that are used together with the mouse bottom cavities 557 and 558, respectively, to fit mouse links such as mouse link 528 shown in FIG. 70, so that the mouse boards can move in any directions coplanar to the base mouse station.

Also on base station 554, there are two square spring controlled buttons 559 and 560. Each of these buttons has a corresponding switch (not shown) that may be positioned sideways of base station 554. Such switches will control the spring controlled buttons to eject upwards or depress downwards. If the spring controlled buttons 559 and 560 are let eject upwards, and when the corresponding mouse boards are moved so that the cavities 561 and 562 are exactly over the spring controlled buttons 559 and 560, respectively, the mouse boards will be locked in that positions. This is useful in situations where mouse operation is not needed, or during transportation of the device.

There are more bearings such as those labelled as 563 and 564 underneath the mouse boards. These bearings make sure that the mouse boards are properly supported when portions of the mouse boards are moved outside of the base mouse station 554.

Figure 78:
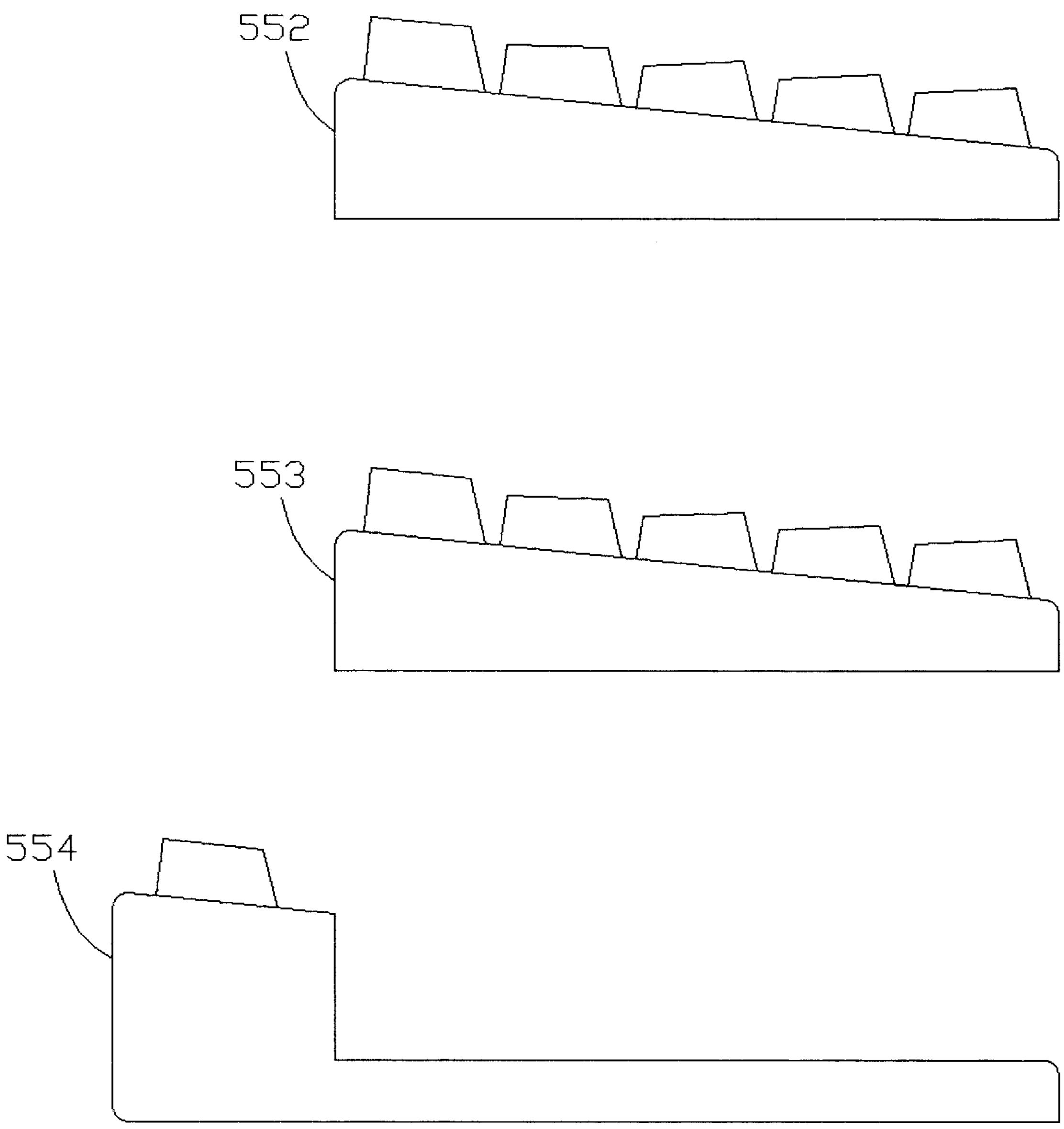
FIG. 78 shows the side views of 2 mouse boards and the supporting platform.

FIG. 78 shows the side views of the components of integrated device 551.

Figure 79:
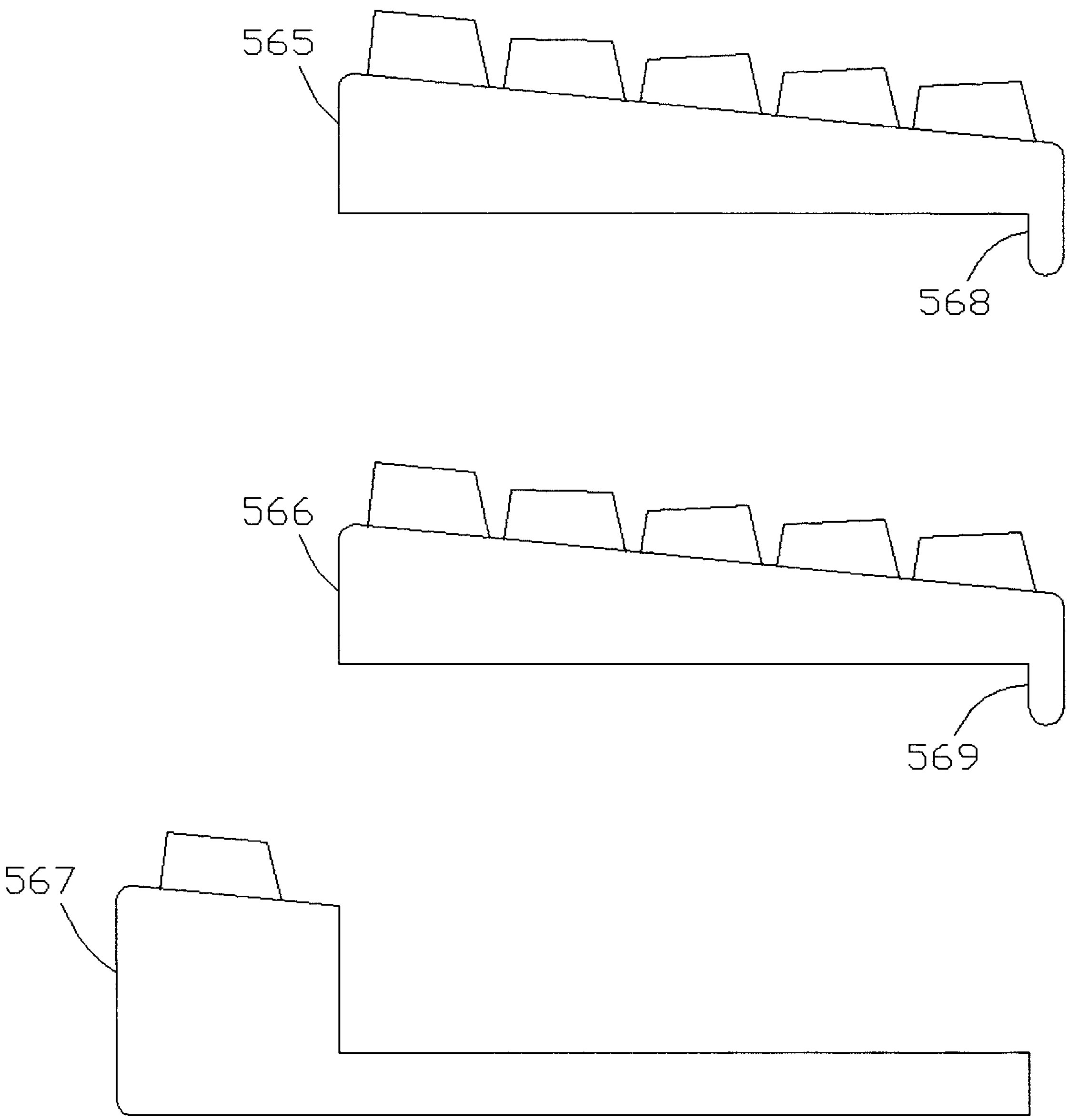
FIG. 79 shows the side views of another design of 2 mouse boards and the supporting platform.

FIG. 79 shows alternate designs of mouse boards 565 and 566 for mouse boards 552 and 553, respectively. The only difference of mouse boards 565 and 566 against mouse boards 552 and 553, respectively, is that the front of the mouse boards 565 and 566 have small portions 568 and 569 extended from underneath of mouse boards 565 and 566, respectively. The base station 567 is an alternate design of base station 554 to be used with mouse boards 565 and 566. The base station 567 is shorter in length than base station 554 so as to allow the extended portion 568 and 569 to touch the surface such as a desktop on where the integrated device is placed. The extended portion 568 and 569 will serve as support for the mouse boards 565 and 566 respectively when which are moved away from the base station 567.

Figure 80:
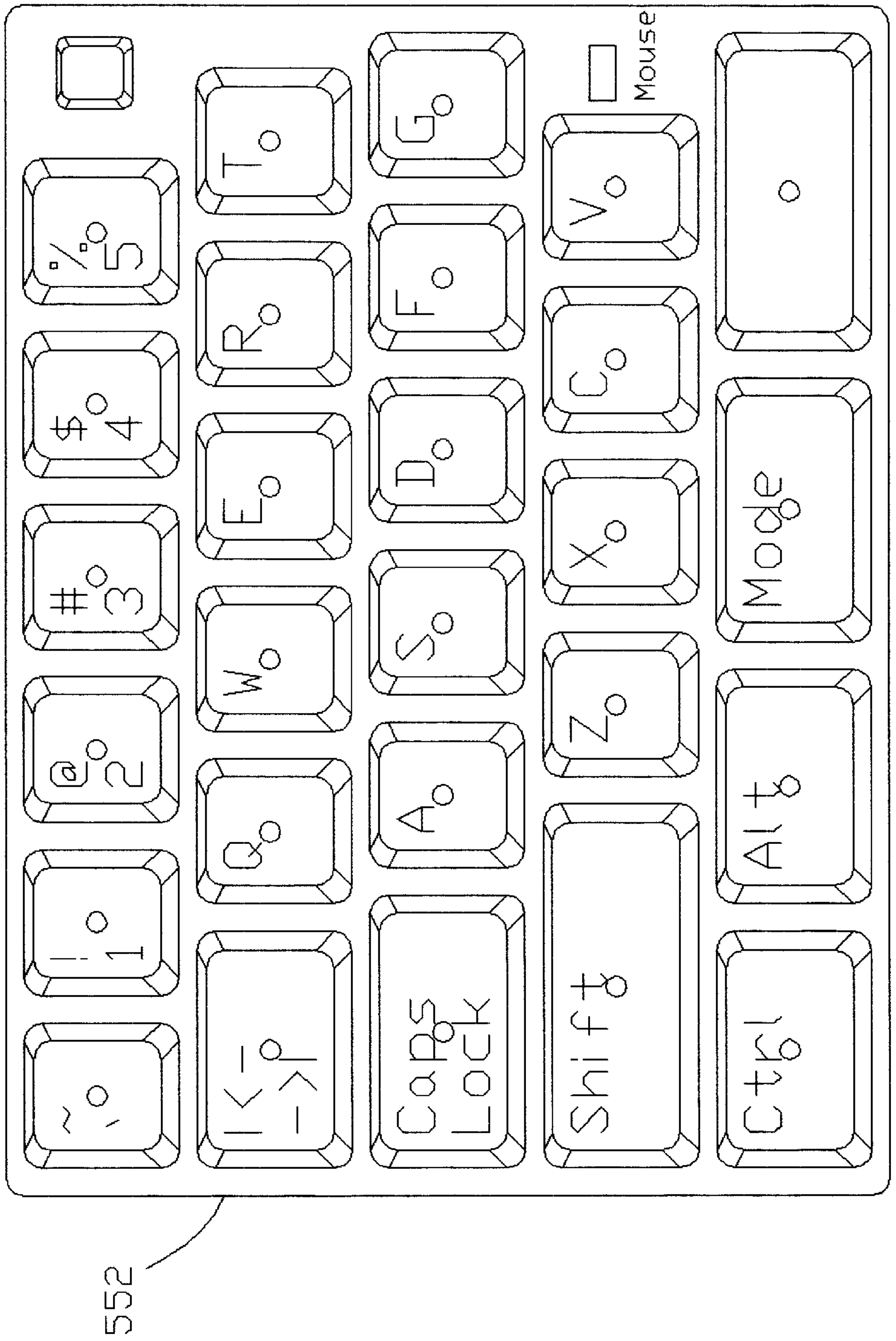
FIG. 80 is an enlarged top view of a mouse board.
Figure 81:
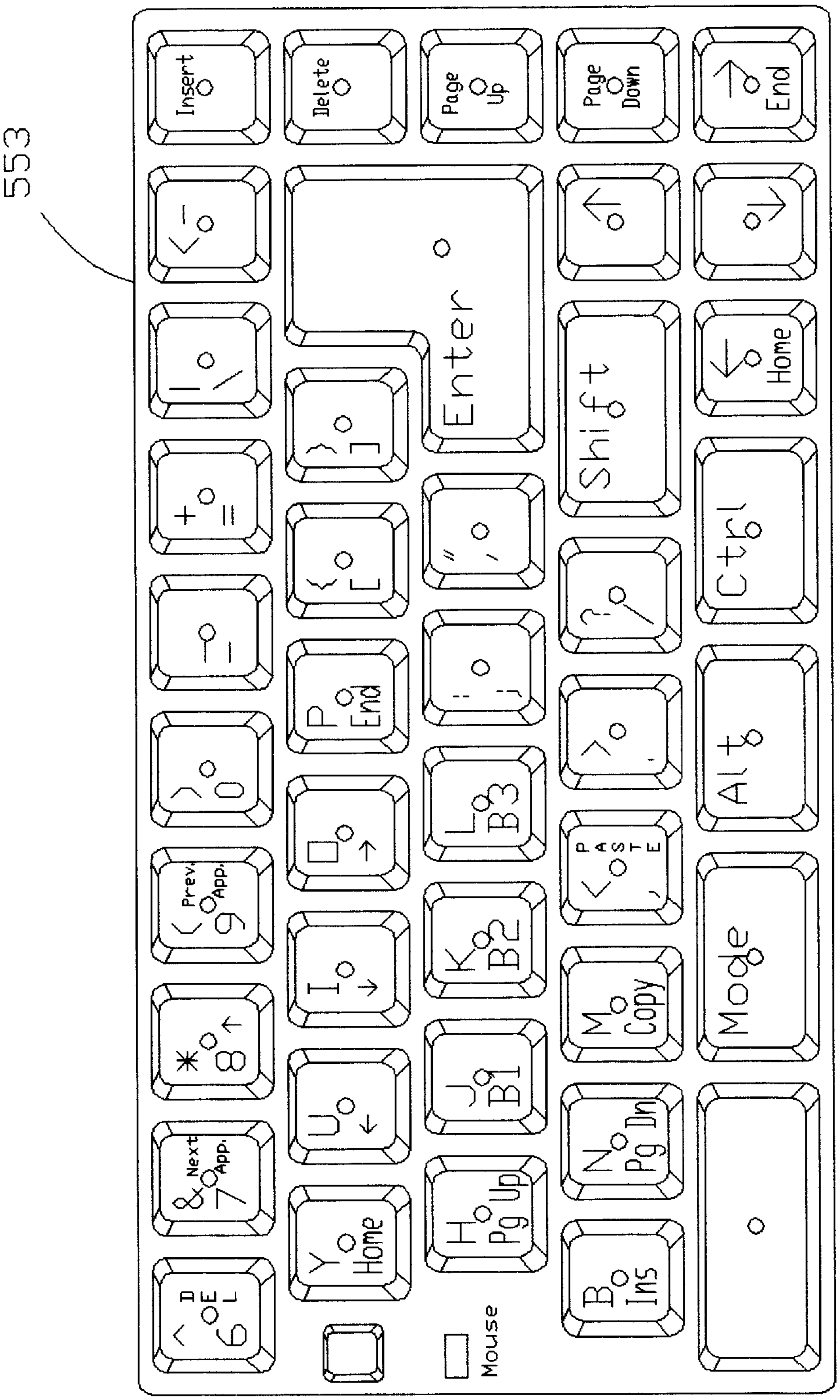
FIG. 81 is an enlarged top view of another mouse board.

FIG. 80 and 81 show the enlarged top views of mouse boards 552 and 553 respectively.

Figure 82:
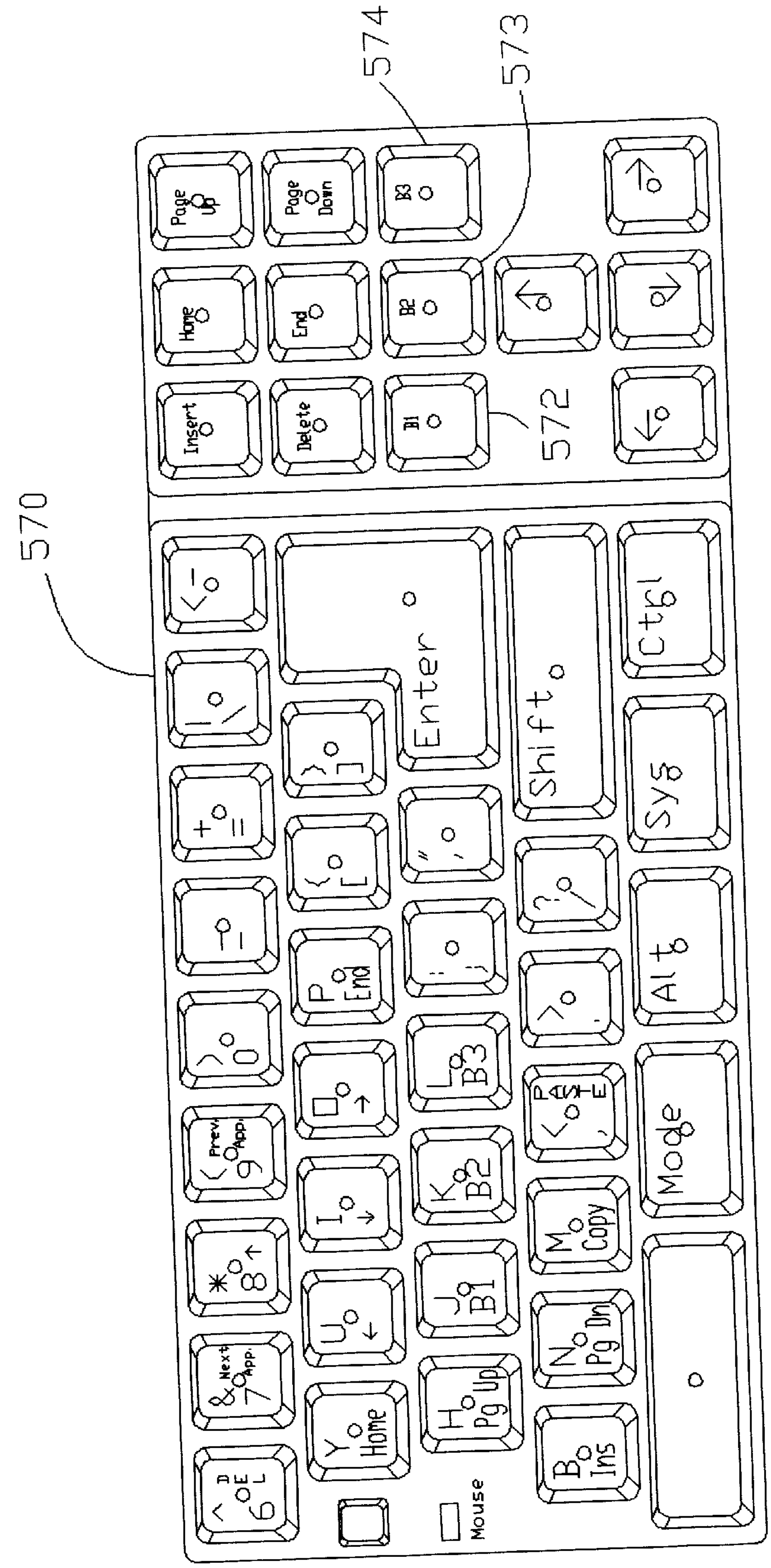
FIG. 82 is an enlarged top view of another mouse board.
Figure 83:
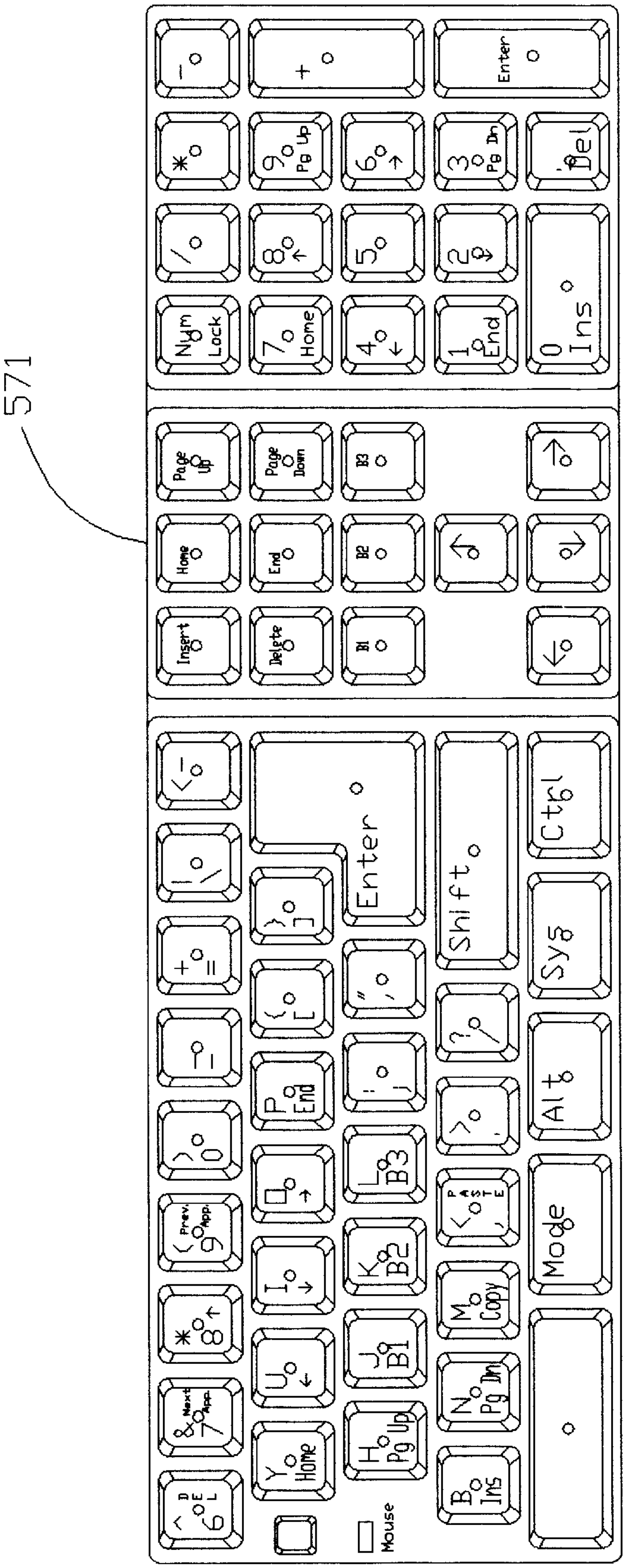
FIG. 83 is an enlarged top view of another mouse board.

FIG. 82 and 83 show the top views of alternate mouse boards 570 and 571 either of which may replace mouse boards 553. Mouse boards 570 and 571 provides more buttons for specialise operations, and thus they are wider and require a wider base station. In particular, there are 3 buttons 572, 573 and 574 specifically designated to function as the mouse buttons 1, 2 and 3, respectively, found in conventional computer mouse.

Figure 84:
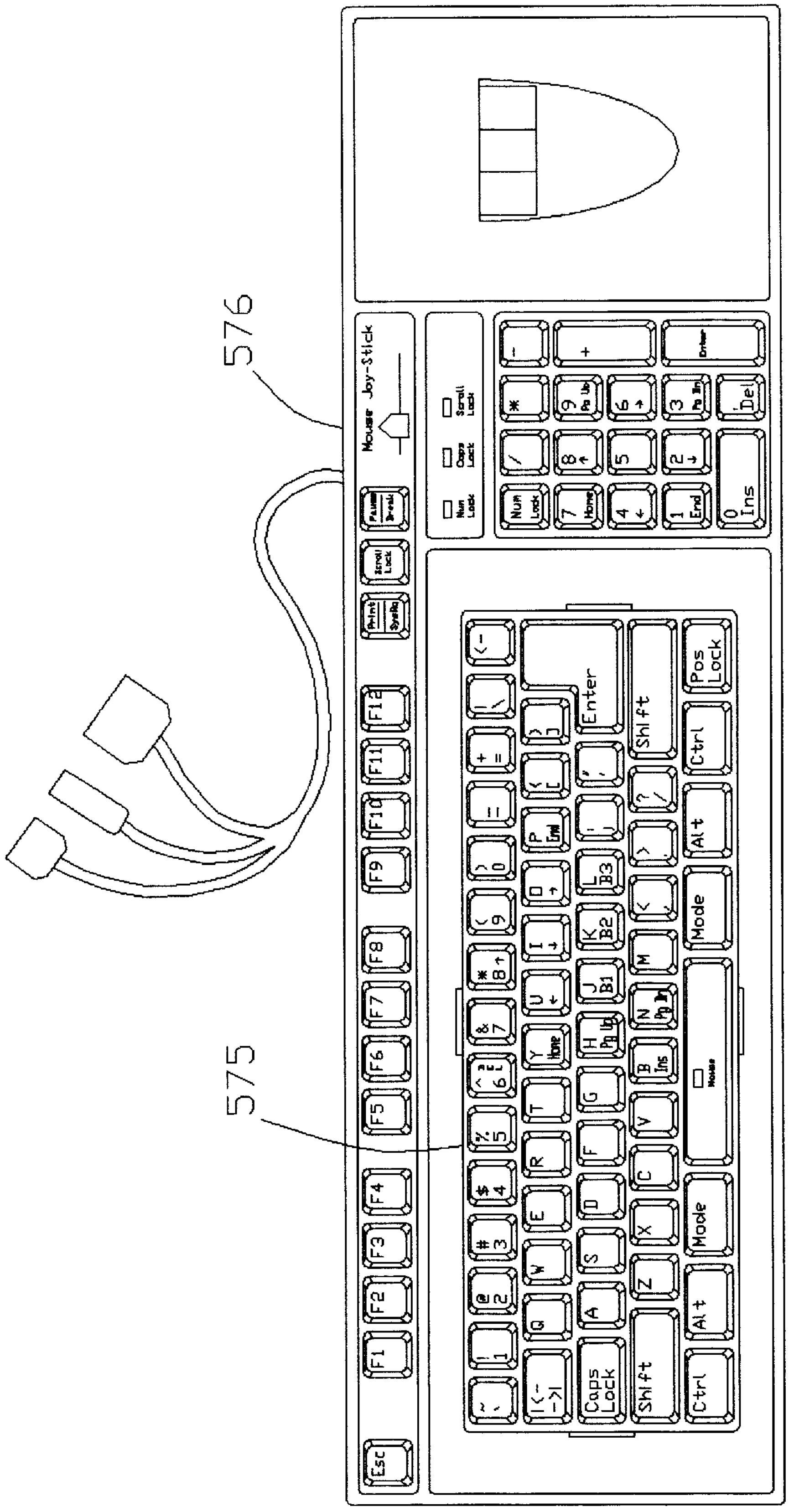
FIG. 84 is a top view of a mouse board integrated with a tailless mouse.
Figure 85:
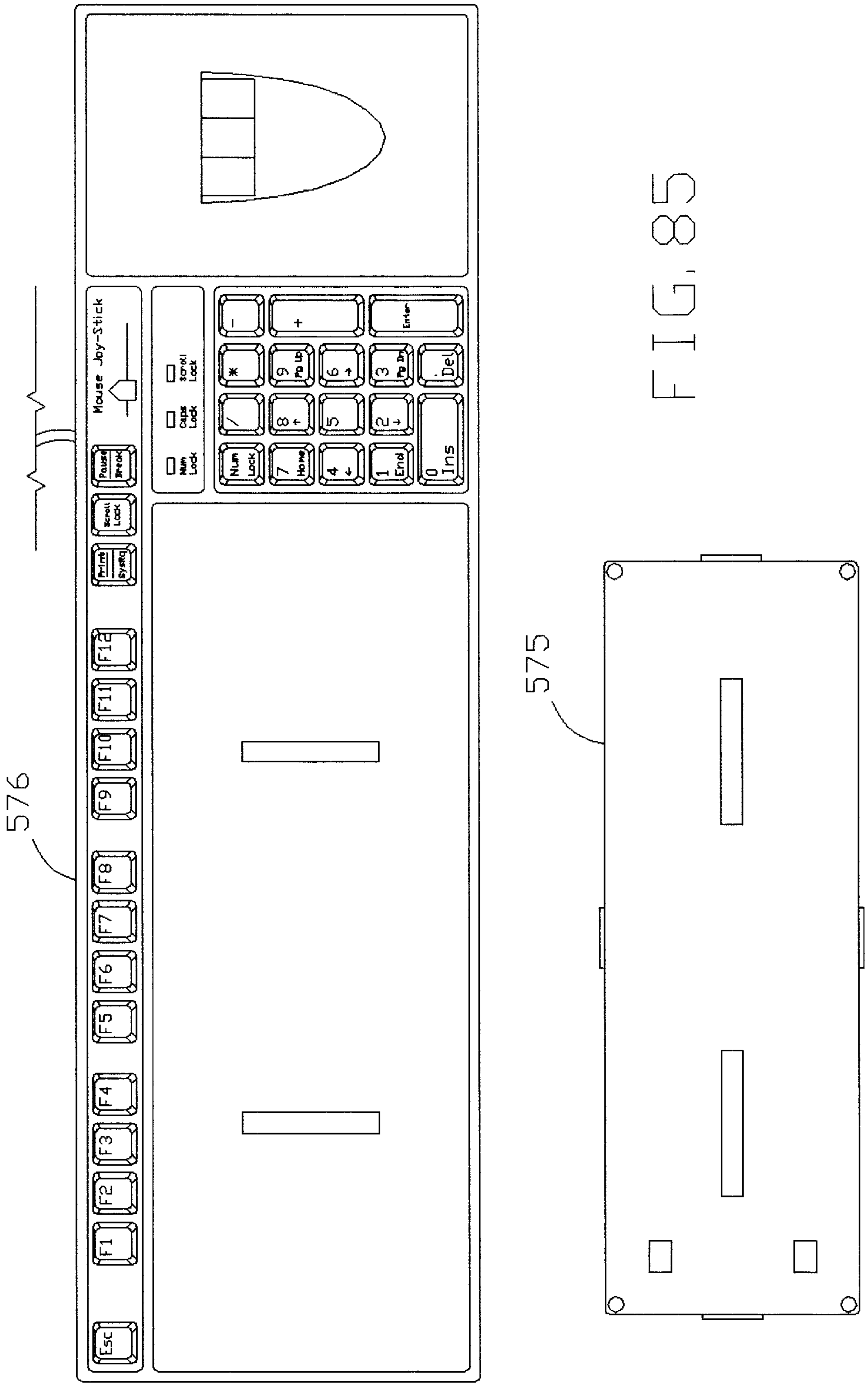
FIG. 85 shows the top view of a supporting platform and the bottom view of a mouse board.
Figure 86:
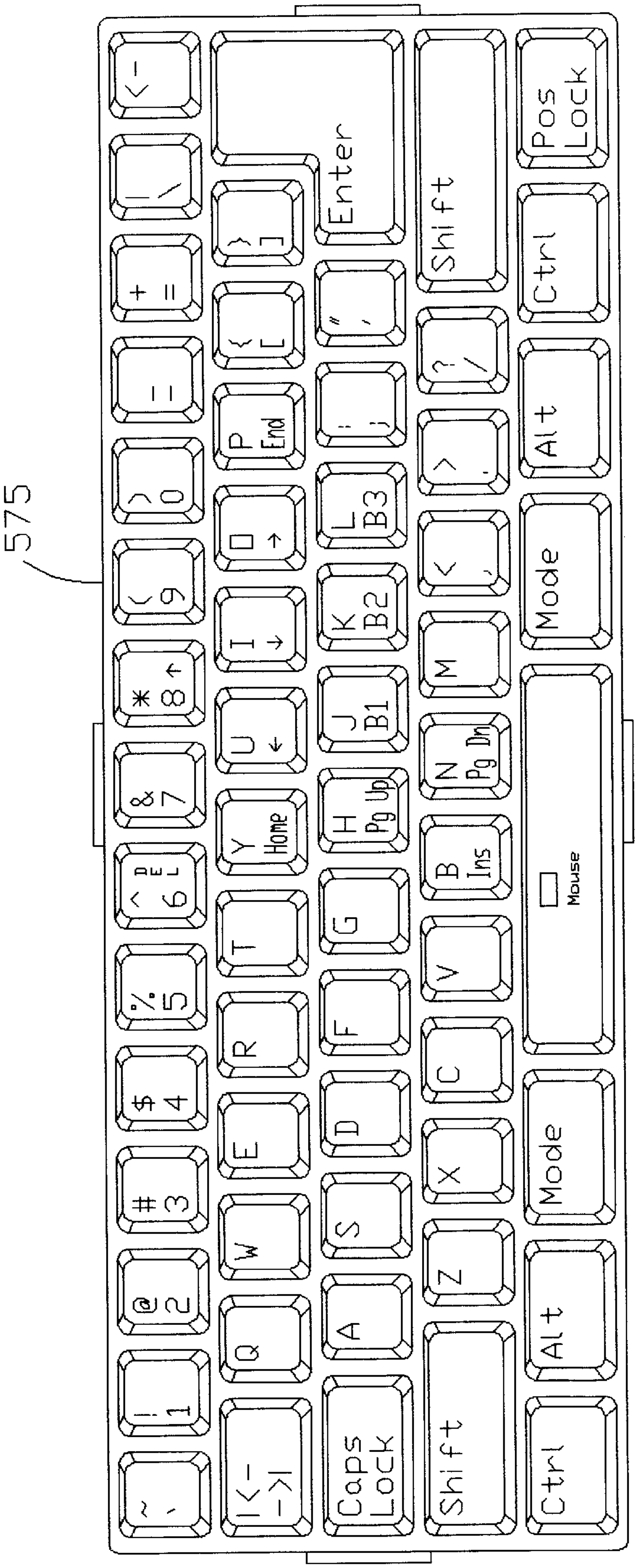
FIG. 86 is an enlarged top view of another mouse board.

FIG. 84 shows another design of a mouse board 575 and base station 576. FIG. 85 shows the top view of base station 576 with mouse board 575 removed, and the bottom view of mouse board 575. FIG. 86 shows the enlarged top view of mouse board 575.

Figure 87:
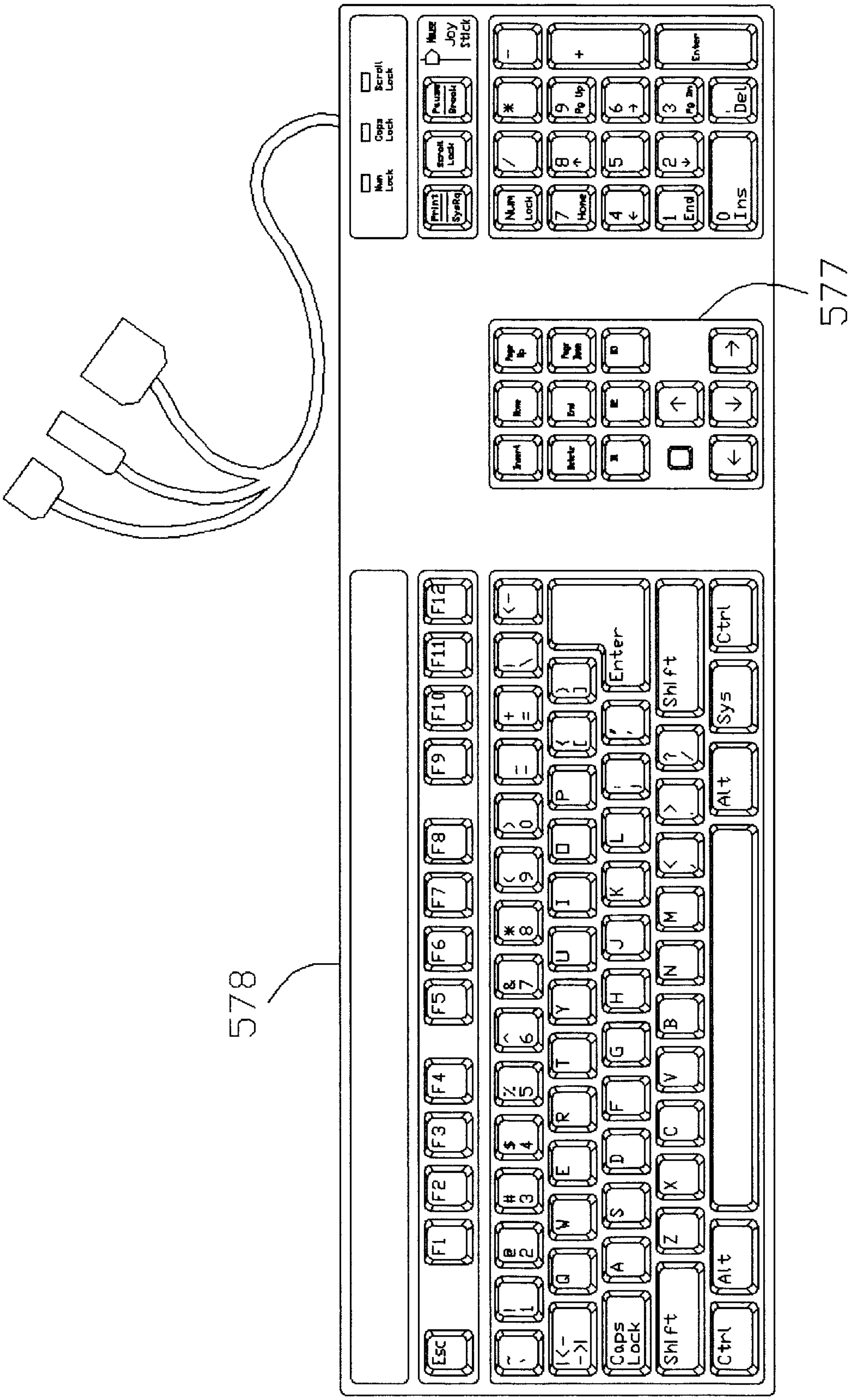
FIG. 87 is a top view of a mouse board integrated with a keyboard.
Figure 88:
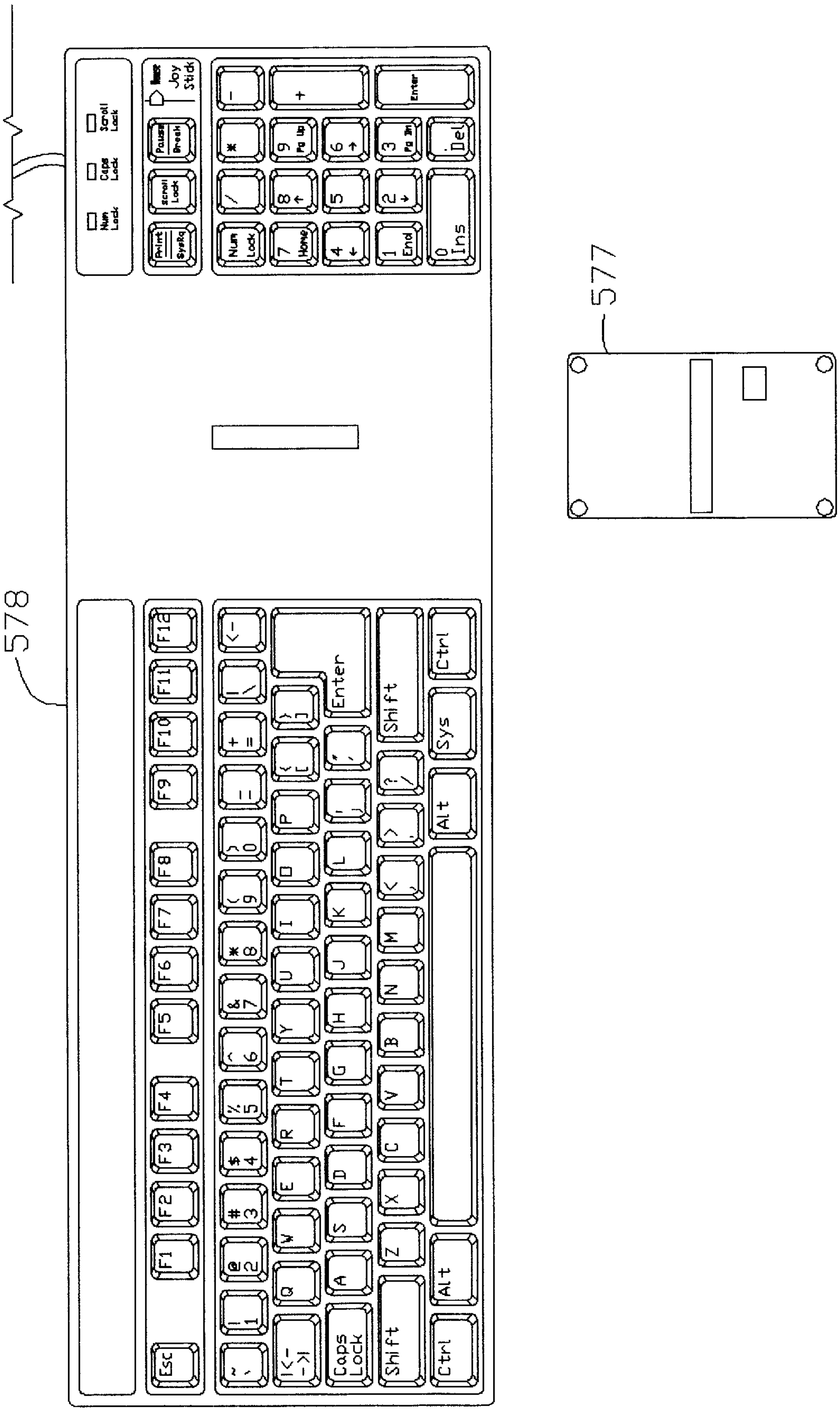
FIG. 88 shows the top view of a supporting platform and the bottom view of a mouse board in FIG. 87.
Figure 89:
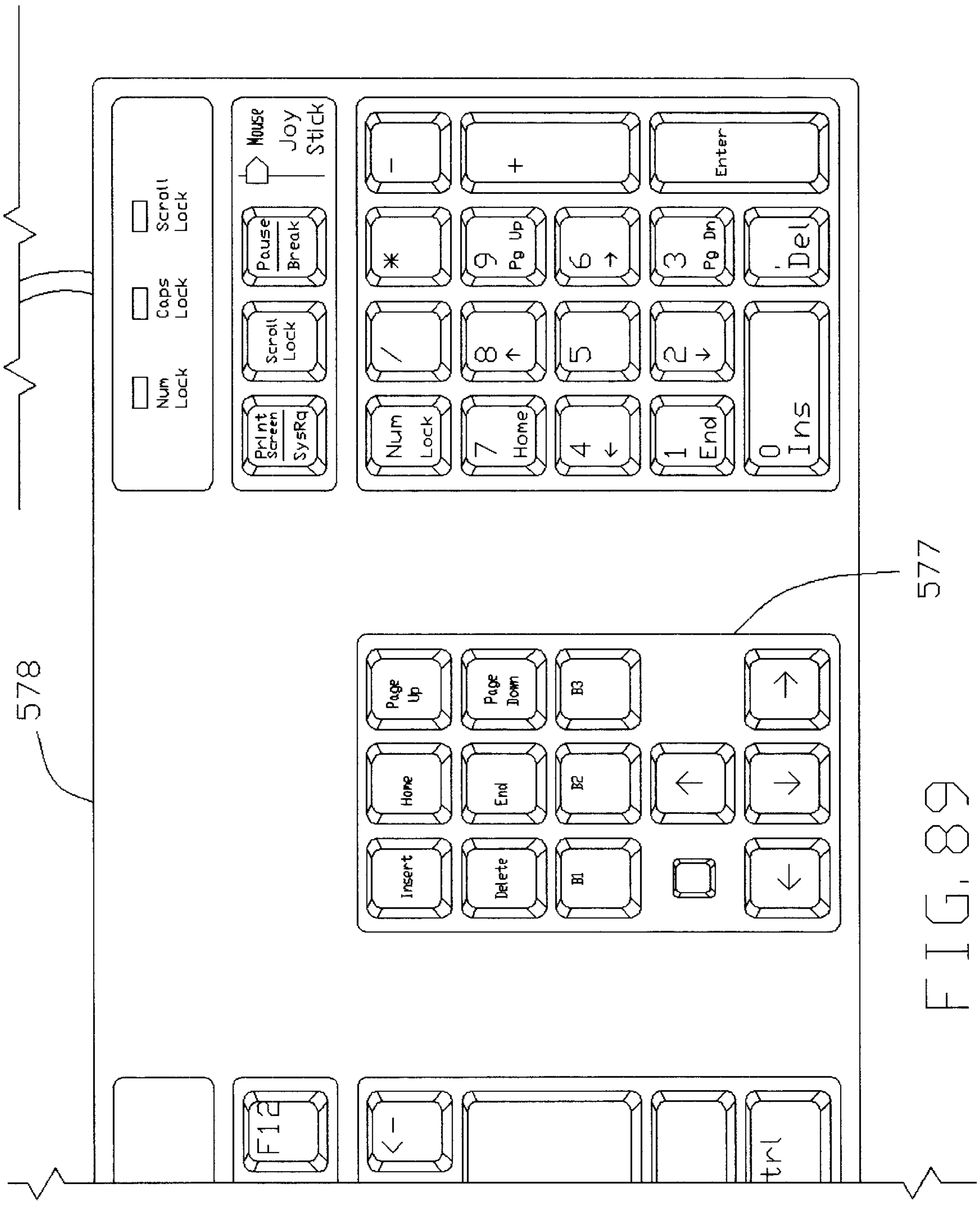
FIG. 89 is an enlarged top view of the mouse board in FIG. 87.

FIG. 87 shows another design of a mouse board 577 and base station 578. FIG. 88 shows the top view of base station 578 with mouse board 577 removed, and the bottom view of mouse board 577. FIG. 89 shows the enlarged top view of mouse board 577 on a portion of base station 578.

Figure 90:
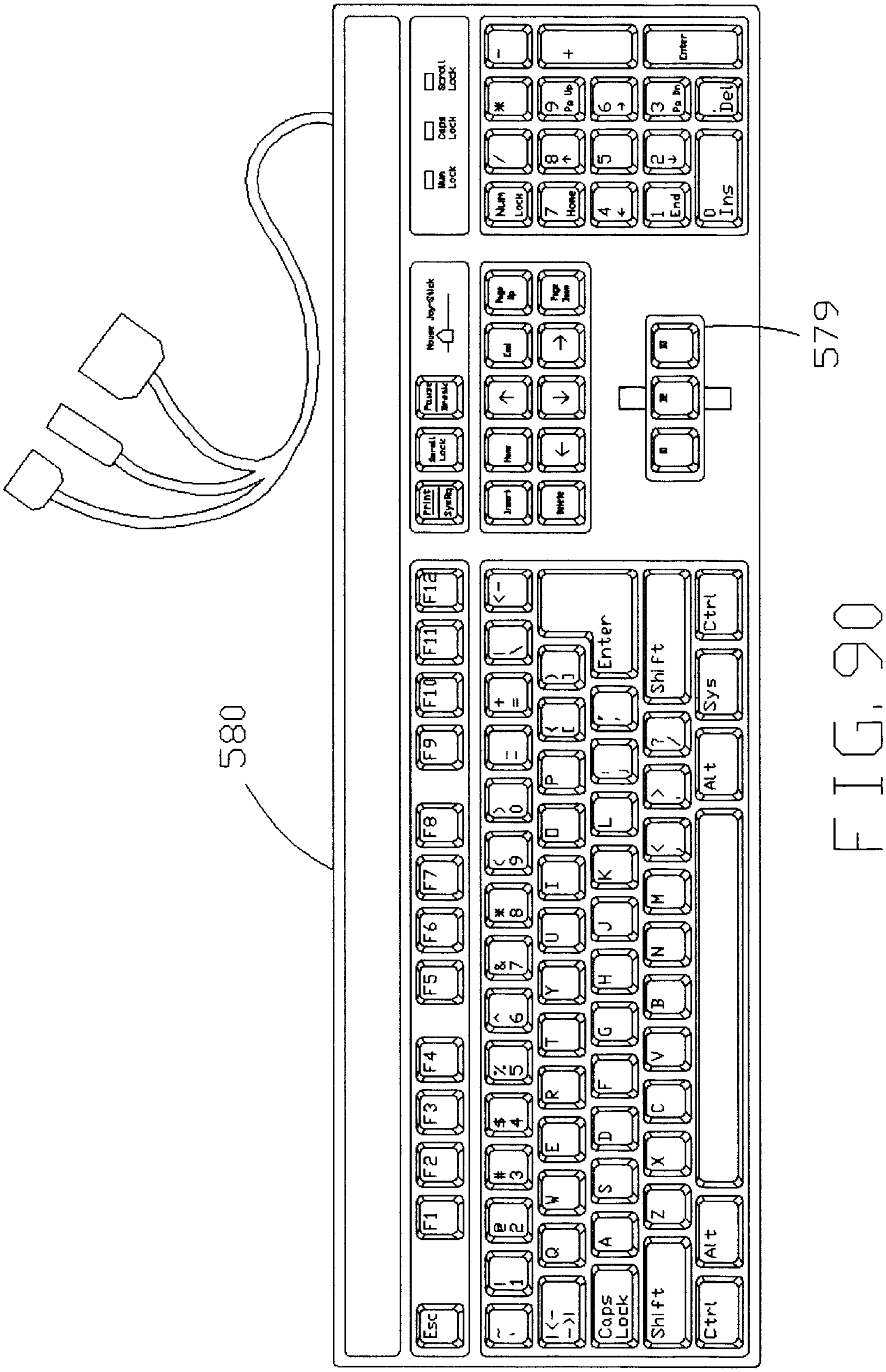
FIG. 90 is a top view of a mouse board integrated with keyboard.
Figure 91:
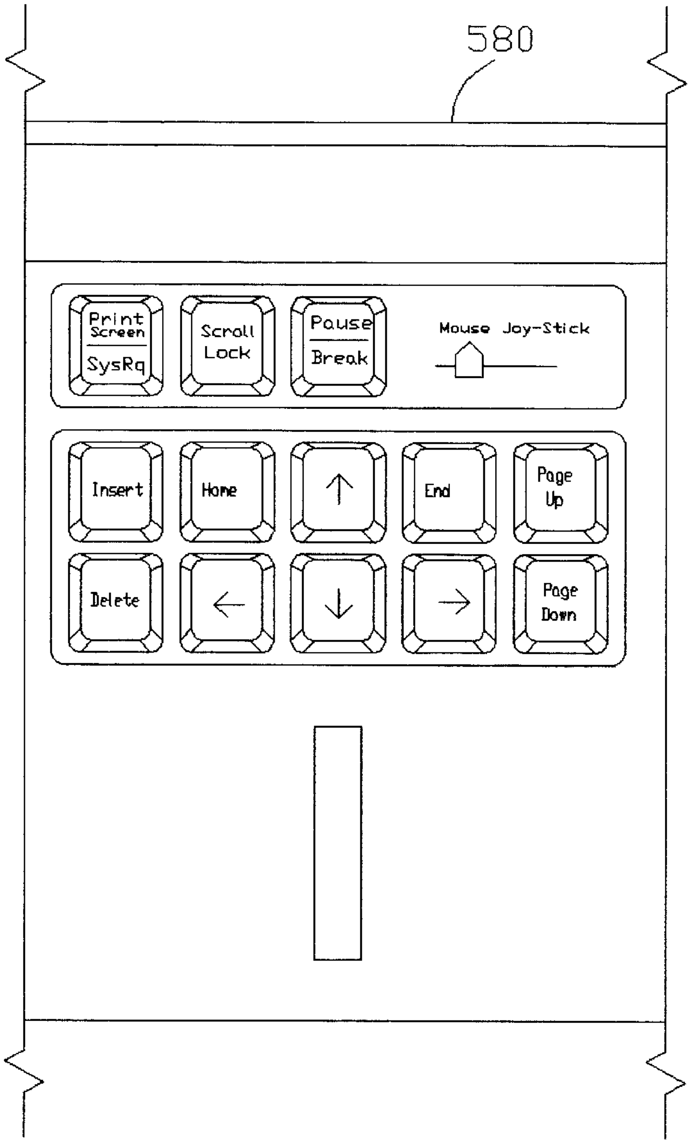
FIG. 91 is a top view of a supporting platform.
Figure 92:
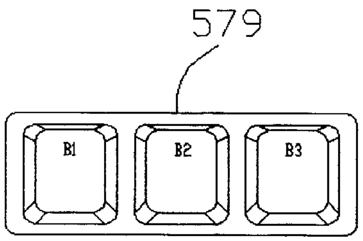
FIG. 92 is an enlarged top view of a mouse board.
Figure 93:
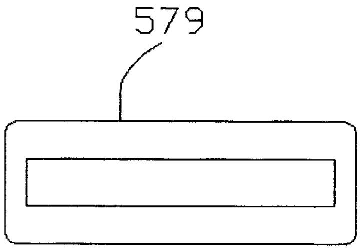
FIG. 93 is a bottom view of mouse board in FIG. 92.

FIG. 90 shows another design of a mouse board 579 and base station 580. FIG. 91 shows the top view of a portion of base station 580 with mouse board 579 removed. FIG. 92 and 93 show the enlarged top and bottom view of mouse board 579, respectively.

Figure 94:
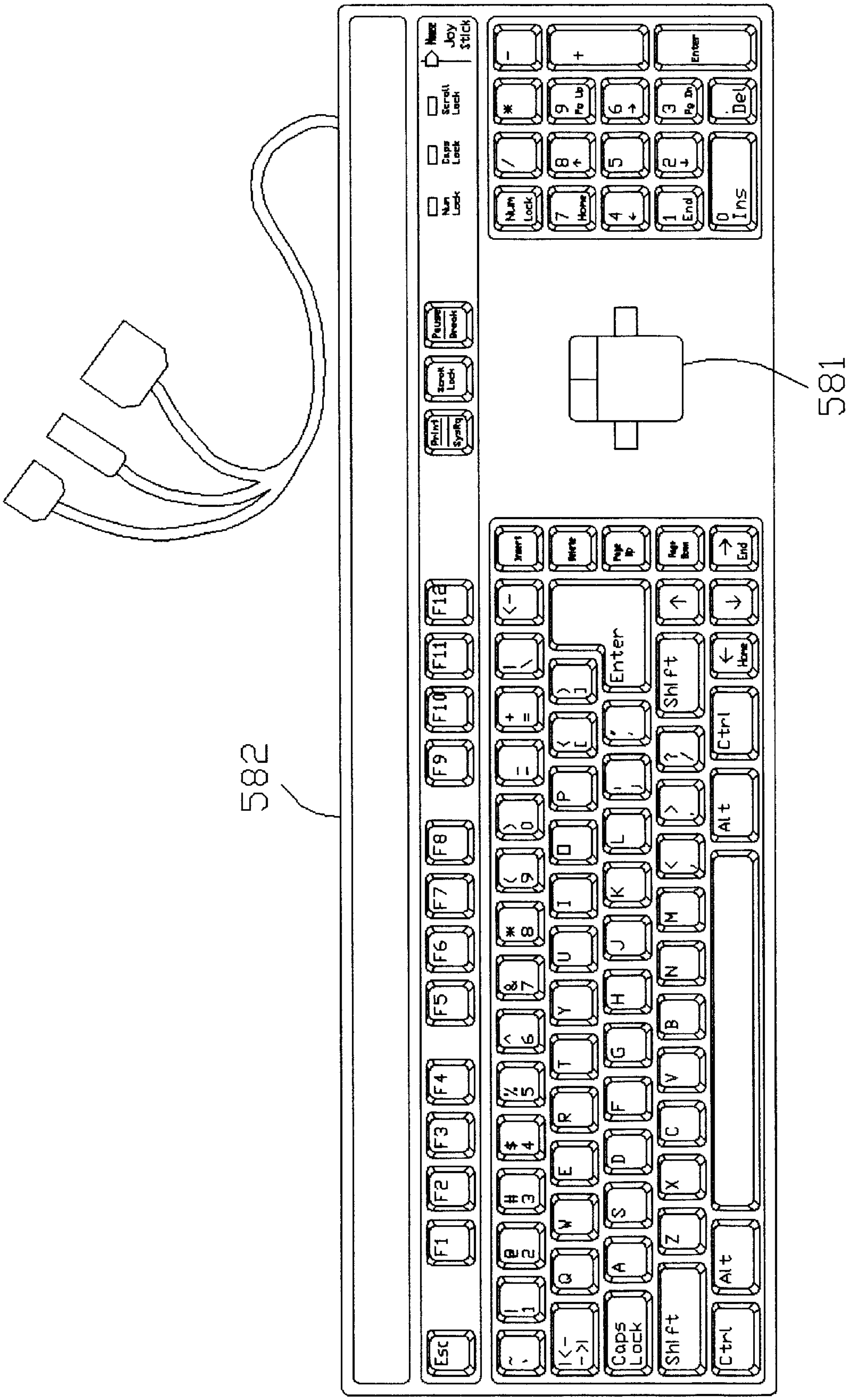
FIG. 94 is top view of a tailless mouse integrated with a keyboard.
Figure 96:
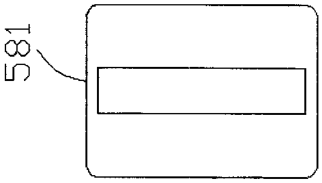
FIG. 96 is an enlarged bottom view of tailless mouse in FIG. 94.
Figure 95:
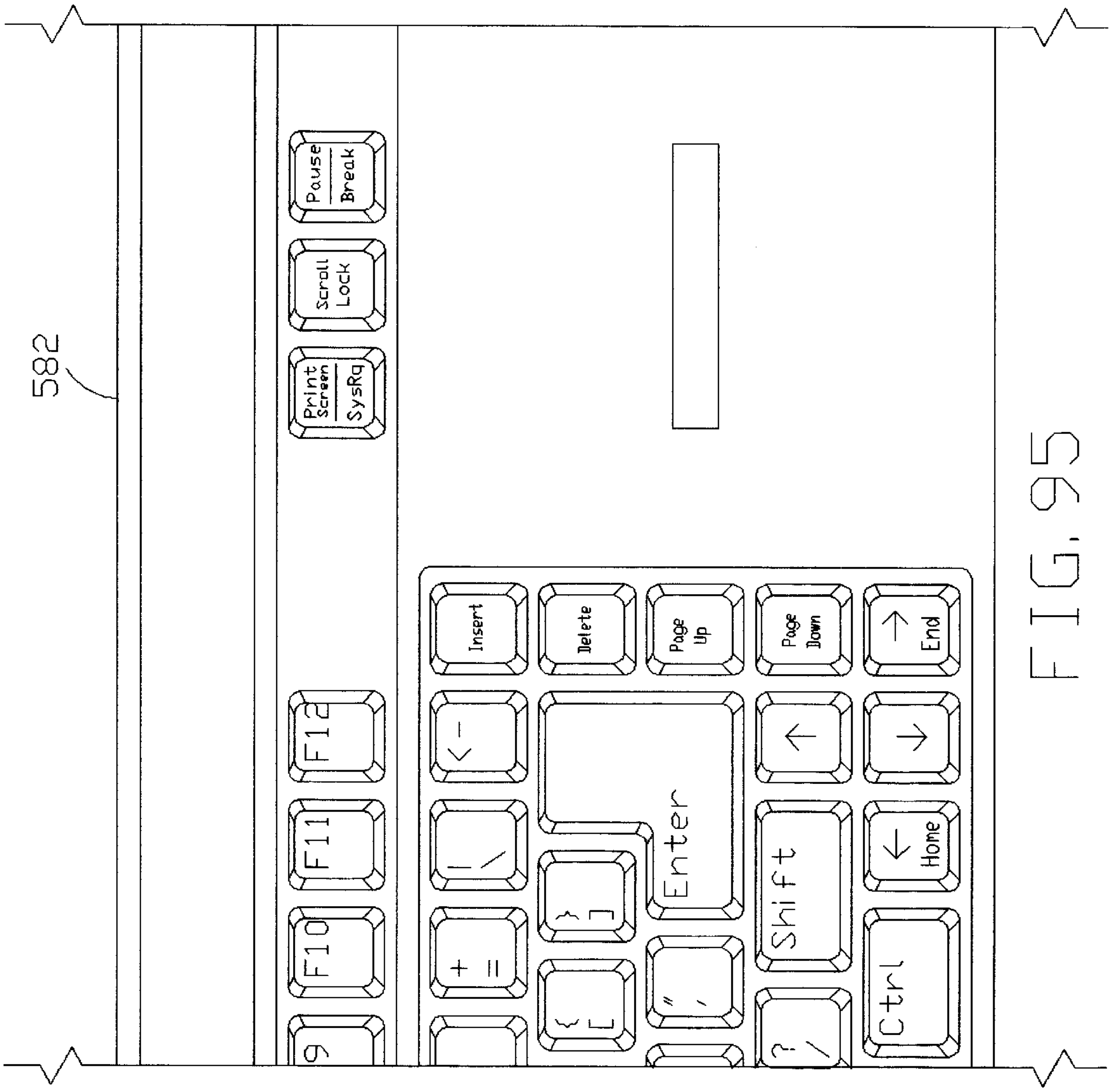
FIG. 95 is an enlarged top view of platform surface in FIG. 94.

FIG. 94 shows another design of a mouse board 581 and base station 582. FIG. 95 shows the enlarged top view of a portion of base station 582 with mouse board 581 removed. FIG. 96 shows the enlarged bottom view of mouse board 581.

Figure 97:
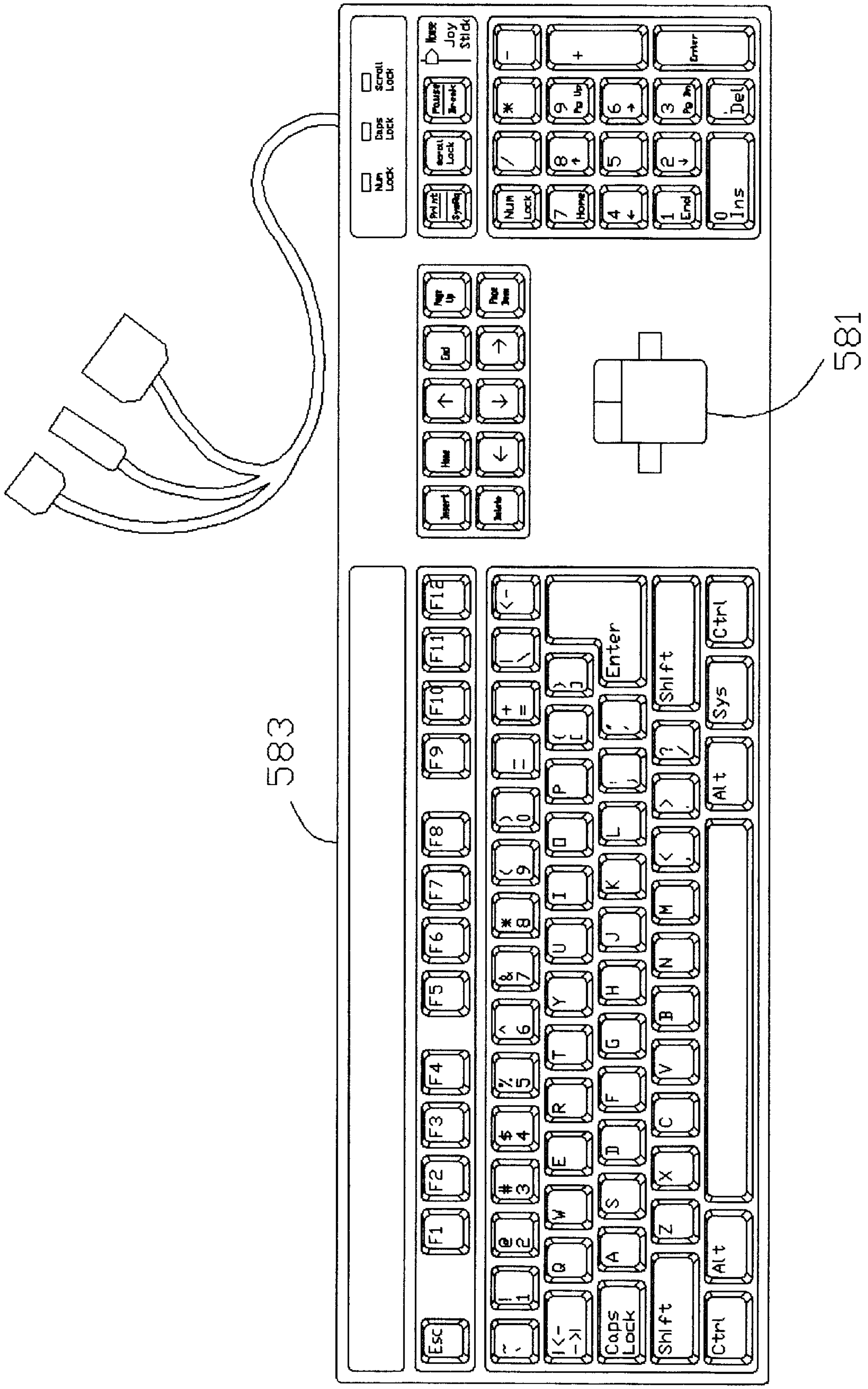
FIG. 97 is a to view of a tailless mouse integrated with a keyboard having a different layout.
Figure 98:
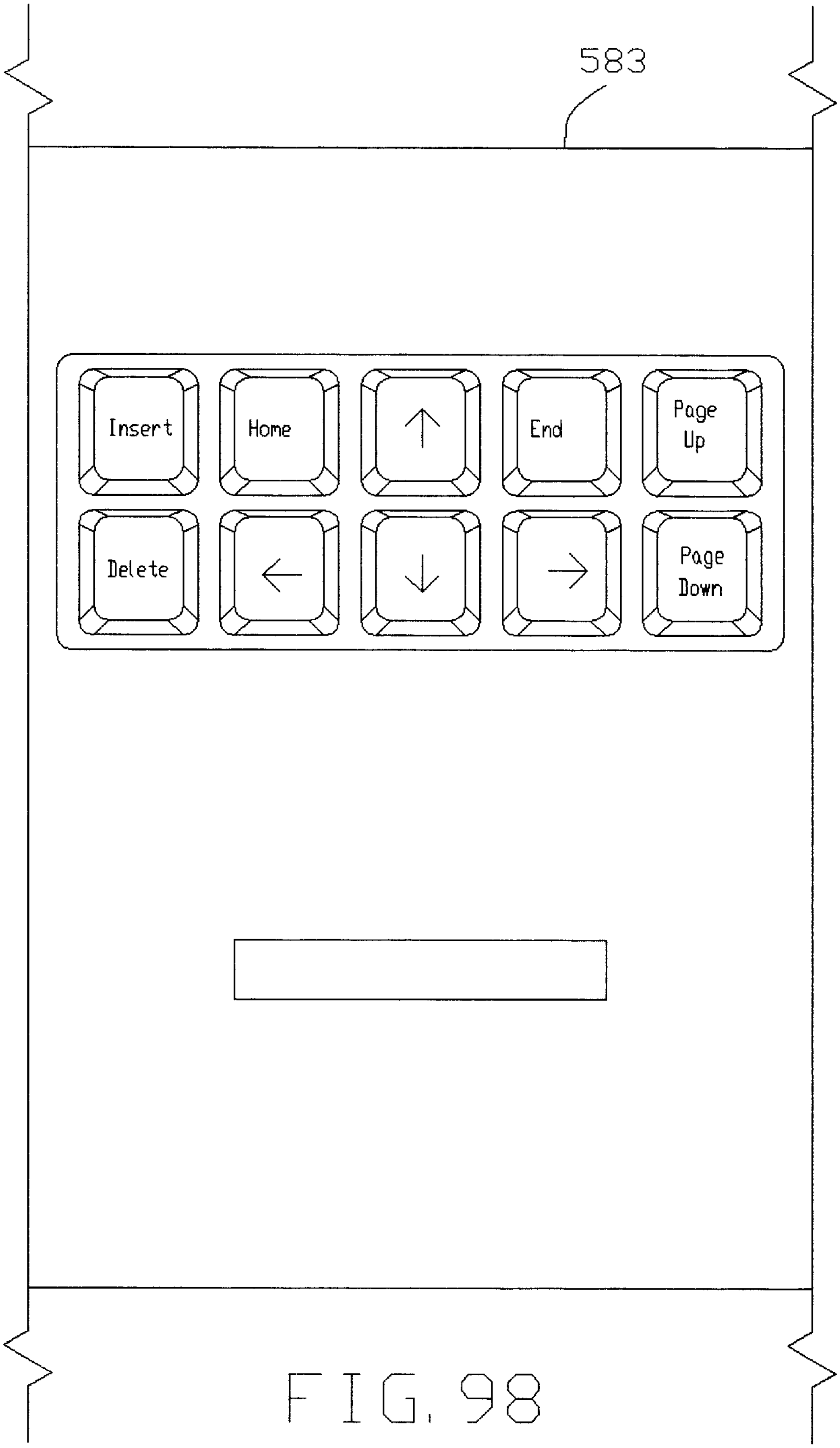
FIG. 98 is an enlarged top view of portion of a keyboard and supporting platform surface for a tailless mouse.

FIG. 97 shows another design of a base station 583 that may also be used with mouse board 581. FIG. 98 shows the enlarged top view of a portion of base station 583 with mouse board 581 removed.

Figure 99:
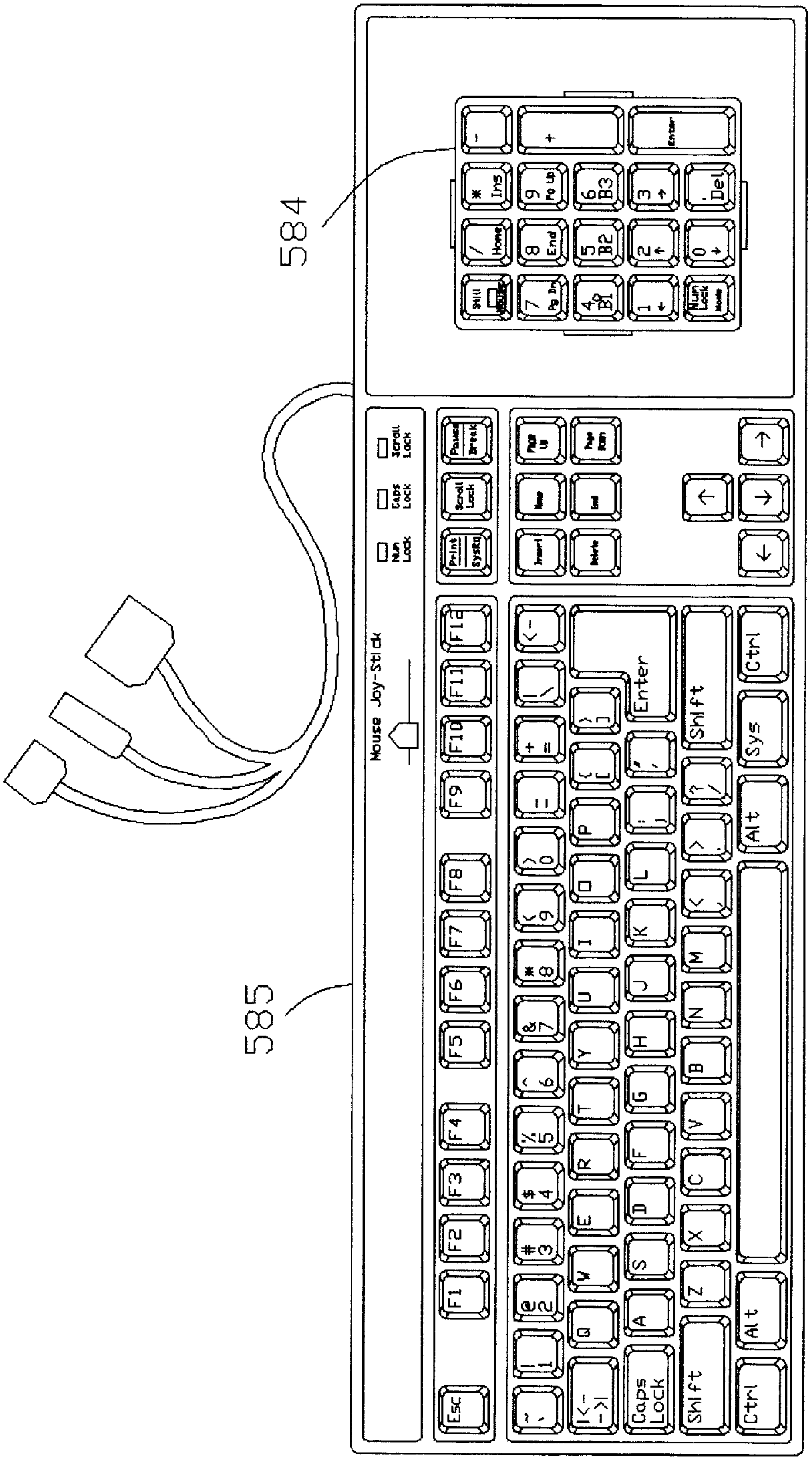
FIG. 99 is one design of a mouse board integrated with a keyboard.
Figure 100:
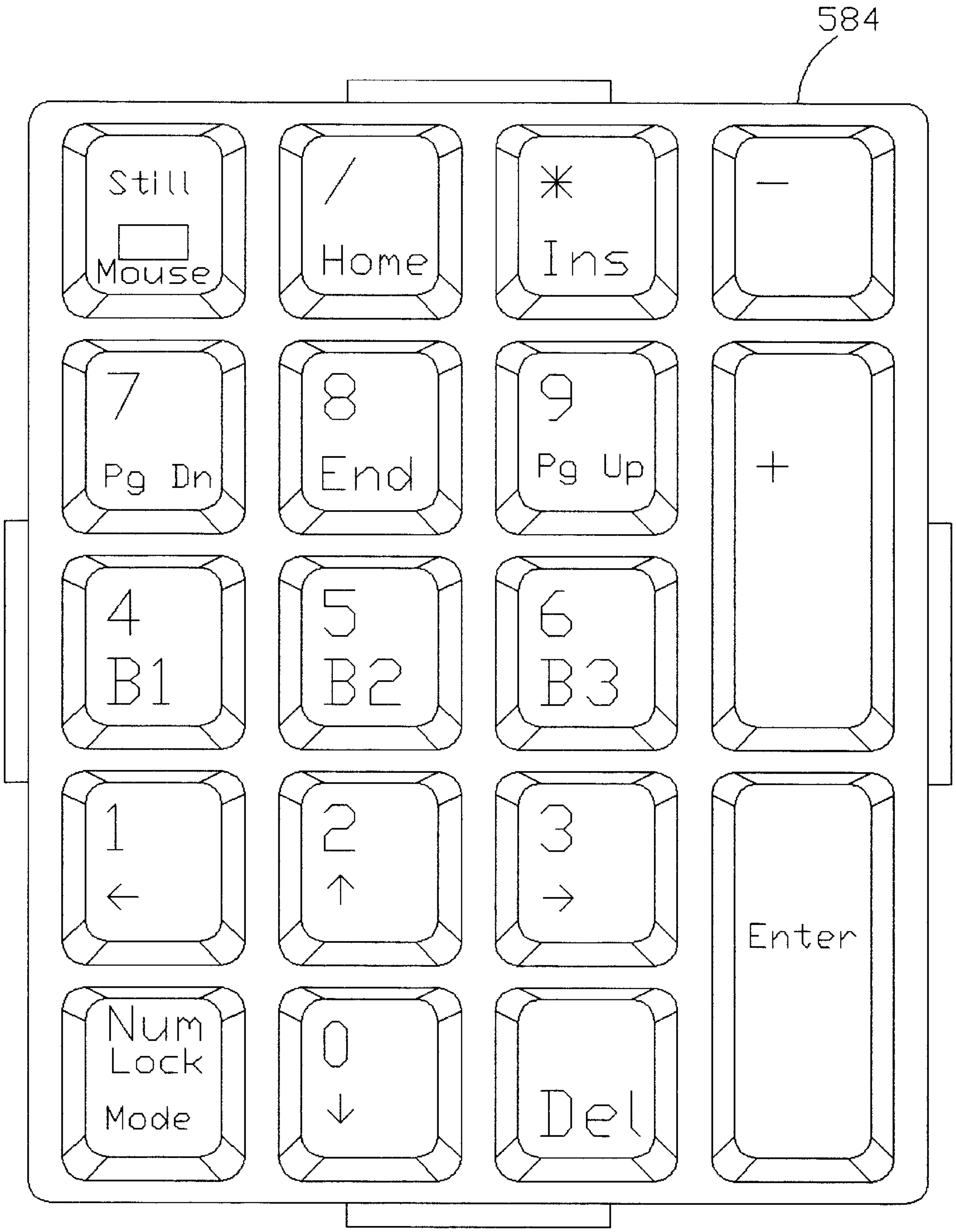
FIG. 100 is an enlarged top view of mouse board in FIG. 99.

FIG. 99 shows another design of a mouse board 584 and base station 585. FIG. 100 shows the enlarged top view of mouse board 584.

Figure 101:
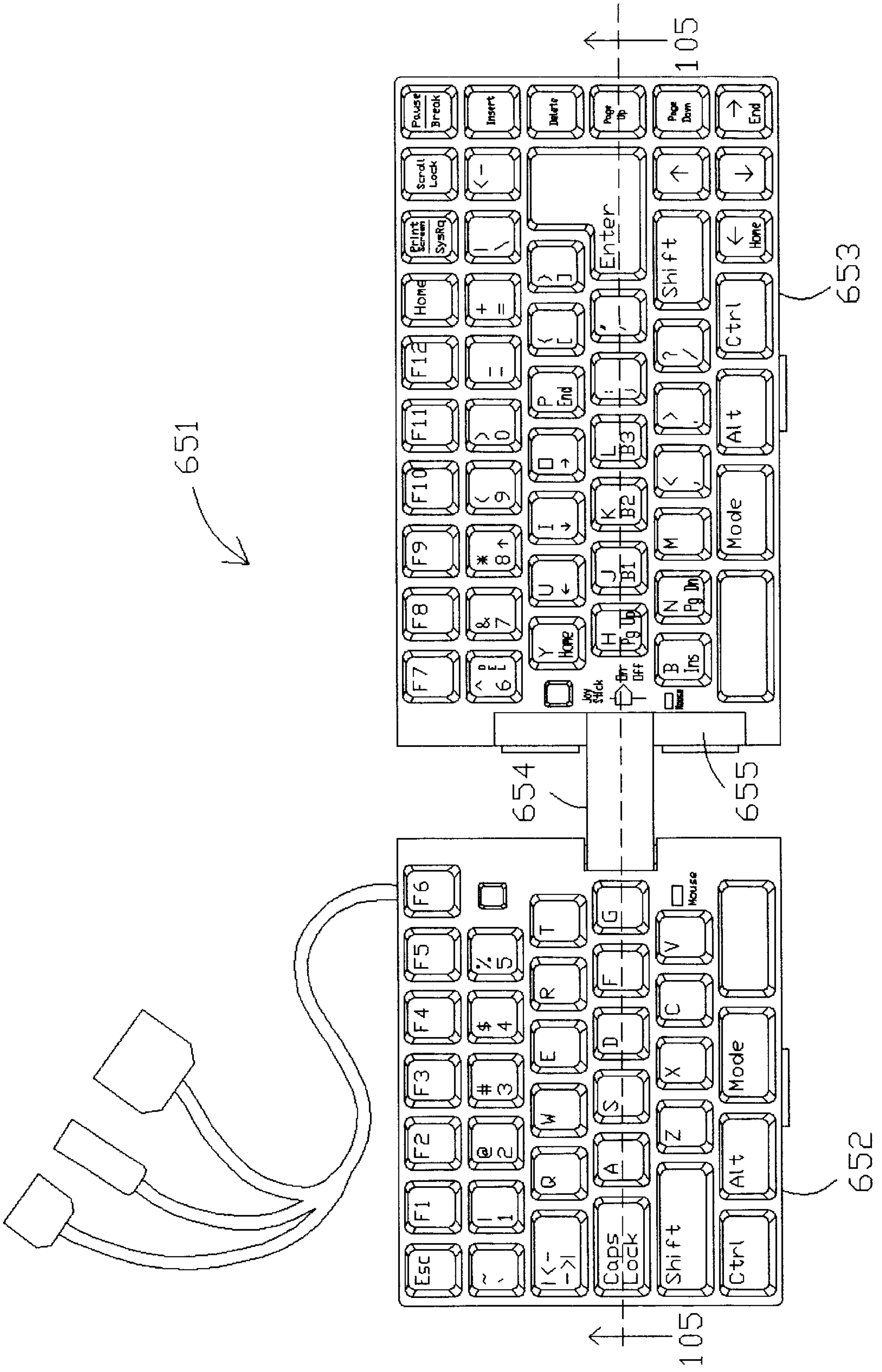
FIG. 101 is one design of 2 mouse boards.

FIG. 101 shows the top view of a composite design of keyboard and mouse device 651 which consists of two mouse boards 652 and 653 connected by a mouse link 654. Mouse link 654 has one end secured with mouse board 652 and another end extended into mouse board 653.

Mouse board 652 also serves as a base station for mouse board 653, wherein the cavity 655 allows mouse board 653 to move in 2 dimensions relative to mouse link 654. Conversely, mouse board 653 serves as a base station for mouse board 652 wherein mouse board 652 together with mouse link 654 can move in 2 dimensions within the cavity 655.

Figure 102:
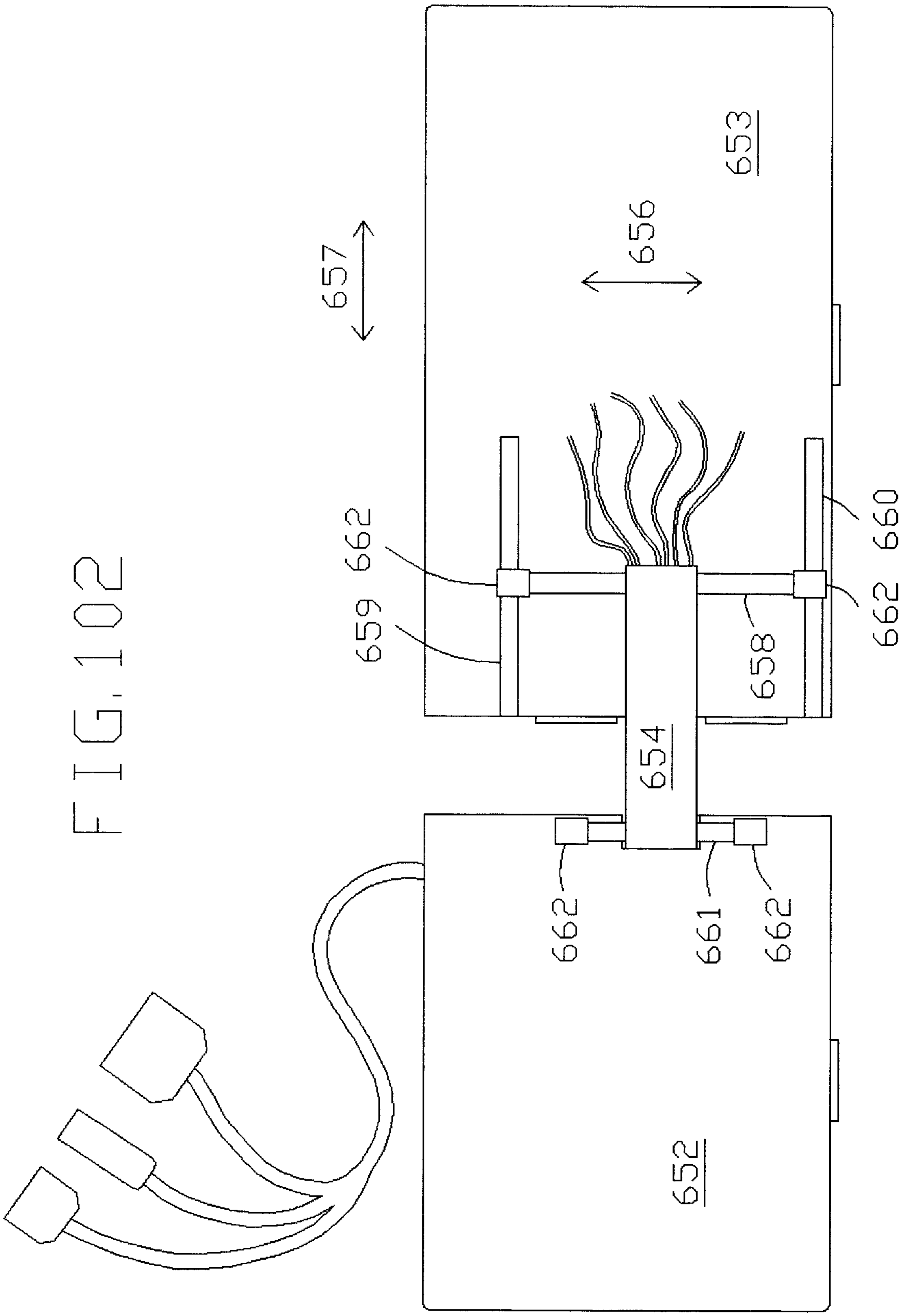
FIG. 102 shows the internal layout of a mouse link for mouse boards in FIG. 101.

FIG. 102 shows the top view of device 651 with the surface portion removed. It shows that mouse link 654 is similar in concept with mouse link 303 in FIG. 39. Mouse Link 652 has one end secured with mouse board 652 and the other end movably mounted within the cavity 655 of mouse board 653. Mouse Link 654 may move in the direction indicated by arrow 656 along the axle 658, and mouse link 654 together with axle 658 may move in the direction indicated by arrow 657 along the axles 659 and 660. Sensors (not shown) such as the one shown in FIG. 39 can be used to detect the positions or movements of mouse link 654.

Figure 103:
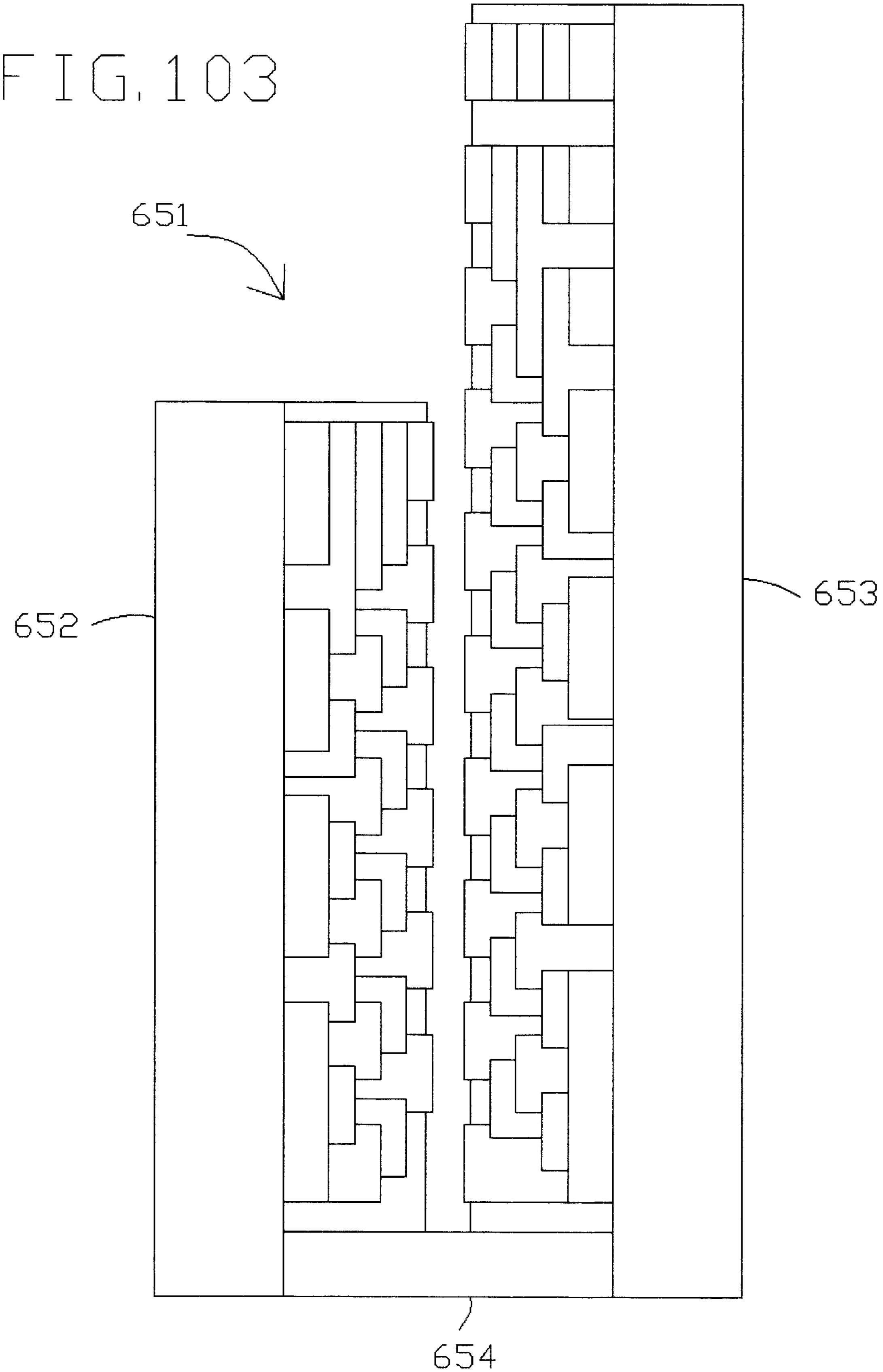
FIG. 103 is a side view of mouse boards in FIG. 101 being folded upward.
Figure 104:
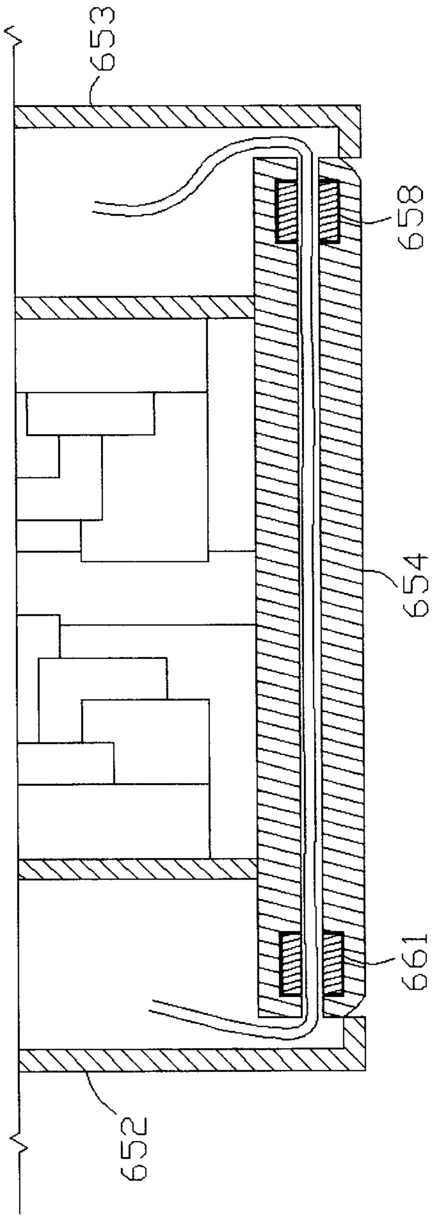
FIG. 104 is a section view of mouse boards in FIG. 101.
Figure 105:
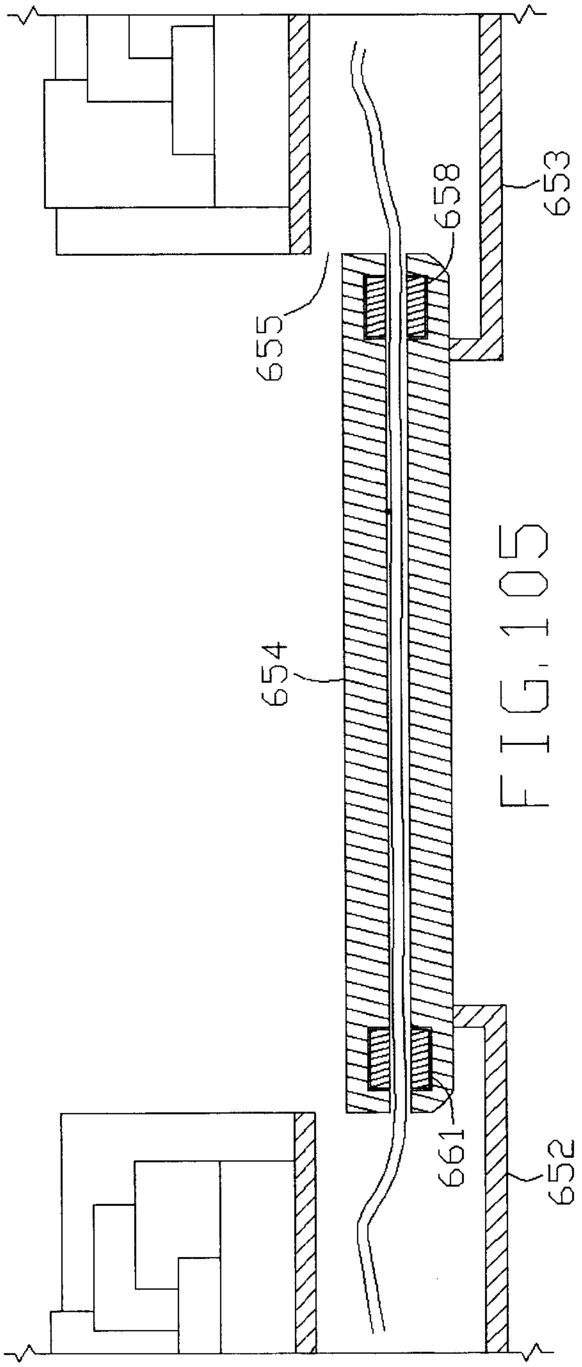
FIG. 105 is another section view of mouse boards in FIG. 101.

FIG. 103 shows the front view of composite device 651 when which is folded. Referring back to FIG. 102, mouse boards 652 can rotate about the axle 661 by rotary joints 662 at the ends of the axle 661. And when mouse board 653 is moved along the direction of arrow 657 so that the axle 658 reaches the opening 655 (see FIG. 101), the mouse board 653 can rotate about the axle 658 also by rotary joints 662 at both ends of the axle 658. FIG. 104 further describes the inner working when device 651 is folded. It also shows how signals can be communicated such as by wires among the mouse boards. FIG. 105 shows device 651 when it is not folded.

Figure 106:
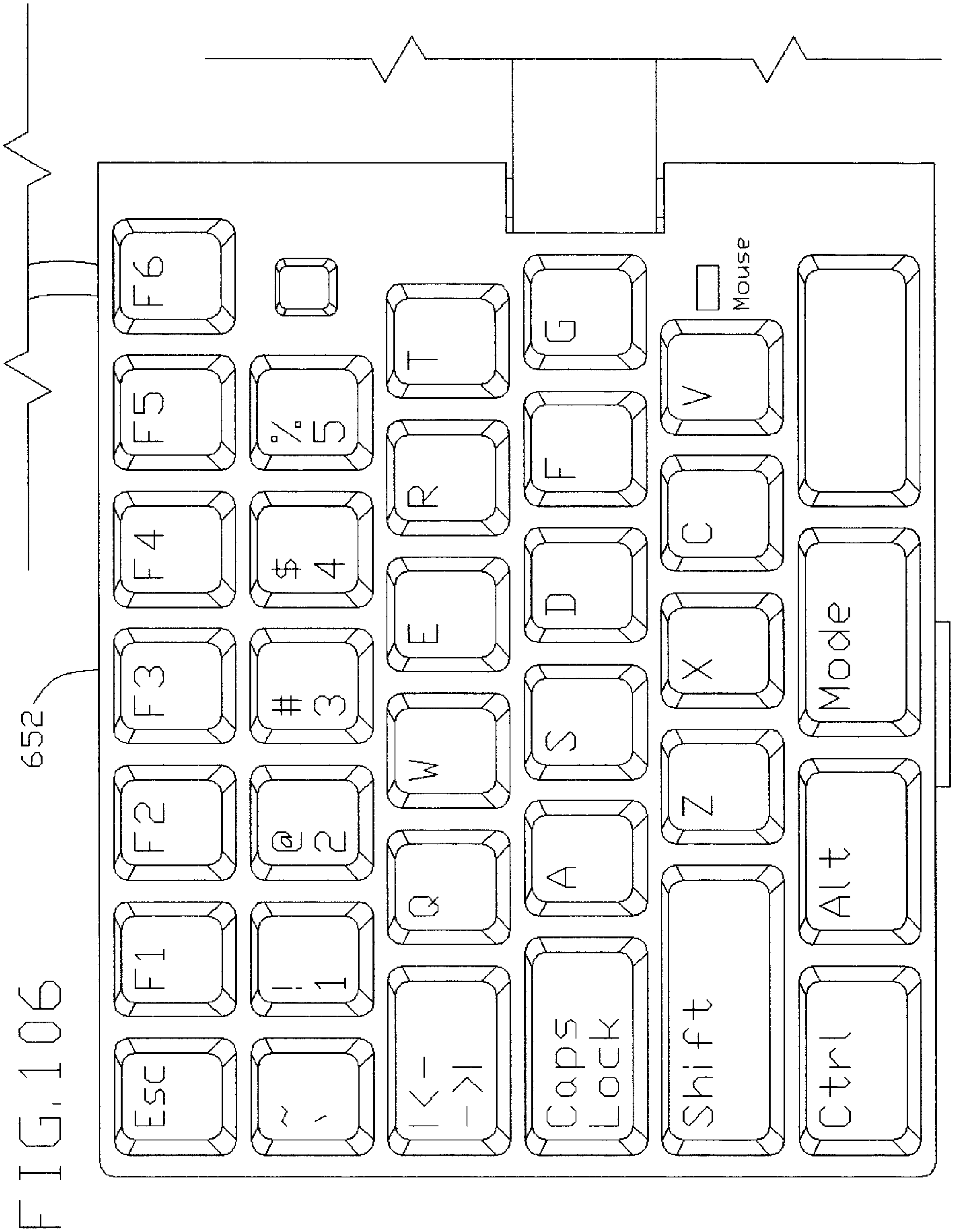
FIG. 106 is an enlarged top view of one of the mouse boards in FIG. 101.
Figure 107:
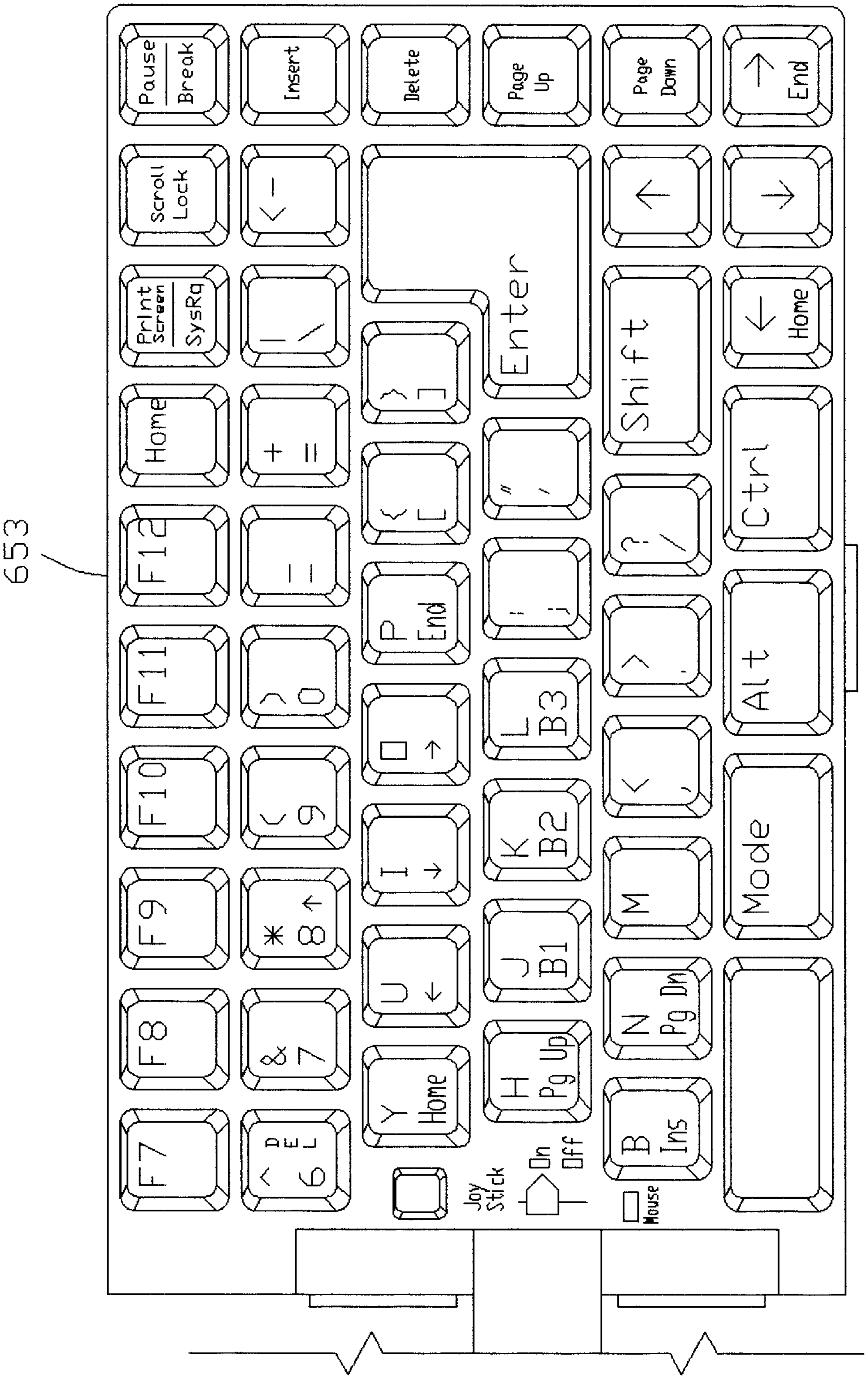
FIG. 107 is an enlarged top view of the other mouse board in FIG. 101.

FIG. 106 and 107 show the enlarged top views of mouse boards 652 and 653 respectively.

Figure 108:
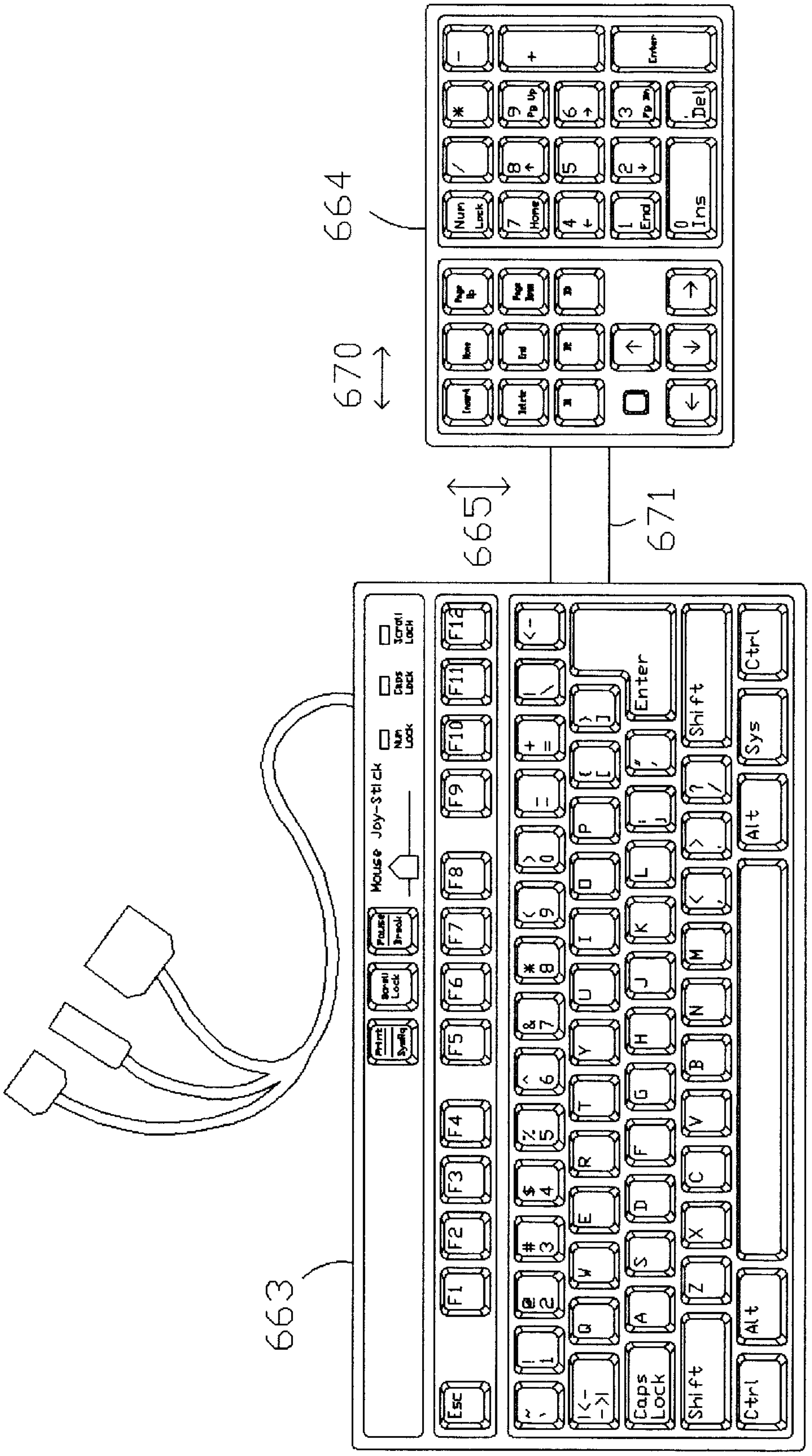
FIG. 108 shows a top view of a mouse board integrated with a keyboard.
Figure 109:
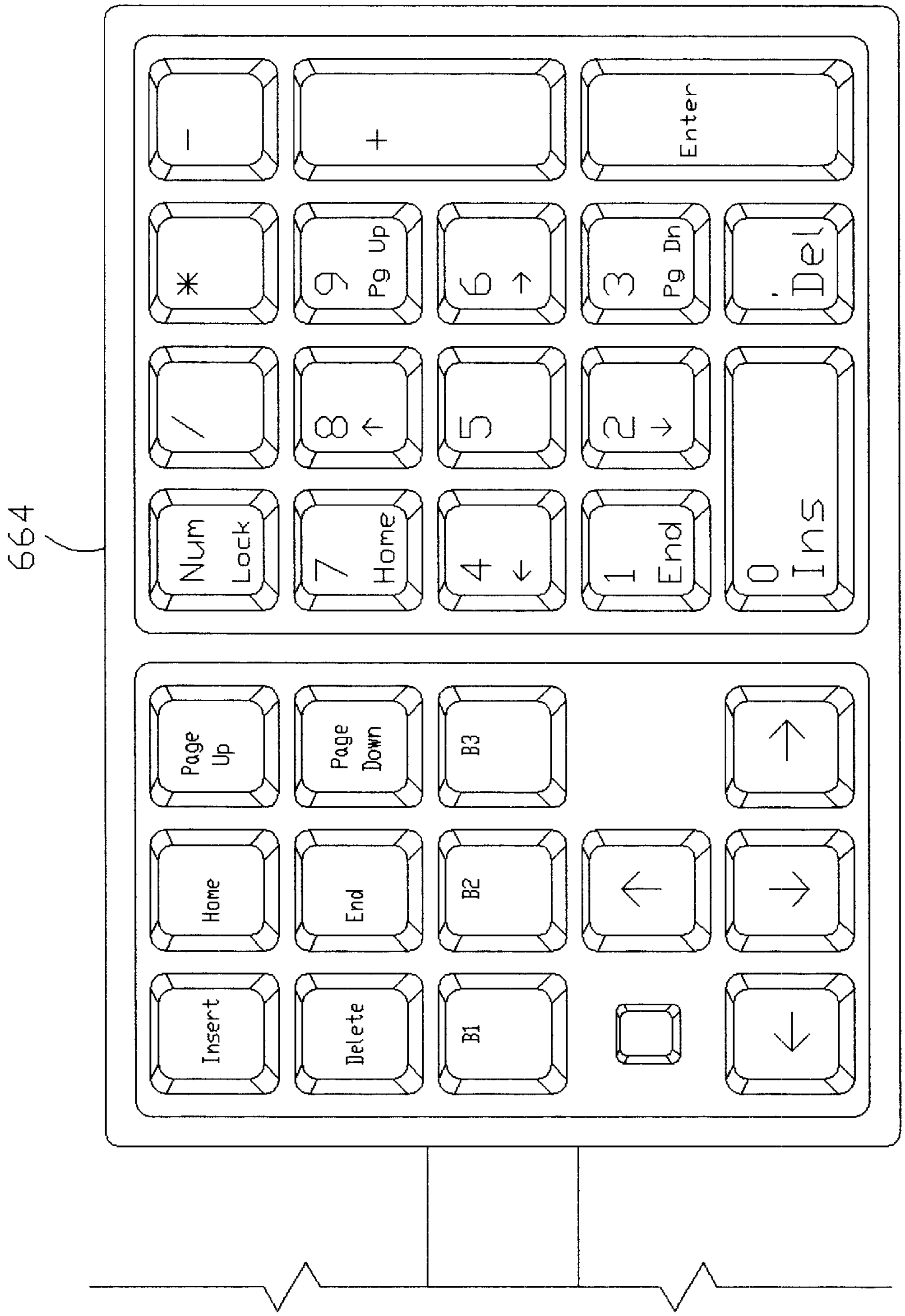
FIG. 109 is an enlarged top view of a mouse board in FIG. 108.

FIG. 108 shows the top view of another design of mouse boards 663 and 664 similar to mouse boards 652 and 653. However, mouse boards 663 and 664 are not foldable. There is a cavity similar to cavity 655 on the side of either mouse boards 663 and 664 to allow mouse link 665 to move in 2 dimensions indicated by arrows 670 and 671. FIG. 109 depicts the enlarged top view of mouse board 664.

Figure 110:
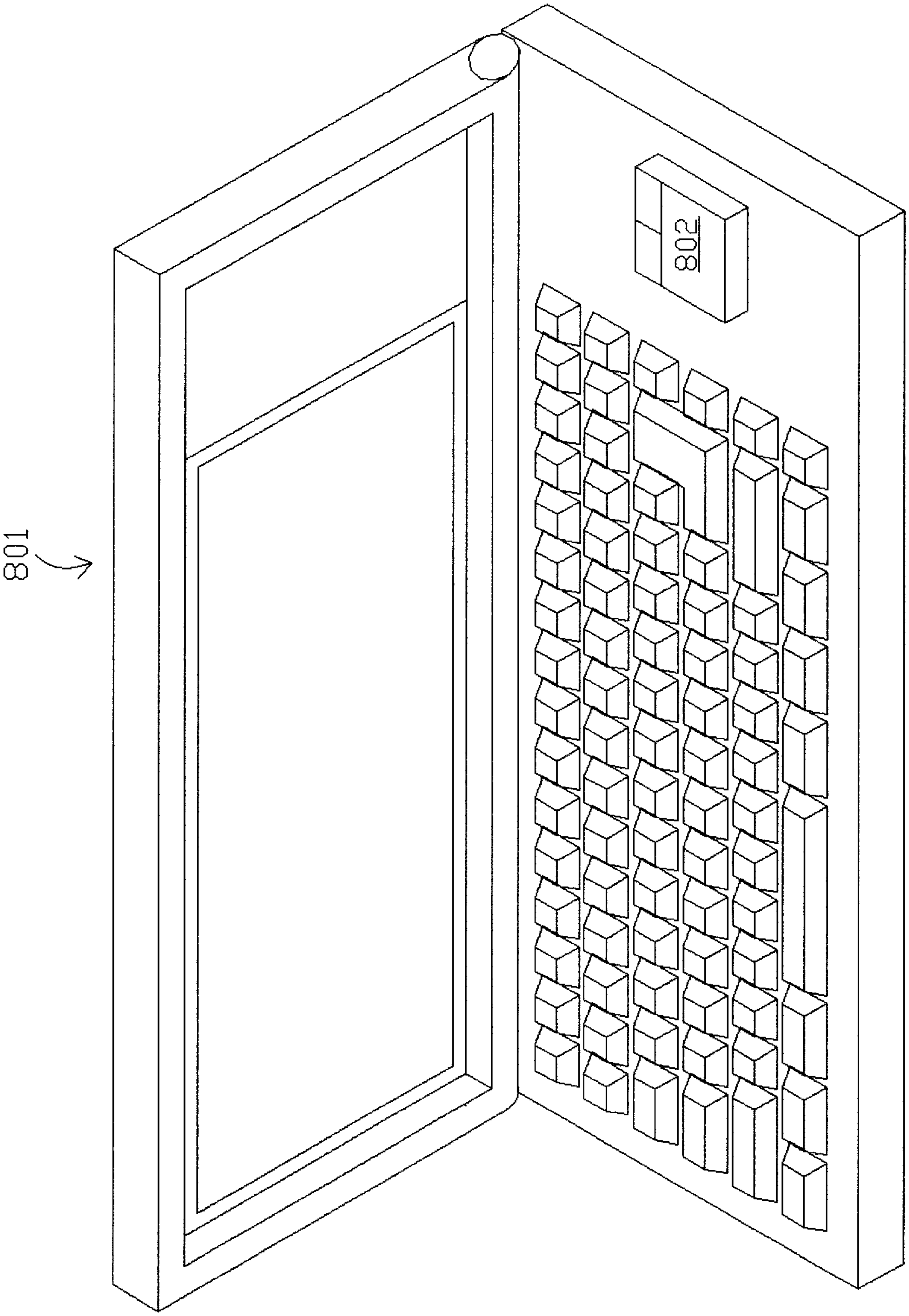
FIG. 110 is a perspective view of a tailless mouse integrated with a notebook computer.

FIG. 110 shows a perspective view of the present invention integrated with a portable computer system 801. The mouse board 802 can be any design of the present invention.

Figure 111:
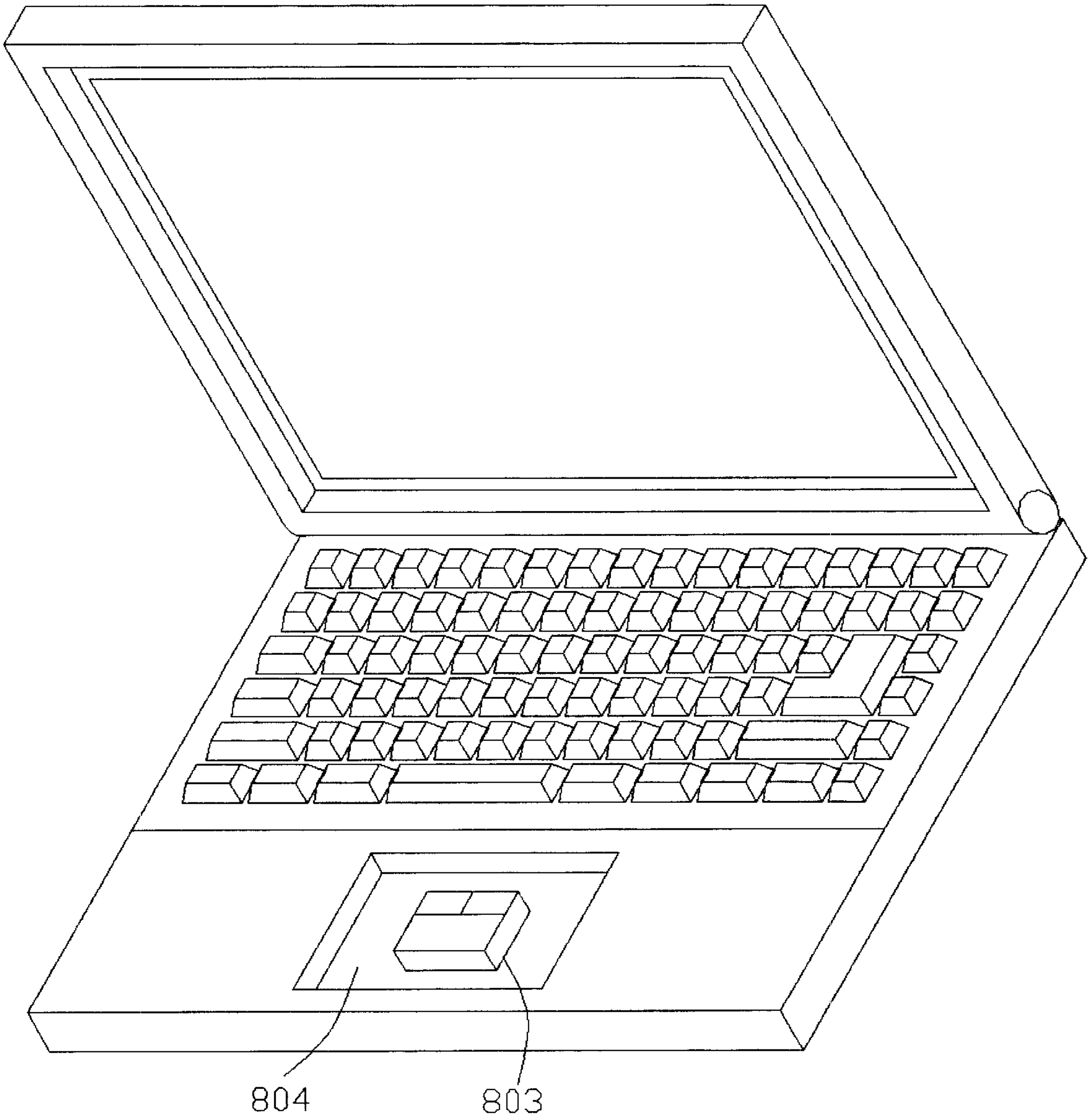
FIG. 111 is a perspective view of another design of a tailless mouse integrated with a notebook computer.

FIG. 111 shows another design of the present invention integrated with a portable computer system. The mouse board 803 can be any design in the present invention. Mouse board 803 is located near the bottom edge of the portable computer and it has an indented base station 804 so that mouse board 803 will not obstruct the user's hand during typing.

Figure 112:
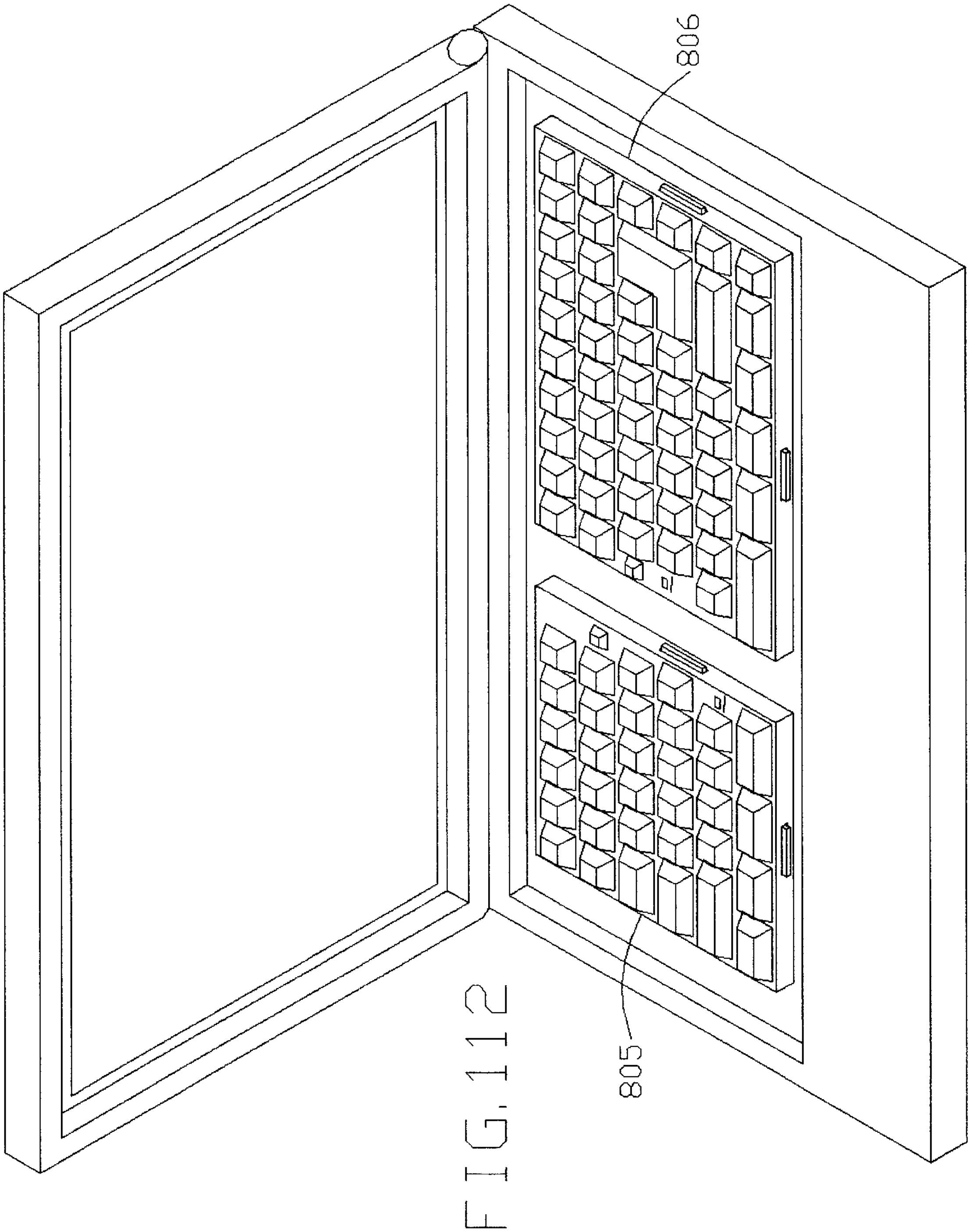
FIG. 112 is a perspective view of 2 mouse boards integrated with a notebook computer.

FIG. 112 shows another design of the present invention integrated with a portable computer system. In this design, 2 mouse boards 805 and 806 are used to function as the keyboard and mouse for the portable computer system.

Figure 113:
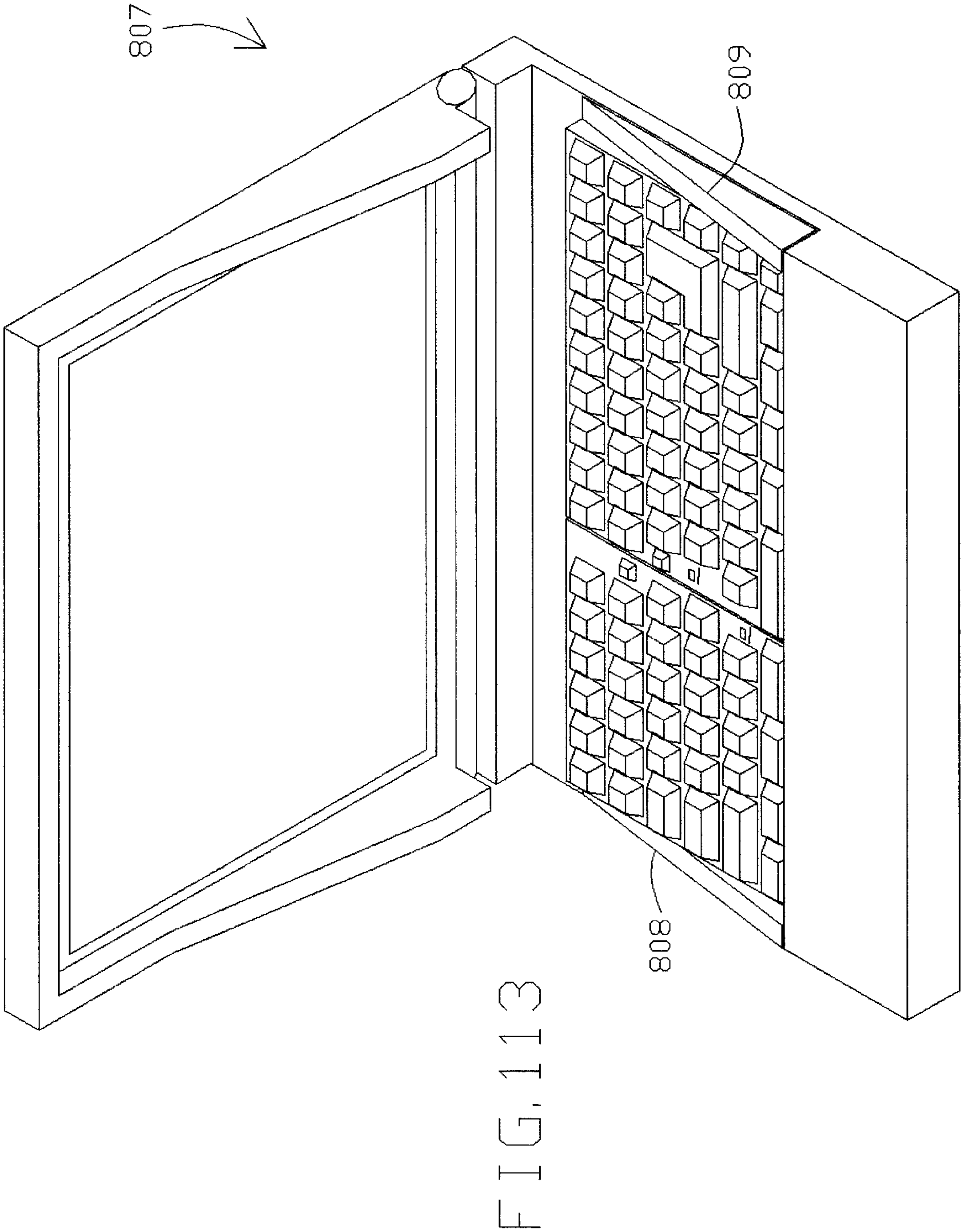
FIG. 113 is a perspective view of another design of 2 mouse boards integrated with a notebook computer.
Figure 114:
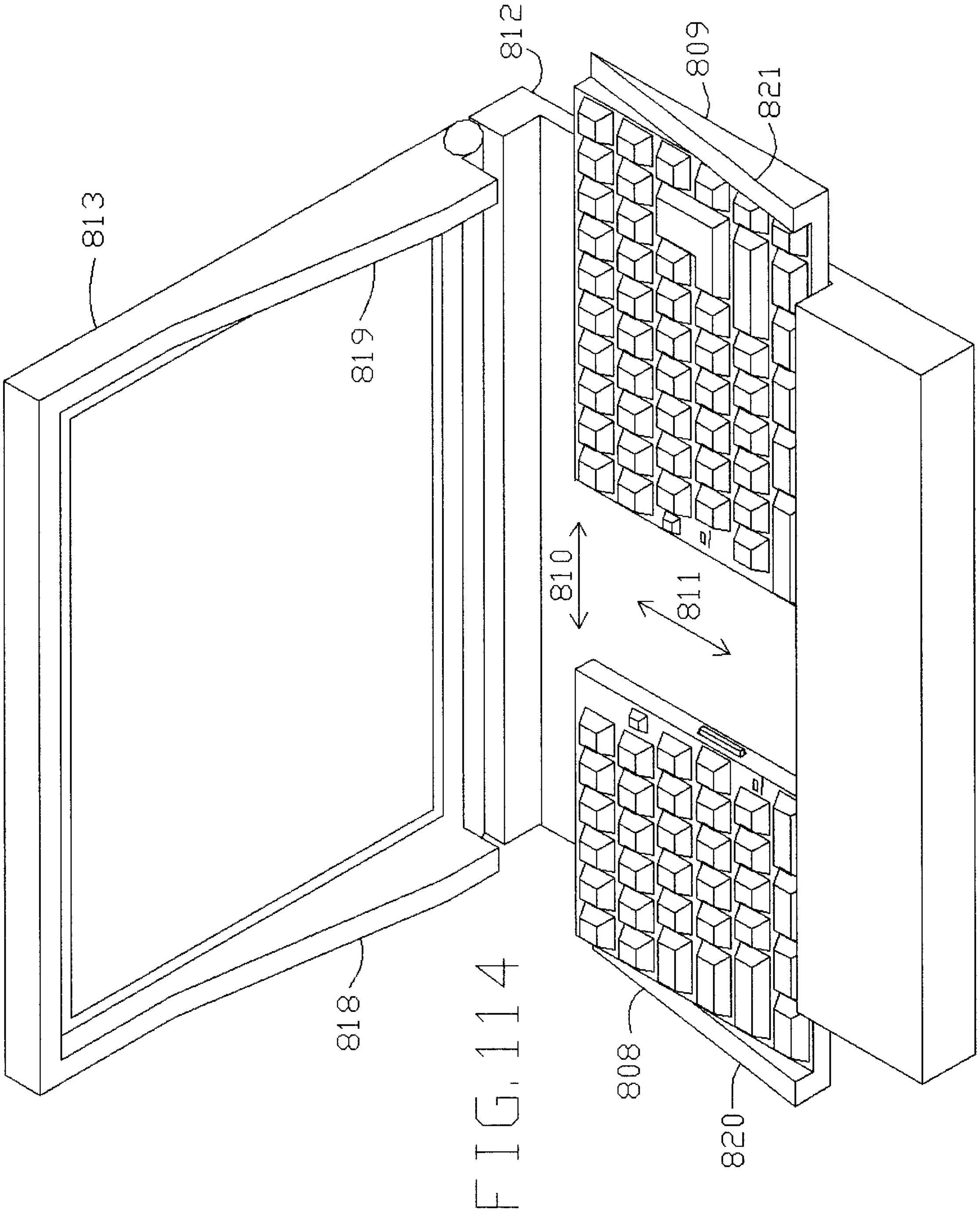
FIG. 114 is a perspective view showing the 2 mouse boards in FIG. 113 being moved apart.

FIG. 113 shows another design of the present invention integrated with a portable computer system 807. In this design, 2 mouse boards 808 and 809 are used to function as the keyboard and mouse for the portable computer system. FIG. 114 shows how mouse boards 808 and 809 may move along the directions indicated by arrows 810. Similarly, mouse boards 808 and 809 may also move along the directions indicated by arrows 811.

Figure 115:
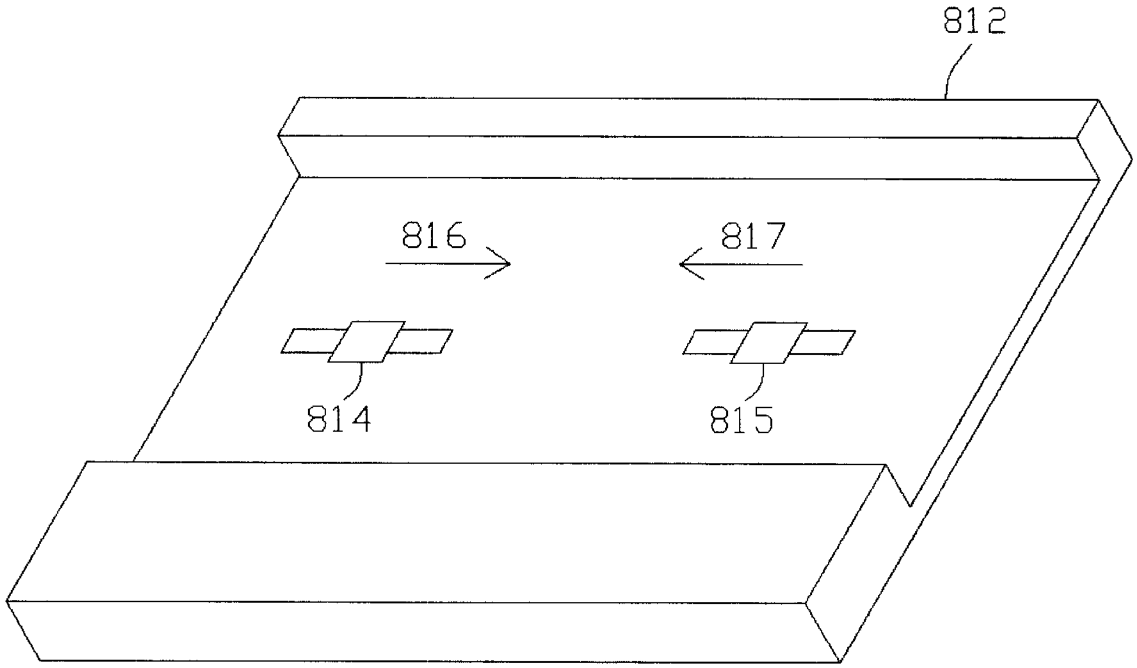
FIG. 115 shows the supporting surface of the notebook computer in FIG. 113.
Figure 116:
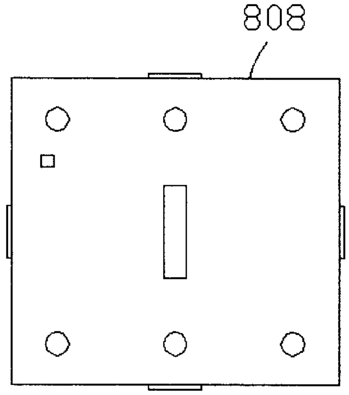
FIG. 116 shows the bottom view of one of the mouse boards in FIG. 113.
Figure 117:
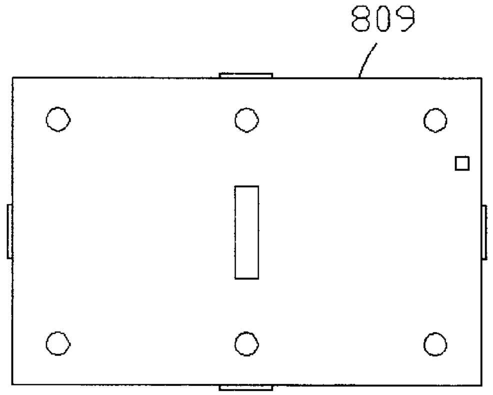
FIG. 117 shows the bottom view of the other mouse board in FIG. 113.

FIG. 115 shows the perspective view of the base station 812 of the computer system 807 with the mouse boards and cover 813 removed. FIG. 116 and 117 show the bottom views of the mouse boards 808 and 809 respectively.

Referring to FIG. 114 to 117, when the cover 813 closes by moving downwards, either a mechanical or electronic or other means will automatically cause the mouse links 814 and 815 which are similar in design to mouse link 528 in FIG. 70 to move towards the centre of the base station along the directions indicated by arrows 816 and 817, respectively. This movement of the mouse links 814 and 815 will in turn move the mouse board 808 and 809 in the same direction towards the centre of the base station 812.

When the cover 813 continues to move downwards, the sloped edges 818 and 819 of the cover will touch the sloped edges 820 and 821 of the mouse boards, thus forcing the mouse boards in place when the cover 813 closes completely.

Figure 118:
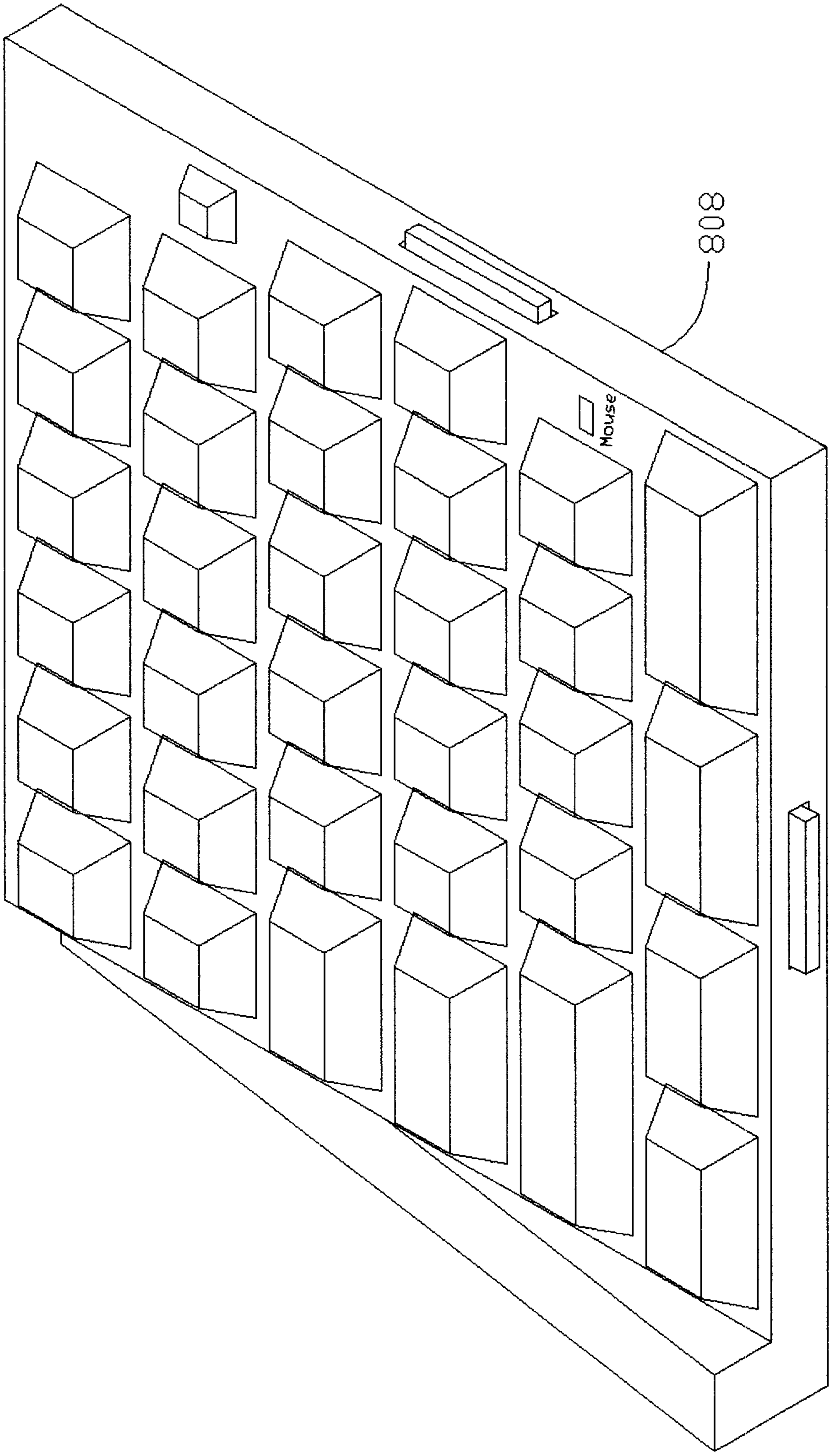
FIG. 118 shows an enlarged perspective view of one of the mouse boards in FIG. 113.
Figure 119:
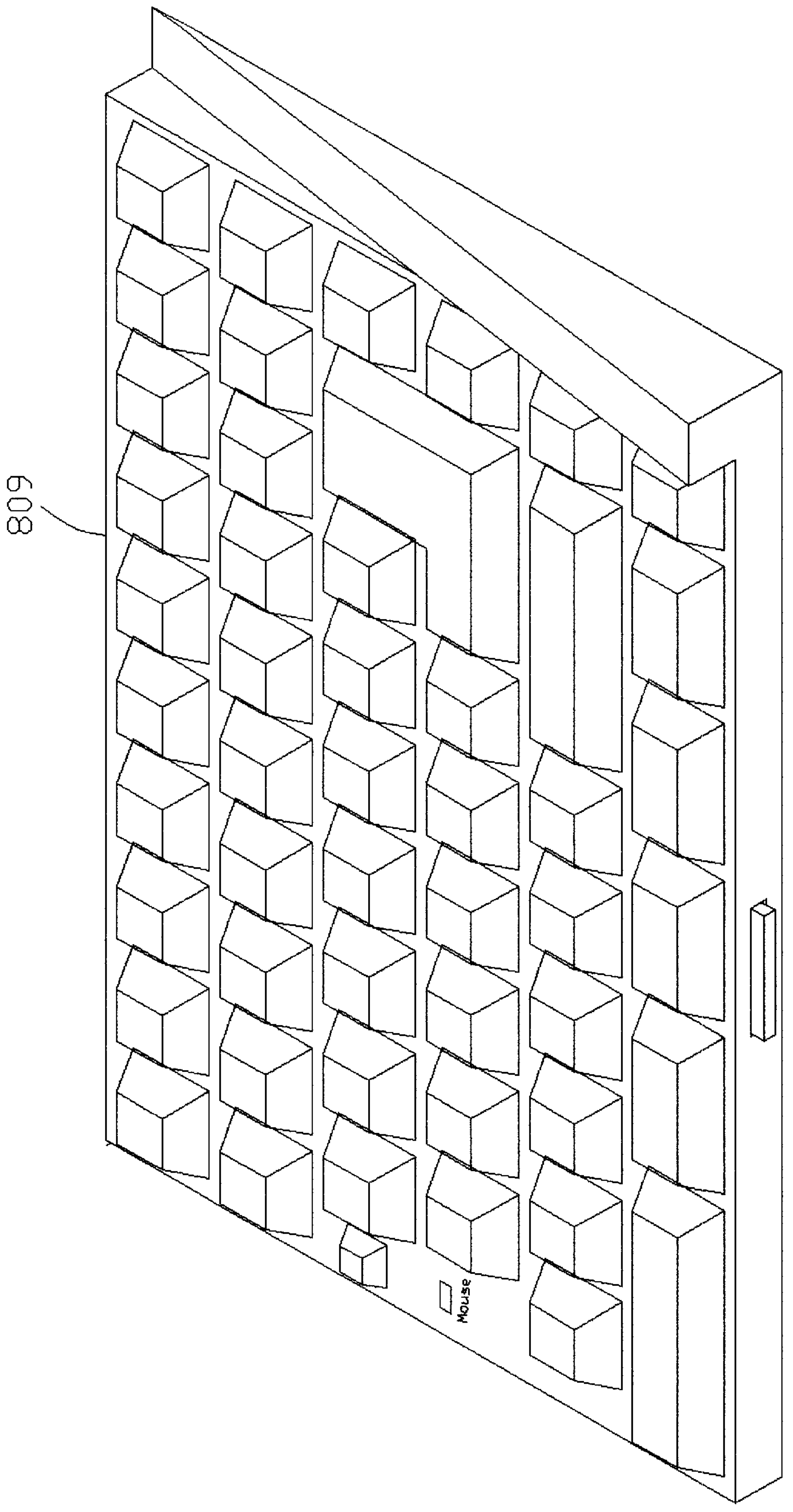
FIG. 119 shows an enlarged perspective view of the other mouse boards in FIG. 113.

FIG. 118 and 119 shows the enlarged perspective views of mouse boards 808 and 809 respectively.

Figure 120:
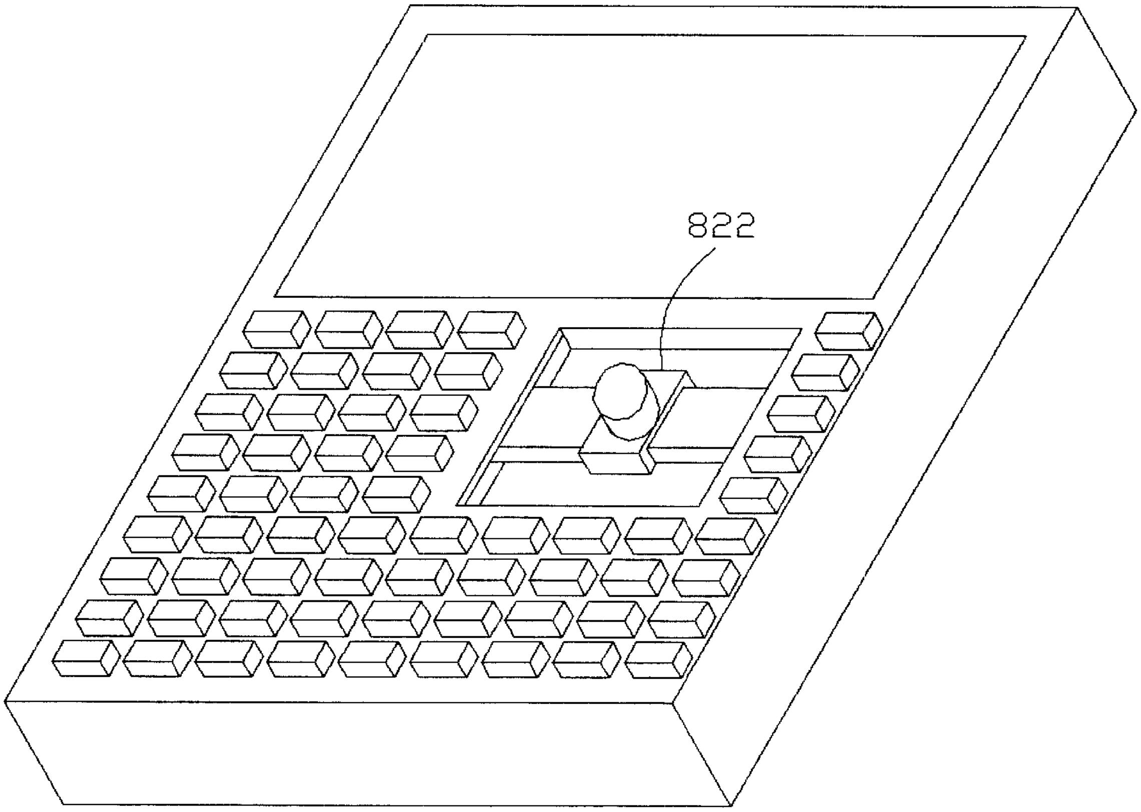
FIG. 120 shows an position encoder system in the present invention integrated with a hand-held computer.

FIG. 120 shows another design of the present invention integrated with a hand-held computer system. The mouse board 822 can be any design of the present invention.

Figure 121:
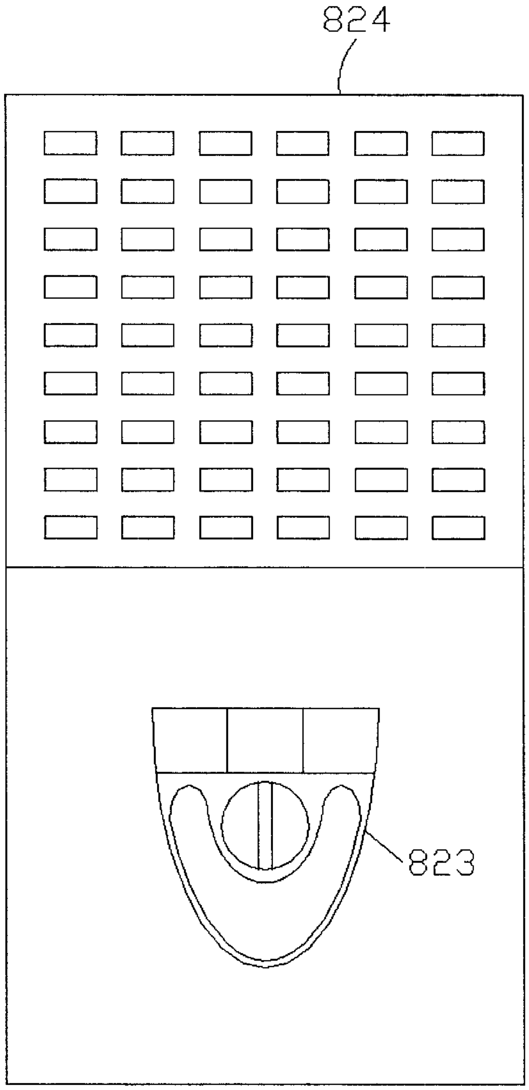
FIG. 121 shows a tailless mouse integrated with a remote controller for a machine.
Figure 122:
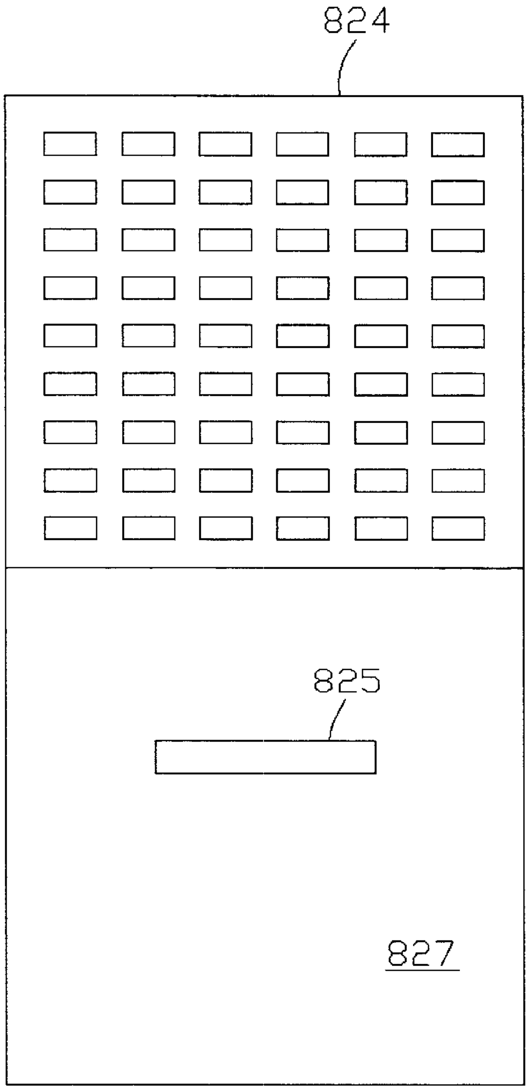
FIG. 122 shows the supporting platform surface of a remote controller for a machine.
Figure 123:
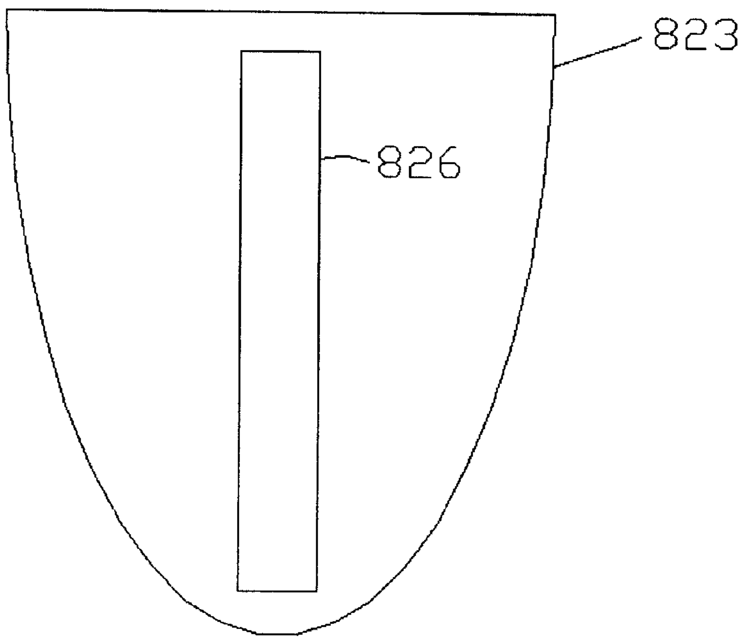
FIG. 123 shows the bottom view of the tailless mouse in FIG. 121.

FIG. 121 shows another design of the present invention integrated with a hand-held remote control device that transmits positional information for used by graphical display computer system. The mouse board 823 can be any design of the present invention. Specifically, mouse board 823 can be fully operated with only an user's thumb. FIG. 122 shows the top view of base station 824 with mouse board 823 removed, and FIG. 123 shows the bottom view of mouse board 823. The opening 825 on the mouse board together with the mouse bottom opening 826 will be used with a mouse link such as that shown in FIG. 70 to allow mouse board 823 to move freely coplanar to platform 827 on the base station.

Figure 124:
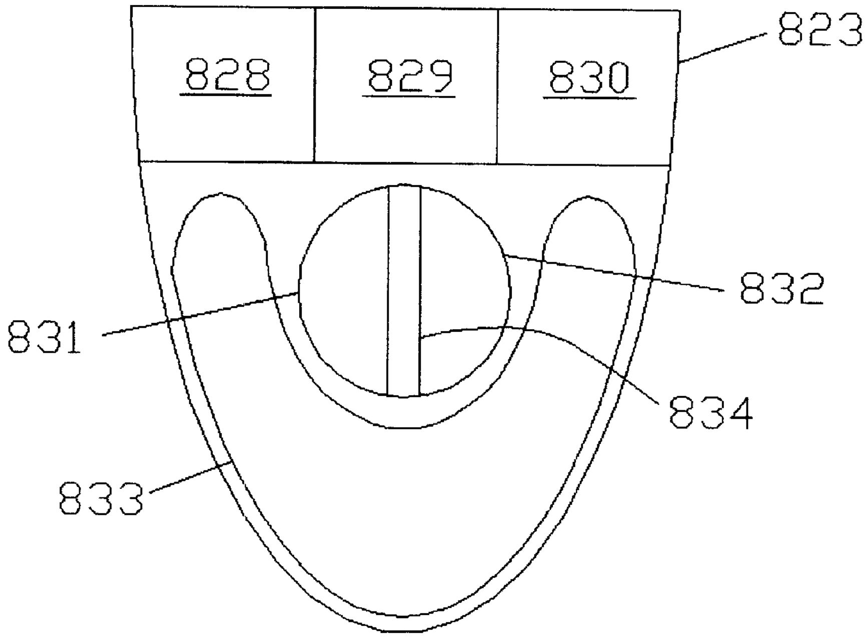

FIG. 124 shows the enlarged top view of mouse board 823. The buttons 831, 832 and 833 correspond to the conventional computer mouse buttons 1, 2 and 3 respectively. The buttons 831 and 832 can be pressed by the tip of the thumb. Button 833 is an U-shaped button and it can be pressed by raising the thumb's tip and pushing the middle of the thumb towards button 833. There is a button 834 between buttons 831 and 832. When button 834 is pressed the mouse board 823 will be disabled for generating signals so that mouse board 823 can be moved to a position similar to lifting a conventional computer mouse.

The buttons 828, 829 and 830 also correspond to the conventional computer mouse buttons 1, 2 and 3 respectively. The buttons 828, 829 and 830 are to be used when the user operates mouse board 823 by holding it in the way similar to holding a conventional computer mouse. In which case, mouse board 823 may also be lifted upwards slightly much like a conventional computer mouse, because mouse link such as mouse link 528 shown in FIG. 70 also allows vertical movement relative to the base station.

I claim:

1. Method and apparatus of a position encoder system for a computer, comprising:

a housing having a first indented area;

a base with a platform surface;

encoder means for sensing movement of said housing and;

a communication means for transferring signals from said housing and said encoder means to a host computer having one end connected to said housing through said first indented area and another end received at said platform surface of said base thereby said indented area of said housing facing said platform surface allowing said communication means to move therein when said housing moves coplanar to said platform surface as well as said communication means extendible when said housing moves away from said base.

2. The system in claim 1 wherein said first indented area includes a passage forming a notch allowing said communication means to pass through when said indented area of said housing facing a surface thereby allowing said housing to move coplanar to the surface.

3. The system in claim 1 further includes a link member having one end secured at said platform surface and another end received into said housing through said first indented area, said link member being flexible and can move freely within said indented area when said platform surface facing said indented area thereby said housing moves coplanar to said platform surface as well as moves away from said base.

4. The system in claim 1 further includes a link member having one end secured at said platform surface and a second end received into said housing through said first indented area thereby said second end of said link member movable within said first indented area when said housing moves.

5. The system in claim 4 wherein the end of said second end of said link member is wider than the opening of said first indented area thereby said link member movable within the cavity of said first indented area but not easily detachable from said housing.

6. The system in claim 4 wherein said second end of said link member is movably mounted within the cavity of said first indented area of said housing thereby said second end of said link member movable within said cavity.

7. The system in claim 1 further comprising:

said base having a second indented area on said platform surface;

said communication means for transferring signals from said housing and said encoder means to a host computer having one end connected to said housing through said first indented area and another end received into said base through said second indented area thereby said first indented area facing said second indented area forming a cavity allowing said communication means to move therein when said housing moves coplanar to said platform surface as well as said communication means extendible when said housing moves away from said platform surface.

8. The system in claim 7 wherein:

said housing being of a footprint adapted by a hand having a semi-circular shaped bottom side with a straight edge and a semi-circular edge, said first indented area being a conical with the base taking up most area of said bottom side except the semi-circular edge and a portion near the centre of the straight edge, said portion near the centre of the straight edge being mounted a sensor component for detecting movement of said housing relative to said base, said indented area including a passage near said straight edge beside the centre of said straight edge thereby said communication means passing through when said first indented area of said housing facing a surface allowing said housing movable on a surface other than said platform surface;

said base being a chassis having a detachable and replaceable rectangular platform surface, said second indented area on said rectangular platform surface being a circular hole disposed near the centre of said rectangular platform surface;

said base having a opening on the rear wall thereby the cord of a conventional mouse may pass through therewith allowing a conventional computer mouse to work on said platform surface;

said communication means including a first communication member having one end secured at the top of said conical indented area and another end received into said base through said hole on said platform surface, said communication means further including an adapter disposed in said base accepting an external signal and sending it to a host computer;

a link member having one end secured at said housing through said first indented area and another end received into said base through said second indented area, said link member is flexible and can move freely within the cavity formed by said first indented area and said second indented area when said first indented area facing said second indented area thereby said housing moveable coplanar to said platform surface as well as moving away from said base.

9. The system in claim 8 wherein said base further includes a plurality of keys representing all the keys in a standard personal computer QWERTY keyboard optionally with the numeric key pad, said platform surface being disposed either on the right or left side of said plurality of keys.

10. The system in claim 7 further includes a link member having one end movably engaged at said housing through said first indented area and another end movably engaged at said base through said second indented area thereby said first indented area facing said second indented area forming a passage allowing said link member to move freely therein when said housing moves coplanar to said platform surface as well as said link member extendible when said housing moves away from said base.

11. The system in claim 10 wherein said first indented area on said housing being a conical having a first opening on the top of the conical, said second indented area on said base being a conical having a second opening near the top of the conical, said link member having a first end extended into said first opening of said first indented area and a second end received into said second opening of said second indented area, said first end of the link member being wider than said first opening thereby preventing said first end from moving out of said first opening and allowing a portion of the body of said link member to move further into said housing, said second end being wider than said second opening thereby preventing said second end from moving out of said second opening and allowing a portion of the body of said link member to move further into said base, thereby enabling said link member to draw into and out of said first and second openings when said housing moves coplanar to said platform surface as well as moves away from said base, said link member being hollow thereby said communication means passing through therein from said housing to said base.

12. The system in claim 11 wherein said link member further includes 2 tubular structures one of which is smaller than the other thereby said smaller tubular structure can draw into and out of said larger tubular structure allowing said link member to change length, thereby enabling said housing to move relative to said base in a greater range of distance.

13. The system in claim 10 wherein said first indented area being a square, said second indented area being a square, said link member having a first end extended into said housing through said first indented area thereby said first end of said link member moveable in directions along the length, width and depth of said first indented area, said link member having a second end extended into said base through said second indented area thereby said second end of said link member moveable in directions along the length, width and depth of said second indented area, said link member having a plate at each of said first and second ends, said plates being wider than the openings of said first and second indented areas thereby said first and second ends of said link member unable to move out of said first and second indented areas, said link member having a body of hollow tubular structure thereby said communication means passing through therein from said house into said base.

14. The system in claim 7 further includes a link member having a first end movably engaged at said housing through said first indented area of said housing thereby said first end of said link member movable in a first direction along the length of said first indented area and in a second direction along the depth of said first indented area, said link member having a second end movably engaged at said base through said second indented area thereby said second end of said link member movable in said second direction along the depth of said second indented area and in a third direction along the length of said second indented area, thereby said housing movable in said first, second and third directions relative to said base.

15. The system in claim 14 wherein said encoder means detects movements of said link member relative to said housing and movements of said link member relative to said base thereby providing indicative signals to a host computer positional and directional information of said housing relative to said base.

16. The system in claim 14 wherein said link member being a hollow tubular structure thereby said communication means passing through therein, said first end of tubular structure extended into said first indented area of said housing, said first indented area of said housing being a first elongated indented area thereby said first end of said tubular structure movable in said first direction along the length of said first elongated indented area, said tubular structure movable in said second direction by moving into and out of said first elongated area along the depth of said first elongated area, said first end of said tubular structure being wider than the opening of said first elongated indented area thereby preventing said first end of said tubular structure from completely moving out of said first elongated indented area, said second end of said tubular structure received into said base through said second indented area of said platform surface, said second indented area of said platform surface being a second elongated indented area thereby said second end of said chamber movable in said third direction along the length of said second elongated indented area, said tubular structure movable in said second direction by moving into and out of said second elongated area along the depth of said elongated area, said second end of said tubular structure being wider than the opening of said second elongated indented area thereby preventing said second end of said tubular structure from completely moving out of said second elongated area.

17. The system in claim 16 wherein said encoder means further includes:

a first sensing component being mounted on said first end of said tubular structure thereby detecting movements of said first end of tubular structure relative to said housing;

a second sensing component being mounted on said second end of said tubular structure thereby detecting movements of said second end of said tubular structure relative to said base.

18. The system in claim 16 wherein said base further includes a plurality of keys representing all the keys in a standard personal computer QWERTY keyboard optionally with or without the numeric key pads, said platform surface being disposed either on the right or left side of said plurality of keys.

19. The system in claim 16 wherein said base further includes a plurality of keys representing all the keys in a standard personal computer QWERTY keyboard at the left side of said base, said base further includes cursor movement keys representing the Insert, Delete, Page Up, Page Down, Up Arrow, Left Arrow, Down Arrow and Right Arrow disposed at the right side of said QWERTY keys, said base further includes at the right end the numeric key pad keys representing the keys in the numeric key pad in a conventional personal computer keyboard, said platform surface being disposed sidewise between said cursor movement keys and said numeric key pad keys.

20. The system in claim 16 wherein said base further includes a plurality of keys representing all the keys in a standard personal computer QWERTY keyboard at the left side of said base, said base further includes at the right end the numeric key pad keys representing the keys in the numeric key pad in a conventional personal computer keyboard, said base further includes cursor movement keys representing the Insert, Home, Up Arrow, End, Page Up, Delete, Left Arrow, Down Arrow, Right Arrow and Page Down keys, said cursor movement keys being arranged in 2 rows disposed sidewise at the upper portion between the QWERTY keys and said numeric key pad, said platform surface being disposed sidewise at the lower portion between the QWERTY keys and said numeric key pad keys.

21. The system in claim 16 wherein said second end of said tubular structure having a protrusion extended beyond the wider portion of said second end of said tubular structure, said protrusion having an opening facing the direction perpendicular to said link member, said communication means passing through said opening on said protrusion into said base, said protrusion touching a surface inside said base thereby supporting said tubular structure when said tubular structure moves.

22. The system in claim 21 wherein:

said housing having a first internal wall imprinted with graphical patterns to be sensed by a first sensing component of said encoding means mounted on said first end of said tubular structure when which moving within said first indented area of said housing, said first sensor being disabled when said first end of said tubular structure moving along the direction of the depth of said first indented area of said housing thereby moving said first sensing component away from said graphical pattern on said first internal wall;

said base having an second internal wall imprinted with graphical patterns to be sensed by a second sensing component of said encoding means mounted on said second end of said tubular structure when which moving in said second indented area of said base, said second sensor being disabled when said second end of said tubular structure moving along the direction of the depth of said second indented area of said base thereby moving said first sensing component away from said graphical pattern on said second internal wall.

23. The system in claim 16 wherein said base further includes a plurality of keys representing all the keys in a standard personal computer QWERTY keyboard and including the cursor movement keys representing the Insert, Delete, Page Up, Page Down, Up Arrow, Left Arrow, Down Arrow, Right Arrow, and numeric key pad keys, said platform surface being disposed sidewise below said plurality of keys, said platform being depressed such that said housing when placed on said platform will reach the same height of the non-depressed platform surface.

* * * * *